United States Patent
Yoo et al.

(10) Patent No.: US 11,281,328 B2
(45) Date of Patent: Mar. 22, 2022

(54) DISPLAY DEVICE AND DRIVING CIRCUIT

(71) Applicant: LG DISPLAY CO., LTD, Seoul (KR)

(72) Inventors: DukKeun Yoo, Seoul (KR); HyunGon Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/884,389

(22) Filed: May 27, 2020

(65) Prior Publication Data
US 2021/0019035 A1    Jan. 21, 2021

(30) Foreign Application Priority Data

Jul. 18, 2019    (KR) .......................... 10-2019-0087042

(51) Int. Cl.
*G06F 3/041* (2006.01)
*G09G 3/20* (2006.01)
*G06F 3/042* (2006.01)

(52) U.S. Cl.
CPC .......... *G06F 3/04166* (2019.05); *G06F 3/042* (2013.01); *G09G 3/2003* (2013.01); *G06F 2203/04106* (2013.01)

(58) Field of Classification Search
None
See application file for complete search history.

(56) References Cited

U.S. PATENT DOCUMENTS

| | | | |
|---|---|---|---|
| 2010/0013811 A1* | 1/2010 | Ahn | G09G 3/3208 345/207 |
| 2014/0184570 A1* | 7/2014 | Ahn | G06F 3/04166 345/175 |
| 2018/0113559 A1* | 4/2018 | Bae | G06F 3/0412 |

* cited by examiner

*Primary Examiner* — Stephen T. Reed
(74) *Attorney, Agent, or Firm* — Seed IP Law Group LLP

(57) ABSTRACT

The disclosure relates to display devices which include data lines for transferring driving signals, gate lines for transferring scan signals, a plurality of pixel electrodes respectively disposed in a plurality of subpixels, common electrodes supplying a display common voltage upon display driving, readout lines connected with the common electrodes, and photo transistors including a gate, a first, and a second electrode. The second electrode of each of the photo transistors is electrically connected with the common electrode. The first electrode and gate electrode of each of the photo transistors is electrically connected with a common electrode or a gate line for display driving. Thus, it is possible to operate photo sensors to perform photo sensing even without all or some of the signal lines necessary for the operation of the photo sensors, thereby increasing the aperture ratio and transmittance.

19 Claims, 40 Drawing Sheets

DISPLAY DEVICE AND DRIVING CIRCUIT

CROSS-REFERENCE TO RELATED APPLICATION

This application claims priority from Korean Patent Application No. 10-2019-0087042, filed on Jul. 18, 2019, which is hereby incorporated by reference for all purposes as if fully set forth herein.

BACKGROUND

Technical Field

Embodiments of the disclosure relate to display devices and driving circuits.

Description of the Related Art

Recent display devices may provide touch-based input features, which allow users easy, intuitive, and convenient entry of information or commands using their finger or a pen, as well as displaying images or information. Display devices should be able to figure out whether the user touches and to precisely sense the coordinates of the touch to provide touch-based entry.

Meanwhile, display devices may be designed in various form factors and be used in a diversity of environments. Thus, display devices may need diversified input schemes suited for their respective designs and environments.

BRIEF SUMMARY

According to embodiments of the disclosure, there may be provided a display device and driving circuit which are capable of quickly and efficiently performing a touch sensing function and photo sensing function.

According to embodiments of the disclosure, there may be provided a display device and driving circuit which are capable of efficiently performing displaying, touch sensing, and photo sensing.

According to embodiments of the disclosure, there may be provided a display device and driving circuit which may be rendered to have a high aspect ratio and high transmittance by effectively designing a photo sensor configuration.

According to embodiments of the disclosure, there may be provided a display device and driving circuit which may perform photo sensing by normally operating photo sensors even without all or some of the signal lines necessary for the operation of the photo sensors.

According to embodiments of the disclosure, there may be provided a display device and driving circuit which allows the user to perform various types of light-based inputs.

According to an embodiment of the disclosure, there may be provided a display device comprising a plurality of data lines disposed in a first direction and configured to be supplied with data signals, a plurality of gate lines disposed in a second direction that is transverse to the first direction and configured to be supplied with scan signals, a plurality of pixel electrodes respectively disposed in a plurality of subpixels, a plurality of common electrodes supplying a display common voltage upon display driving, a plurality of readout lines electrically connected with the plurality of common electrodes, and a plurality of photo transistors including a gate electrode, a first electrode, and a second electrode.

The second electrode of each of the plurality of photo transistors may be electrically connected with the common electrode. At least one of the first electrode and the gate electrode of each of the plurality of photo transistors may be electrically connected with a gate line for display driving.

According to an embodiment of the disclosure, there may be provided a display device comprising a plurality of data lines disposed in a first direction and supplied data signals, a plurality of gate lines disposed in a second direction and supplied scan signals, a plurality of pixel electrodes respectively disposed in a plurality of subpixels, a plurality of common electrodes supplied a display common voltage upon display driving, a plurality of readout lines electrically connected with the plurality of common electrodes, and a plurality of photo transistors including a gate electrode, a first electrode, and a second electrode.

The second electrode of each of the plurality of photo transistors may be electrically connected with the common electrode. The gate electrode of each of the plurality of photo transistors may be electrically connected with the second electrode of the corresponding photo transistor or the common electrode.

According to an embodiment of the disclosure, there may be provided a driving circuit for driving a display panel including a plurality of gate lines, a plurality of common electrodes, and a plurality of photo transistors including a first electrode, a second electrode, and a gate electrode.

According to an embodiment of the disclosure, there may be provided a driving circuit including a gate driving circuit supplying a scan signal whose voltage level is varied within a turn-off level voltage range to a gate line electrically connected with a first electrode of a photo transistor, a multi-sensing circuit supplying a touch driving signal, which has an amplitude corresponding to an amplitude of the scan signal, to a common electrode electrically connected with a second electrode of the photo transistor and sensing the common electrode, and a photo driving circuit supplying a photo control signal, which has an amplitude corresponding to the amplitude of the scan signal, to a gate electrode of the photo transistor.

According to an embodiment of the disclosure, there may be provided a driving circuit including a gate driving circuit supplying a scan signal whose voltage level is varied within a turn-off level voltage range to a gate line electrically connected with a first electrode and gate electrode of a photo transistor and a multi-sensing circuit supplying a touch driving signal, which has an amplitude corresponding to an amplitude of the scan signal, to a common electrode electrically connected with a second electrode of the photo transistor and sensing the common electrode.

According to an embodiment of the disclosure, there may be provided a driving circuit including a gate driving circuit supplying a scan signal whose voltage level is varied within a turn-off level voltage range to a gate line electrically connected with a gate electrode of a photo transistor, a multi-sensing circuit supplying a touch driving signal, which has an amplitude corresponding to an amplitude of the scan signal, to a common electrode electrically connected with a second electrode of the photo transistor and sensing the common electrode, and a photo driving circuit supplying a photo driving signal, which has an amplitude corresponding to the amplitude of the scan signal, to a first electrode of the photo transistor.

According to an embodiment of the disclosure, there may be provided a driving circuit including a gate driving circuit supplying a scan signal whose voltage level is varied within a turn-off level voltage range to a gate line, a multi-sensing circuit supplying a touch driving signal, which has an amplitude corresponding to an amplitude of the scan signal, to a common electrode electrically connected with a second electrode and gate electrode of the photo transistor and sensing the common electrode, and a photo driving circuit supplying a photo driving signal, which has an amplitude corresponding to the amplitude of the scan signal, to a first electrode of the photo transistor.

According to embodiments of the disclosure, the touch sensor and the photo sensor are enabled to perform sensing via the same readout line, allowing for rapid and efficient touch sensing and photo sensing.

According to embodiments of the disclosure, in the display panel, the touch sensor configuration and photo sensor configuration are designed to be organically combined with configurations for display driving, allowing for efficient displaying, touch sensing, and photo sensing.

According to embodiments of the disclosure, a configuration for display driving, a touch sensor configuration, and a photo sensor configuration all are included, allowing for a high aspect ratio and high transmittance via an efficient design of the photo sensor configuration.

According to embodiments of the disclosure, photo sensors may be normally operated to perform photo sensing even without all or some of the signal lines necessary for the operation of the photo sensors. Thus, the aperture ratio and transmittance may be enhanced.

According to embodiments of the disclosure, various kinds of light-based inputs may be provided to the user.

BRIEF DESCRIPTION OF THE SEVERAL VIEWS OF THE DRAWINGS

The above and other objects, features, and advantages of the disclosure will be more clearly understood from the following detailed description, taken in conjunction with the accompanying drawings, in which.

DETAILED DESCRIPTION

Figure 1:
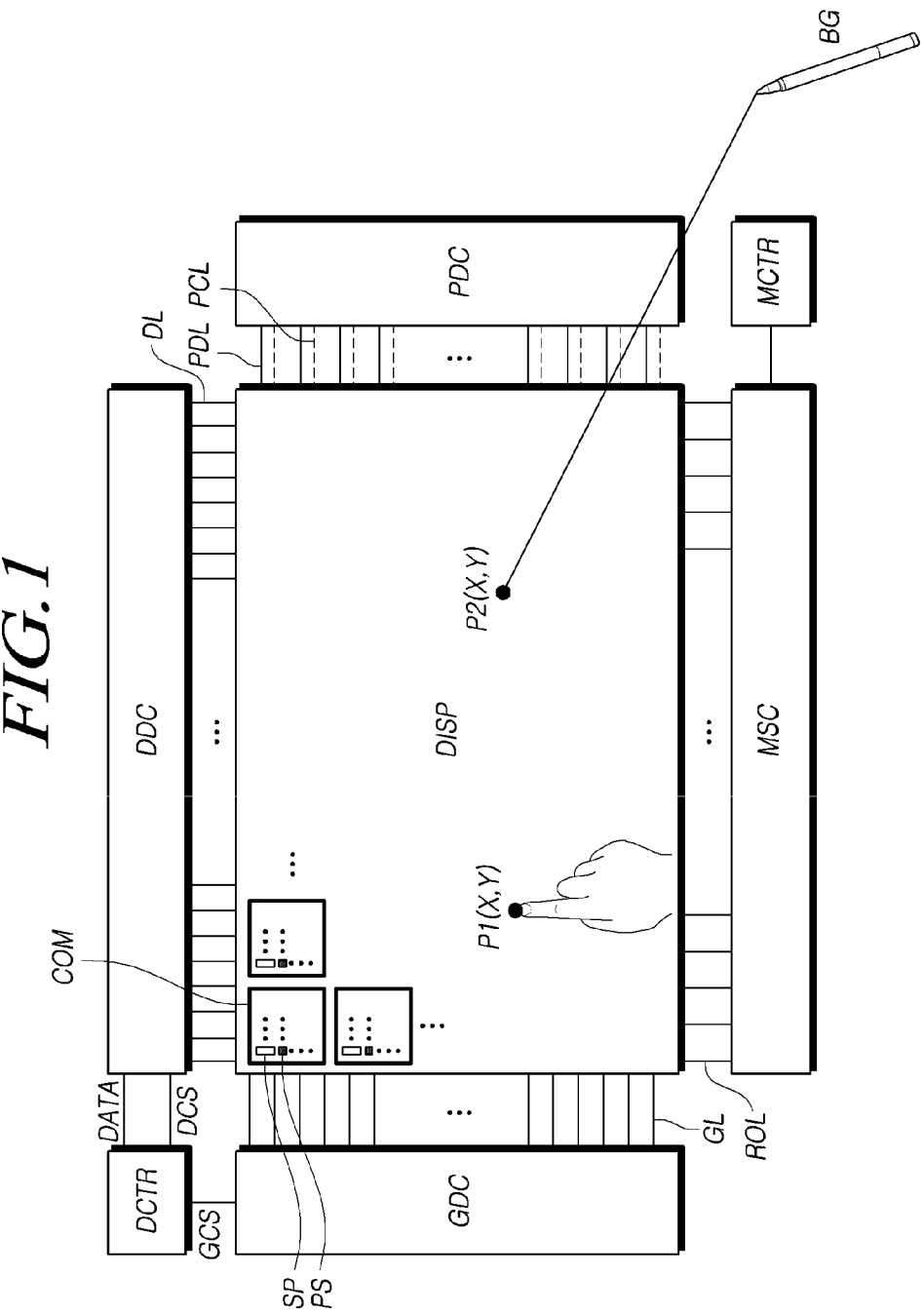
FIG. 1 is a view illustrating a system configuration of a display device according to embodiments of the disclosure.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including," "having," "containing," "constituting" "make up of," and "formed of" used herein are generally intended to allow other components to be added unless the terms are used with the term "only." As used herein, singular forms are intended to include plural forms unless the context clearly indicates otherwise.

Terms, such as "first," "second," "A," "B," "(A)," or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to," "contacts or overlaps," etc., a second element, it should be interpreted that, not only can the first element "be directly connected or coupled to" or "directly contact or overlap" the second element, but a third element can also be "interposed" between the first and second elements, or the first and second elements can "be connected or coupled to," "contact or overlap," etc., each other via a fourth element. Here, the second element may be included in at least one of two or more elements that "are connected or coupled to," "contact or overlap," etc., each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes, etc., are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can."

Hereinafter, embodiments of the disclosure are described in detail with reference to the accompanying drawings.

Figure 2:
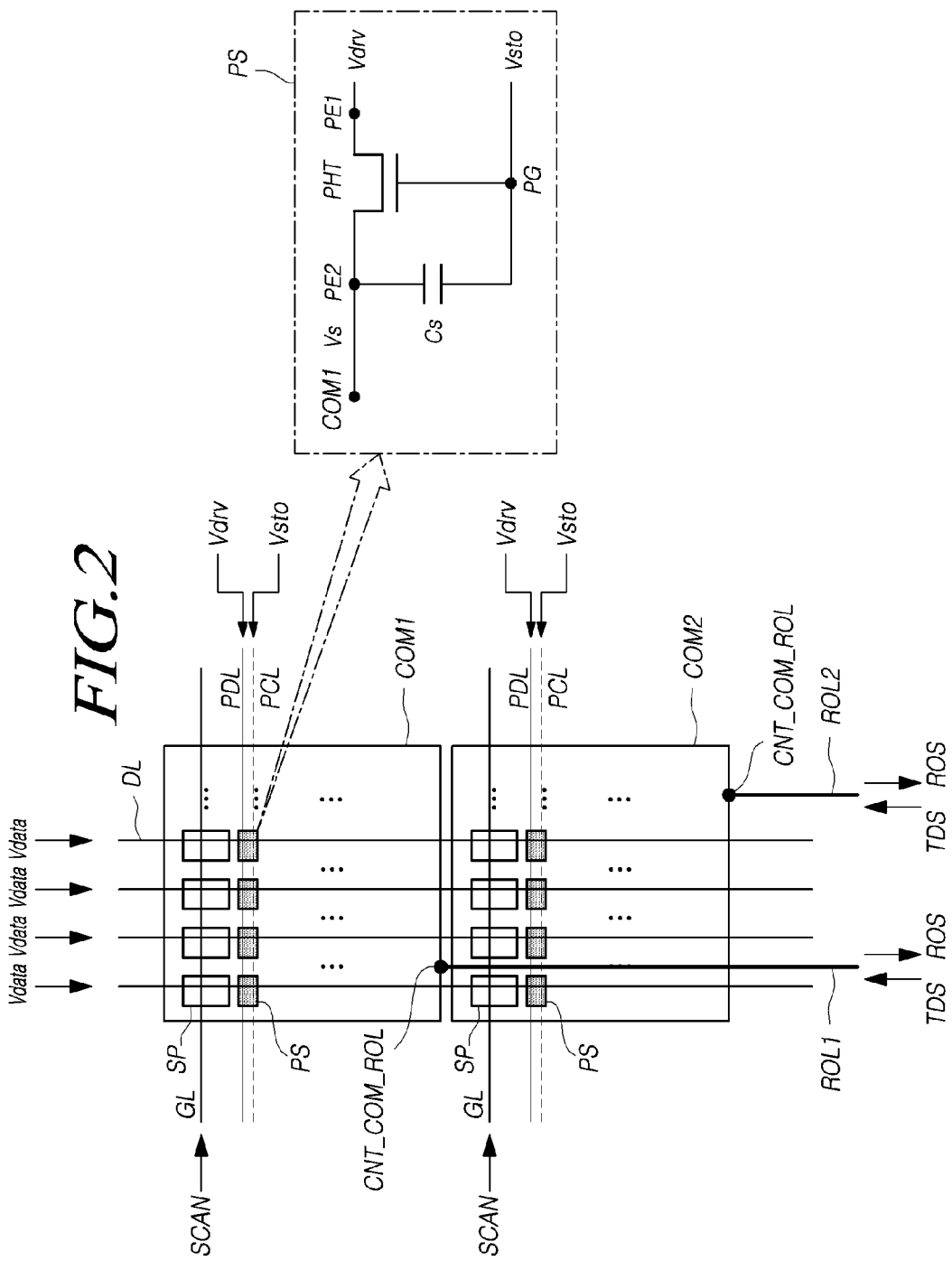
FIG. 2 is a view illustrating a basic multi-sensor configuration of a display panel according to embodiments of the disclosure.

FIG. 1 is a view illustrating a system configuration of a display device according to embodiments of the disclosure. FIG. 2 is a view illustrating a basic multi-sensor configuration of a display panel according to embodiments of the disclosure.

Referring to FIG. 1, a display device, according to embodiments of the disclosure, may provide a multi-sensing function including a touch sensing function and a photo sensing function, as well as a basic display function.

When the user touches, in a contacting or contactless manner, any point P1(X,Y) on a display panel DISP with her finger or a pen (e.g., electronic pen, digital pen, active, pen, active stylus, digital stylus, etc.), the display device may sense the touch at the point P1(X,Y) through the touch sensing function and execute a process (e.g., an input, selection, or execution of an application program) according to a result of the sensing.

When the user radiates light to any point P2(X,Y) on the display panel DSP using a beam generator BG, the display device may sense the beam radiation to the point P2(X,Y) through the photo sensing function and execute a process (e.g., an input, selection, or execution of an application program) according to a result of the sensing.

The beam generator BG may be included in, e.g., a laser pointer or remote controller. The beam generator BG may output highly straight light beams. For example, the beam generator BG may output laser beams. Here, as an example, various wavelengths of, or various colors of, laser beams may be emitted from the beam generator BG.

The display device may include a display panel DISP, a data driving circuit DDC, a gate data driving circuit GDC, and a display controller DCTR to provide the display function.

The display device may include the display panel DISP, a photo driving circuit PDC, a multi-sensing circuit MSC, and a multi-controller MCTR to provide the multi-sensing function including the touch sensing function and the photo sensing function.

Referring to FIG. 1, the display panel DISP may have a plurality of data lines DL, a plurality of gate lines GL, and a plurality of subpixels SP arranged to provide the display function.

The plurality of data lines DL and the plurality of gate lines GL may be arranged in different directions and overlap with each other. The plurality of data lines DL may be arranged in a first direction (e.g., the column or row direction), and the plurality of gate lines GL may be arranged in a second direction (e.g., the row or column direction) different from the first direction. It is hypothesized below that the plurality of data lines DL are arranged in the column direction (e.g., vertical direction), and the plurality of gate lines GL are arranged in the row direction (e.g., horizontal direction).

The plurality of subpixels SP each may have a driving transistor and a pixel electrode. The driving transistor may be turned on by a scan signal SCAN applied to its gate electrode through the gate line GL and may apply a data signal Vdata applied through the data line DL to the pixel electrode.

For the multi-sensing function, the display panel DISP may include, e.g., a plurality of common electrodes COM, a plurality of readout lines ROL, a plurality of photo sensors PS, a plurality of photo driving lines PDL, and a plurality of photo control lines PCL.

The touch sensing configuration of the display device may include a plurality of common electrodes COM that function as touch sensors. The touch sensing configuration may include the readout lines ROL electrically connected with the plurality of common electrodes COM in addition to the plurality of common electrodes COM which function as touch sensors (e.g., touch electrodes).

The display device may sense a touch based on self-capacitance or mutual-capacitance. It is hypothesized below that a touch is sensed based on self-capacitance for ease of description.

Meanwhile, for example, each common electrode COM may be shaped as an opening-free plate, a mesh with openings, or to have one or more bends.

The photo sensing configuration of the display device may include a plurality of photo sensors PS. Each of the plurality of photo sensors PS may include a photo transistor PHT. In some cases, each of the plurality of photo sensors PS may further include a photo capacitor Cs.

The photo sensing configuration may include, in addition to the plurality of photo sensors PS, a plurality of photo driving lines PDL and a plurality of photo control lines PCL for transferring photo driving signals Vdrv and photo control signals Vsto to the plurality of photo transistors PHT and, in some cases, may further include common electrodes COM and readout lines ROL.

Each of the plurality of photo transistors PHT may include, e.g., a gate electrode PG to which the photo control signal Vsto is applied, a first electrode PE1 to which the photo driving signal Vdrv is applied, and a second electrode PE2 which is a signal output node.

The photo capacitor Cs may be electrically connected between the gate electrode PG and second electrode PE2 of the photo transistor PHT. The photo capacitor Cs may be present per photo sensor PS or may not be present.

The photo control signal Vsto may be applied through the photo control line PCL to the gate electrode PG of the photo transistor PHT. The photo driving signal Vdrv may be applied through the photo driving line PDL to the first electrode PE1 of the photo transistor PHT. Each of the plurality of photo transistors PHT may output a signal Vs to the second electrode PE2 in response to the light radiated.

In the area of each common electrode COM, two or more photo transistors PHT may be disposed.

The respective second electrodes PE2 of the two or more photo transistors PHT disposed in each common electrode COM may be electrically connected with the common electrode COM.

Thus, the signal Vs output from each photo transistor PHT to the second electrode PE2 in response to the radiated light may be transferred through the common electrode COM to the corresponding readout line ROL.

Among the multi-sensing function-related components of the display panel DISP, which may be divided depending on the touch sensing function and the photo sensing function, the plurality of photo transistors PHT, a plurality of photo driving lines PDL, and a plurality of photo control lines PCL are components related to the photo sensing function alone, and the plurality of common electrodes COM and a plurality of readout lines ROL, although basically related to the touch sensing function, are also essential components for the photo sensing function.

The driving circuits for the display function and multi-sensing function are described below.

First, the display driving circuits for the display function may include a data driving circuit DDC for driving the plurality of data lines DL, a gate driving circuit GDC for driving the plurality of gate lines GL, and a display controller DCTR for controlling the operation of the data driving circuit DDC and the gate driving circuit GDC, and the display driving circuits may further include a multi-sensing circuit MSC for driving the plurality of common electrodes COM.

The display controller DCTR supplies various control signals DCS and GCS to the data driving circuit DDC and the gate driving circuit GDC to control the data driving circuit DDC and the gate driving circuit GDC.

The display controller DCTR starts scanning according to a timing implemented in each frame, converts input image data input from the outside into digital image data DATA suited for the data signal format used in the data driving circuit DDC, outputs the digital image data DATA, and controls data driving at an appropriate time suited for scanning.

The gate driving circuit GDC sequentially supplies gate signals (or scan signals) of On or Off voltage to the plurality of gate lines GL under the control of the display controller DCTR.

When a specific gate line GL is opened by the gate driving circuit GDC, the data driving circuit DDC converts image data signals received from the display controller DCTR into image analog signals and supplies data signals Vdata corresponding to the image analog signals to the plurality of data lines DL.

The display controller DCTR may be a timing controller used in typical display technology, a control device that performs other control functions as well as the functions of the timing controller, or a control device other than the timing controller.

The display controller DCTR may be implemented as a separate component from the data driving circuit DDC, or the display controller DCTR, along with the data driving circuit DDC, may be implemented as an integrated circuit.

The data driving circuit DDC drives a plurality of data lines DL by supplying data signals Vdata to a plurality of data lines DL. Here, data driving circuit DDC is also referred to as a 'source driver.'

The data driving circuit DDC may include at least one source driver integrated circuit (SDICs). Each source driver integrated circuit (SDIC) may include a shift register, a latch circuit, a digital-to-analog converter (DAC), and an output buffer circuit. In some cases, each source driver integrated circuit (SDIC) may further include an analog-digital converter ADC.

Each source driver integrated circuit (SDIC) may be connected to the display panel DISP, e.g., in a tape automated bonding (TAB) scheme, chip-on-glass (COG) scheme, or chip-on-film (COF) scheme.

The gate driving circuit GDC sequentially supplies scan signals SCAN to the plurality of gate lines GL, sequentially driving the plurality of gate lines GL. Here, gate driving circuit GDC is also referred to as a 'scan driver.'

Here, the scan signal SCAN is constituted of an off-level gate voltage to allow the gate line GL to close and an on-level gate voltage to allow the gate line GL to open.

The gate driving circuit GDC may include at least one gate driver integrated circuit (GDIC). Each gate driver integrated circuit GDIC may include, e.g., a shift register and a level shifter.

Each gate driver integrated circuit GDIC may be connected to the display panel DISP, e.g., in a chip-on-glass (COG) scheme or chip-on-film (COF) scheme and may be implemented in a gate-in-panel (GIP) type and embedded in the display panel DISP.

The data driving circuit DDC may be positioned on only one side (e.g., the top or bottom side) of the display panel DISP as shown in FIG. 1 and, in some cases, the data driving circuit DDC may be positioned on each of two opposite sides (e.g., both the top and bottom sides) of the display panel DISP depending on driving schemes or panel designs.

The gate driving circuit GDC may be positioned on only one side (e.g., the left or right side) of the display panel DISP as shown in FIG. 1 and, in some cases, the gate driving circuit GDC may be positioned on each of two opposite sides (e.g., both the left and right sides) of the display panel DISP depending on driving schemes or panel designs.

According to embodiments of the disclosure, the display device may be one of various types of display devices, such as liquid crystal display devices, organic light emitting display devices, or quantum dot display devices. According to embodiments of the disclosure, the display panel DISP may be one of various types of display panels, such as liquid crystal display panels, organic light emitting display panels, or quantum dot display panels.

Each subpixel SP disposed in the display panel DISP may include one or more circuit elements (e.g., transistors or capacitors).

For example, when the display panel DISP is a liquid crystal display panel, each subpixel SP may include a pixel electrode and a driving transistor electrically connected between the pixel electrode and the data line DL. The driving transistor may be turned on by the scan signal SCAN supplied through the gate line GL to the gate electrode and, when turned on, output the data signal supplied through the data line DL to the source electrode (or drain electrode) to the drain electrode (or source electrode), applying the data signal Vdata to the pixel electrode electrically connected to the drain electrode (or source electrode). An electric field may be created between the pixel electrode supplied the data signal Vdata and the common electrode COM supplied the common voltage Vcom, and a capacitance may be created between the pixel electrode and the common electrode COM.

The structure of each subpixel SP may be varied depending on panel types, functions provided, and design schemes.

Next, the multi-driving circuits for the multi-sensing function may include, e.g., a multi-sensing circuit MSC, a photo driving circuit PDC, and a multi-controller MCTR.

The multi-sensing circuit MSC may be electrically connected with the plurality of common electrodes COM arranged on the display panel DISP through the plurality of readout lines ROL arranged on the display panel DISP.

The photo driving circuit PDC may drive the plurality of photo driving lines PDL and the plurality of photo control lines PCL for transferring the photo driving signals Vdrv and photo control signals Vsto to the plurality of photo transistors PHT arranged on the display panel DISP.

The multi-controller MCTR may receive sensing data from the multi-sensing circuit MSC, detect the presence or absence of a touch and/or the coordinates of the touch, or the presence or absence of a light radiation and/or the coordinates of the light radiation (which are the position designated by the user's light radiation and also referred to as photo coordinates).

Further, the multi-controller MCTR may control the respective driving timings of the multi-sensing circuit MSC and the photo driving circuit PDC.

The multi-sensing circuit MSC may drive the plurality of common electrodes COM and sense the plurality of common electrodes COM. In other words, the multi-sensing circuit MSC may drive the plurality of common electrodes COM by supplying touch driving signals TDS to the plurality of common electrodes COM through the plurality of readout lines ROL.

The photo driving circuit PDC may drive the plurality of photo driving lines PDL and the plurality of photo control lines PCL. In other words, the photo driving circuit PDC may drive the plurality of photo control lines PCL by outputting photo control signals Vsto to the plurality of photo control lines PCL and drive the plurality of photo driving lines PDL by outputting photo driving signals Vdrv to the plurality of photo driving lines PDL.

Thus, the photo control signals Vsto may be applied to the gate electrodes PG of the plurality of photo transistors PHT through the plurality of photo control lines PCL. The photo driving signals Vdrv may be applied to the first electrodes PE1 of the plurality of photo transistors PHT through the plurality of photo driving lines PDL.

Further, the multi-sensing circuit MSC may sense the plurality of common electrodes COM by detecting the signal ROS from each of the plurality of common electrodes COM through the plurality of readout lines ROL. Here, the signal ROS detected from the common electrode COM through the readout line ROL indicates the electrical state of the common electrode COM.

The signal ROS detected by the multi-sensing circuit MSC may be a signal generated according to a touch of the user's finger or a pen. This signal may be a signal to read out the presence or absence of a touch and/or the coordinates of the touch.

Or, the signal ROS detected by the multi-sensing circuit MSC may be a signal output from the photo transistor PHT disposed in the position to which light is radiated in the display panel DISP. This signal may be a signal to figure out the presence or absence of a light radiation and/or the position of the light radiation (e.g., the position designated by the user's light radiation).

The multi-sensing circuit MSC may generate sensing data based on the signals ROS detected through the plurality of readout lines ROL and output the sensing data to the multi-controller MCTR.

The multi-controller MCTR may sense the presence or absence of a touch or the coordinates of the touch on the display panel DISP based on the sensing data or may sense the presence or absence of a light radiation or the coordinates of the light radiation (e.g., photo coordinates) on the display panel DISP and output sensing result information.

A basic multi-sensor configuration is described with reference to FIG. 2. The common electrode COM may correspond to the touch sensor, and the photo transistor PHT and the photo capacitor Cs may correspond to the photo sensor PS.

Referring to FIG. 2, the plurality of common electrodes COM may include, e.g., a first common electrode COM1 and a second common electrode COM2 which are arranged in the same column. The plurality of readout lines ROL may include, e.g., a first readout line ROL1 to electrically connect the first common electrode COM1 and the multi-sensing circuit MSC and a second readout line ROL2 to electrically connect the second common electrode COM2 and the multi-sensing circuit MSC.

In the area of the first common electrode COM1, two or more photo transistors PHT may be disposed. The respective second electrodes PE2 of the two or more photo transistors PHT disposed in the first common electrode COM1 may be electrically connected with the first common electrodes COM1.

In the area of the second common electrode COM2, two or more photo transistors PHT may likewise be disposed. The respective second electrodes PE2 of the two or more photo transistors PHT disposed in the second common electrode COM2 may be electrically connected with the second common electrodes COM2.

The first readout line ROL1 may overlap both the first common electrode COM1 and the second common electrode COM2. However, the first readout line ROL1 may be electrically connected with the first common electrode COM1 via a contact hole CNT_COM_ROL but be insulated from the second common electrode COM2.

The second readout line ROL2 may overlap both the first common electrode COM1 and the second common electrode COM2. However, the second readout line ROL2 may be electrically connected with the second common electrode COM2 via a contact hole CNT_COM_ROL but be insulated from the first common electrode COM1.

Since the first common electrode COM1 and the second common electrode COM2 are disposed in the same column, the same two or more data lines DL may overlap the first common electrode COM1 and the second common electrode COM2.

The first readout line ROL1 and the second readout line ROL2 may be disposed in the same direction as the two or more data lines DL.

Figure 3:
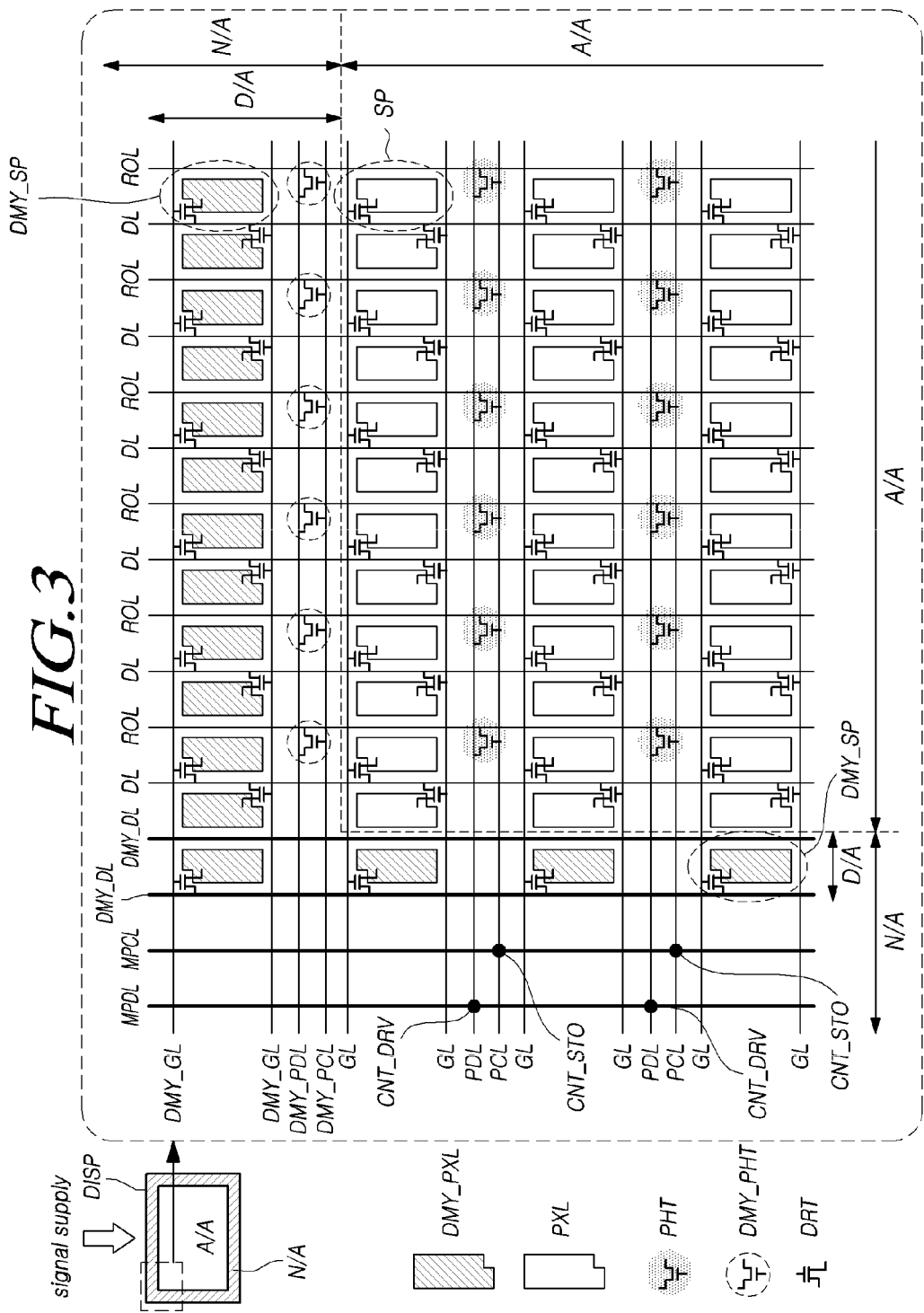
FIGS. 3 and 4 are plan views illustrating a basic structure of a display panel according to embodiments of the disclosure.
Figure 4:
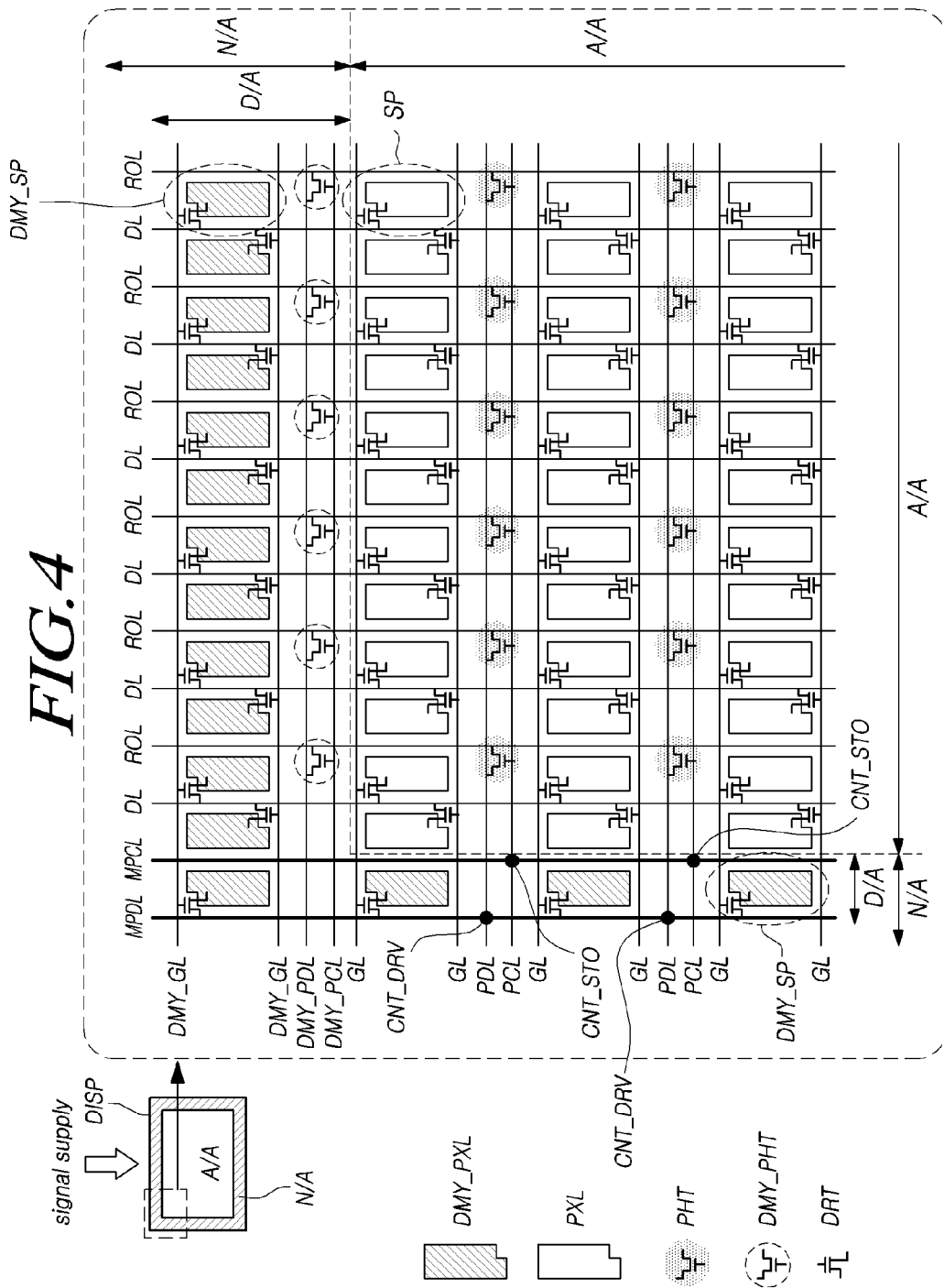

FIGS. 3 and 4 are plan views illustrating a basic structure of a display panel DISP according to embodiments of the disclosure.

Referring to FIGS. 3 and 4, the display panel DISP includes an active area A/A corresponding to a display area and a non-active area N/A which is a non-display area around the active area A/A.

FIGS. 3 and 4 are plan views illustrating a top-left area of the display panel DISP, in which a portion of the active area A/A and a portion of the non-active area N/A are positioned. The top-left area is an area in which various signals (e.g., data signals, gate driving-related voltages, common voltages, photo driving signals, or photo control signals) are supplied through, e.g., the data driving circuit DDC and a printed circuit board.

Referring to FIGS. 3 and 4, the display panel DISP may have a plurality of data lines DL and a plurality of readout lines ROL arranged in the column direction (e.g., vertical direction) and a plurality of gate lines GL, a plurality of photo driving lines PDL, and a plurality of photo control lines PCL arranged in the row direction (e.g., horizontal direction).

Referring to FIGS. 3 and 4, a plurality of subpixels SP are arranged in a matrix type in the active area A/A. Each of the plurality of subpixels SP may include a pixel electrode PXL and a driving transistor DRT. The driving transistor DRT may be turned on by a scan signal SCAN applied to its gate electrode through the gate line GL and may apply a data signal Vdata applied through the data line DL to the pixel electrode PXL.

A plurality of photo transistors PHT may be disposed in the active area A/A.

One photo transistor PHT may be assigned per subpixel SP or per two or more subpixels SP.

Thus, one photo driving line PDL may be assigned per subpixel SP or per two or more subpixels SP. One photo control line PCL may be assigned per subpixel SP or per two or more subpixels SP.

For example, one or more rows of photo transistors PHT may be arranged per subpixel row as shown in FIGS. 3 and 4. In other words, one or more rows of photo transistors PHT may be arranged in each inter-subpixel row space. In this case, one or more photo driving lines PDL and one or more photo control lines PCL may be disposed in each inter-subpixel row space.

As another example, one or two rows of photo transistors PHT may be disposed in each inter-subpixel row space. For example, where a first subpixel row, a second subpixel row, a third subpixel row, and a fourth subpixel row are arranged in order, one or more rows of photo transistors PHT may be disposed between the first subpixel row and the second subpixel row, no photo transistors PHT may be disposed between the second subpixel row and the third subpixel row, and one or more rows of photo transistors PHT may be disposed between the third subpixel row and the fourth subpixel row. In this case, one or more photo driving lines PDL and one or more photo control lines PCL may be disposed between the first subpixel row and the second subpixel row, no photo driving line PDL and no photo control line PCL may be disposed between the second subpixel row and the third subpixel row, and one or more photo driving lines PDL and one or more photo control lines PCL may be disposed between the third subpixel row and the fourth subpixel row.

Referring to FIGS. 3 and 4, photo transistors PHT, one or more photo driving lines PDL, and one or more photo control lines PCL may be disposed between two gate lines GL.

Referring to FIGS. 3 and 4, the non-active area N/A may include a dummy pixel area D/A in which one or more dummy subpixel rows are disposed.

The dummy pixel area D/A may be provided on one or both of two opposite sides of the active area A/A or be provided on all of the sides of the active area A/A.

A plurality of dummy subpixels DMY_SP included in one or more dummy subpixel rows, each, may include a dummy pixel electrode DMY_PXL. Each of the plurality of dummy subpixels DMY_SP may further include a driving transistor DRT.

One or more dummy subpixel rows are designed in the same manner as the subpixel row in the active area A/A. In other words, dummy gate lines DMY_GL and dummy pixel electrodes DMY_PXL are disposed and, in some cases, dummy data lines DMY_DL may be disposed.

Here, the dummy data line DMY_DL may be formed of the same material as the data line DL and/or the common electrode COM. The dummy gate line DMY_GL may be formed of the same material as the gate line GL.

In the driving transistor DRT disposed in each of the plurality of dummy subpixels DMY_SP, the gate electrode may be connected with the dummy gate line DMY_GL, the source electrode (or drain electrode) may be connected with the dummy data line DMY_DL, and the drain electrode (or source electrode) may be connected with the dummy pixel electrode DMY_PXL. The driving transistor DRT disposed in each of the plurality of dummy subpixels DMY_SP may be turned on or off or may remain in the off state. The dummy gate line DMY_GL may be supplied the same type of signal as the scan signal SCAN applied to the active area A/A, or be in a floating state, or remain supplied a turn-off level voltage (e.g., a low level voltage).

Placement of the dummy pixel area D/A outside the active area A/A may lead to such effects as preventing light leaks, static electricity, or rubbing stains.

Meanwhile, also in the dummy pixel area D/A in the non-active area N/A, dummy photo transistors DMY_PHT may be disposed, and a dummy photo driving line DMY_PDL and a dummy photo control line DMY_PCL may be disposed.

In other words, the dummy photo transistors DMY_PHT, the dummy photo driving line DMY_PDL, and the dummy photo control line DMY_PCL may be disposed between the active area A/A and the dummy gate line DMY_GL or dummy pixel electrodes DMY_PXL.

Meanwhile, referring to FIG. 3, given the position of signal supply, a main photo driving line MPDL and a main photo control line MPCL in the column direction (e.g., vertical direction) may be disposed in the non-active area N/A to transfer the photo driving signal Vdrv and photo control signal Vsto introduced to the display panel DISP to the plurality of photo driving lines PDL and the plurality of photo control lines PCL arranged in the row direction (e.g., horizontal direction).

The main photo driving line MPDL disposed in the non-active area N/A is connected with the photo driving lines PDL disposed in the row direction (e.g., vertical direction) through a plurality of contact holes CNT_DRV. The main photo control line MPCL disposed in the non-active area N/A is connected with the photo control lines PCL disposed in the row direction (e.g., horizontal direction) through a plurality of contact holes CNT_STO.

Referring to FIG. 3, since the dummy subpixels DMY_SP including the dummy pixel electrodes DMY_PXL in the non-active area N/A are positioned most adjacent to the active area A/A, the main photo driving line MPDL and the main photo control line MPCL may be disposed more outside than the dummy subpixels DMY_SP or the dummy data line DMY_DL. This results in the non-active area N/A widening. In other words, when the dummy pixel area D/A is present, and the photo sensing configuration is disposed in the active area A/A, the main photo driving line MPDL and the main photo control line MPCL are obliged to be disposed outside of the dummy pixel area D/A, and the bezel thus ends up with an increased size.

Referring to FIG. 4, when the dummy pixel area D/A is present in the non-active area N/A, the dummy data lines DMY_DL connected with the source electrodes (or drain electrodes) of the respective driving transistors DRT of the dummy subpixels DMY_SP are used as the main photo driving line MPDL and the main photo control line MPCL, eliminating the need for adding column-wise wires for delivery of the photo driving signal Vdrv and photo control signal Vsto in the non-active area N/A. This may prevent an increase in the bezel size due to the main photo driving line MPDL and the main photo control line MPCL.

In such a case, at least one of the main photo driving line MPDL and the main photo control line MPCL may be connected to a plurality of dummy subpixels DMY_SP. In other words, at least one of the main photo driving line MPDL and the main photo control line MPCL may be connected with the source electrode (or drain electrode) of the driving transistor DRT included in each of the plurality of dummy subpixels DMY_SP.

Further, in such a case, the main photo driving line MPDL and the main photo control line MPCL may be formed of the same material as the data line DL.

Referring to FIG. 4, the photo driving line PDL and the photo control line PCL are disposed in the same direction as the gate line GL. The main photo driving line MPDL and the main photo control line MPCL may be disposed in the same direction as the data line DL which overlaps with the gate line GL.

Meanwhile, for ease of description, the common electrodes COM electrically connected with the readout lines ROL are omitted from FIGS. 3 and 4. The size of the area of each common electrode COM may be larger than the area of two subpixels SP. The structure of the common electrode COM is described below in greater detail.

According to embodiments of the disclosure, in a case where the display device performs double rate driving (DRD) to reduce the number of channels, the display panel DISP has a structure in which one gate line GL is disposed on each of the top and bottom of the subpixel row, and one data line DL is shared by two subpixel columns as shown in FIG. 4.

According to embodiments of the disclosure, the plurality of subpixels SP disposed in the display panel DISP may include a red subpixel, a green subpixel, and a blue subpixel. According to embodiments of the disclosure, each of the plurality of subpixels SP may have a red color filter (pigment), a green color filter (pigment), or a blue color filter (pigment) to implement its corresponding color. In this case, the red color filter (pigment), green color filter (pigment), and blue color filter (pigment) may be disposed on a color filter substrate, may be disposed on a thin film transistor array substrate.

In this case, a photo transistor PHT may be disposed to overlap the area where each red color filter (pigment), green color filter (pigment), or blue color filter (pigment) is disposed. Described below is an example in which the light, e.g., a laser beam, emitted from the beam generator BG is incident onto each color filter earlier than the photo transistor PHT.

When the light emitted from the beam generator BG has a specific color, the photo transistors PHT disposed to overlap the color filters with the same or similar color to the color of the emitted light would react primarily and are used for photo sensing.

For example, when the light emitted from the beam generator BG is light of a red wavelength band, the light may be incident through each red color filter (pigment), green color filter (pigment), or blue color filter (pigment) to the photo transistor PHT overlapping the blue color filter (pigment), green color filter (pigment), or blue color filter (pigment). Among others, the red photo transistor PHT disposed to overlap the red color filter reacts to the light, creating a leaking current. However, the photo transistors disposed to overlap the green color filter and blue color filter are less reactive to the light and produce a relatively small leaking current. This is why the red wavelength band of light relatively hardly passes through the green color filter and blue color filter. Thus, if the light incident to the area pointed at in the display panel is light of a red wavelength band, one or more photo transistors PHT disposed to overlap the red color filter are primarily reactive to create a leaking current and may be used for photo sensing and to grasp the position of the light radiation.

Figure 5:
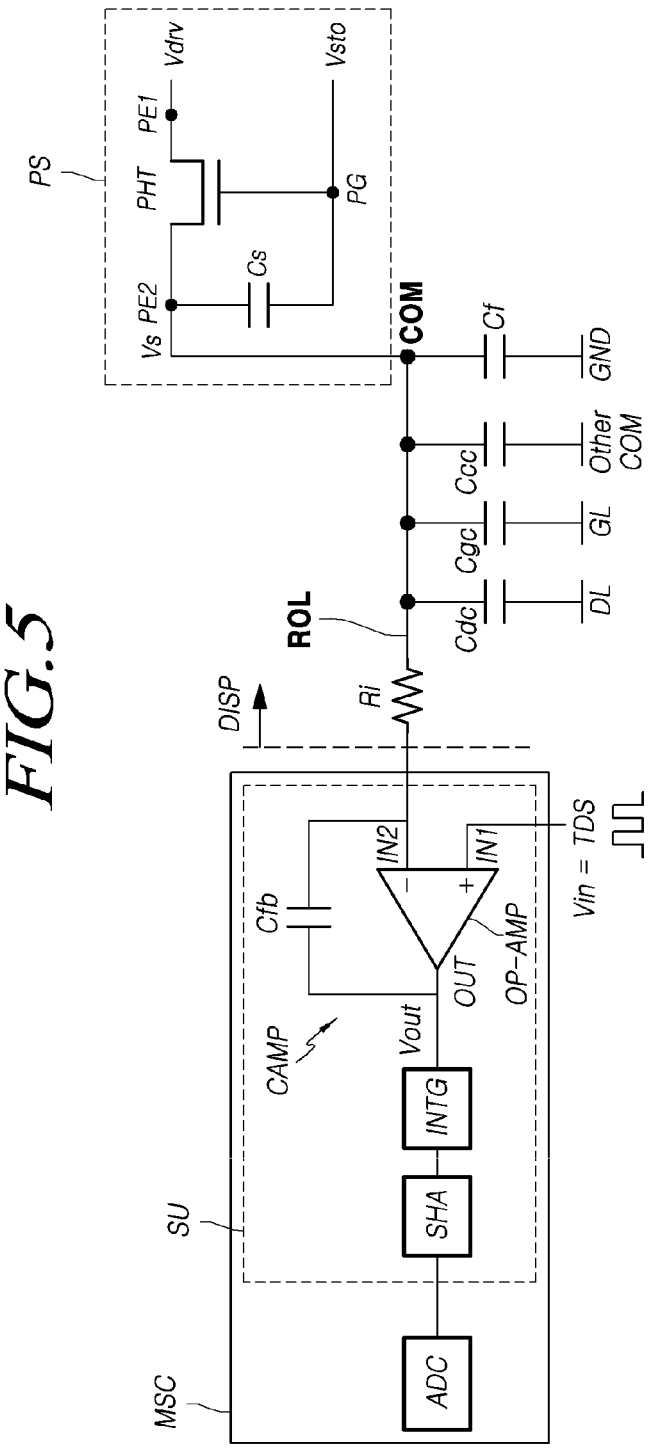
FIG. 5 is a view illustrating a multi-sensing system according to embodiments of the disclosure.
Figure 6:
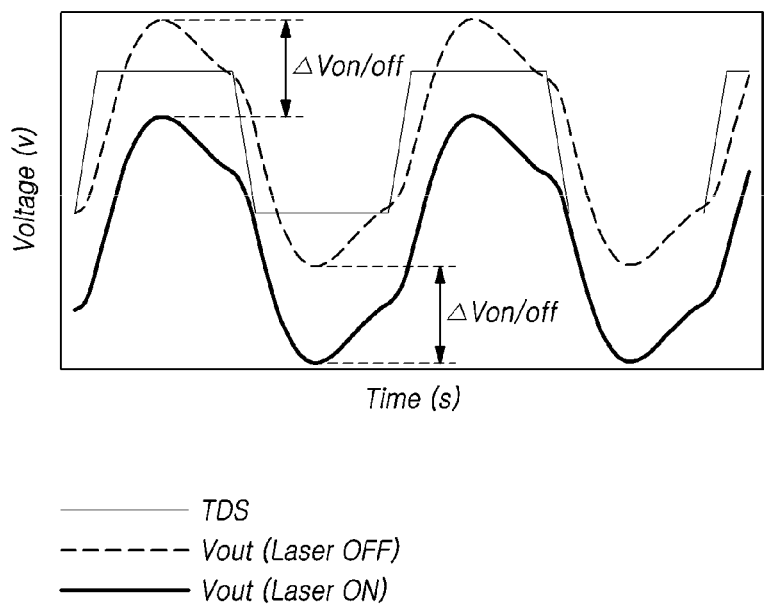
FIG. 6 is a graph illustrating an output signal from a photo transistor depending on whether it is irradiated with light according to embodiments of the disclosure.

FIG. 5 is a view illustrating a multi-sensing system according to embodiments of the disclosure. FIG. 6 is a graph illustrating an output signal Vs from a photo transistor PHT depending on the presence or absence of a light radiation in a display device according to embodiments of the disclosure.

Referring to FIG. 5, the multi-sensing system, according to embodiments of the disclosure, may include a photo sensor PS including, e.g., a photo transistor PHT, a common electrode COM that plays a role as a touch sensor, and a multi-sensing circuit MSC that senses the photo sensor PS and the common electrode COM.

The photo sensor PS is connected with the common electrode COM, and the common electrode COM is connected with the multi-sensing circuit MSC through a readout line ROL. Thus, the readout line ROL is a common wire for the multi-sensing circuit MSC to sense the photo sensor PS and the common electrode COM.

The multi-sensing circuit MSC may include a plurality of sensing units U and one or more analog-to-digital converters ADC.

Each of the plurality of sensing units U may include a charge amplifier CAMP, an integrator INTG that integrates the output signal Vout from the charge amplifier CAMP and outputs the resultant integral, and a sample-and-hold circuit SHA that stores the integral from the integrator INTG.

The charge amplifier CAMP may include an operational amplifier OP-AMP that includes a first input terminal IN1 to which a touch driving signal TDS, as an input signal Vin, is input, a second input terminal IN2 connected with a first multiplexer MUX1, and an output terminal OUT that outputs an output signal Vout and a feedback capacitor Cfb connected between the second input terminal IN2 and the output terminal OUT. The first input terminal IN1 may be a non-inverting input terminal, and the second input terminal IN2 may be an inverting input terminal.

The multi-sensing circuit MSC may further include a first multiplexer that selectively connects some of the plurality of common electrodes COM to the plurality of sensing units U and a second multiplexer that selectively connects some of the plurality of sensing units U to the analog-to-digital converter ADC.

First, touch sensing is described. When a touch occurs, the multi-sensing circuit MSC may sense a variation in the finger capacitance Cf of each common electrode COM, detecting the presence or absence of the touch and/or the coordinates of the touch.

The multi-sensing circuit MSC may sense a load increment (Cf increment) due to the finger capacitance Cf, before and after touched, via a voltage difference Vout-Vin between the touch driving signal TDS applied to the common electrode COM playing a role as the touch sensor (e.g., touch electrode) and the output signal Vout from the charge amplifier CAMP.

The multi-sensing circuit MSC converts the voltage difference Vout-Vin accumulated using the integrator INTG within the touch sensing time into a digital sensing value using the analog-to-digital converter ADC to generate sensing data and outputs the sensing data. The multi-controller MCTR may sense the touch using the sensing data.

Next, photo sensing is described.

In photo sensing according to embodiments of the disclosure, in a case where the photo transistor PHT is irradiated with light, with the photo transistor PHT turned off, when a leaking current (or off current) is generated at the photo transistor PHT by the photo reaction of the photo transistor PHT, electric charge accumulated in the photo capacitor Cs by the occurrence and increase in the leaking current may be sensed based on the voltage difference Vout-Vin between the output signal Vout from the charge amplifier CAMP and the touch driving signal TDS applied to the common electrode COM. Here, the photo capacitor Cs may be omitted. Even without the photo capacitor Cs, charging may be performed by the capacitance component of the second electrode PE2 of the photo transistor PHT.

For photo sensing, the photo transistor PHT, in one or more embodiments, is in the turn-off state. Thus, the photo control signal Vsto applied to the gate electrode PG of the photo transistor PHT has a turn-off level voltage that may turn off the photo transistor PHT.

For touch sensing and photo sensing both, the common electrode COM and the readout line ROL are jointly used. Further, the multi-sensing circuit MSC detects the electrical state (charge, capacitance) of the common electrode COM through the readout line ROL and performs touch sensing and photo sensing. The readout line ROL is a shared signal wire for touch sensing and photo sensing.

Upon photo sensing, the output signal Vs from the photo transistor PHT is added to a reference voltage (e.g., pulse form), causing a voltage difference (Vout-Vin) for photo sensing. Here, the reference voltage is a pulsed voltage in the state where no change is made by the touch and photo transistor PHT and is the same as the output value Vout of the charge amplifier CAMP and the input signal Vin corresponding to the touch driving signal TDS (voltage difference=0).

FIG. 6 illustrates a result of sensing simulation that uses laser beams as the light radiation in the environment where the second electrodes PE2 of about 70 photo transistors PHT are connected to one common electrode COM.

Referring to FIG. 6, in the case of laser sensing, the center value of the output signal Vout from the charge amplifier CAMP is moved down by the on/off of the laser.

When a leaking current (off current) is created from the photo transistor PHT by the laser radiation, electric charge is introduced to the second input terminal IN2 of the operational amplifier OP-AMP in the sensing unit U and is accumulated in the feedback capacitor Cfb, raising the electric potential. From the operational amplifier OP-AMP standpoint, the second input terminal IN2 is the inverting input terminal. In other words, when the electric potential is increased by the leaking current (off current), the overall value of the output signal Vout may be resultantly reduced as shown in FIG. 6.

Thus, as shown in FIG. 6, the output signal Vout when the light is radiated is ΔVon/off lower in voltage level than the output signal Vout when no light is radiated.

However, since the output signal Vout when the light is radiated has no influence on the gain of the operational amplifier OP-AMP as is the case on the finger capacitance Cf for touch sensing, the amplitude of the output signal Vout remains the same, only with the center value moved down.

Thus, the output signal Vout when there is a light radiation and the output signal Vout when there is no light radiation may have the same or similar signal waveforms (e.g., frequency, phase, amplitude, or the like). The output signal Vout when there is a light radiation and the output signal Vout when there is no light radiation may have the same signal waveform as the touch driving signal TDS.

Meanwhile, referring to FIG. 5, when the touch driving signal TDS is applied to the common electrode COM during the driving period for multi-sensing, the common electrode COM, along with the data line DL, gate line GL, or other common electrode COM in the display panel DISP, may form a parasite capacitance (Cdc, Cgc, or Ccc). Such parasite capacitances Cdc, Cgc, and Ccc are the cause of deteriorated touch sensitivity.

Thus, the display device according to embodiments of the disclosure may perform load free driving (LFD) which prevents a buildup of parasite capacitance (Cdc, Cgc, or Ccc) between the common electrode COM and other patterns (DL, GL Other COM) in the display panel DISP when the touch driving signal TDS is applied to the common electrode COM.

Upon LFD driving, the same or similar LFD signal to the touch driving signal TDS applied to the common electrode COM may be applied to the other patterns (DL, GL Other COM) in the display panel DISP. The LFD signal corresponds to one or more of, e.g., the frequency, phase, and amplitude (ΔV) of the touch driving signal TDS. Thus, the electric potential between the common electrode COM and the other patterns (DL, GL Other COM) in the display panel DISP is gone, thus preventing the parasite capacitance Cdc, Cgc, or Ccc.

Figure 7:
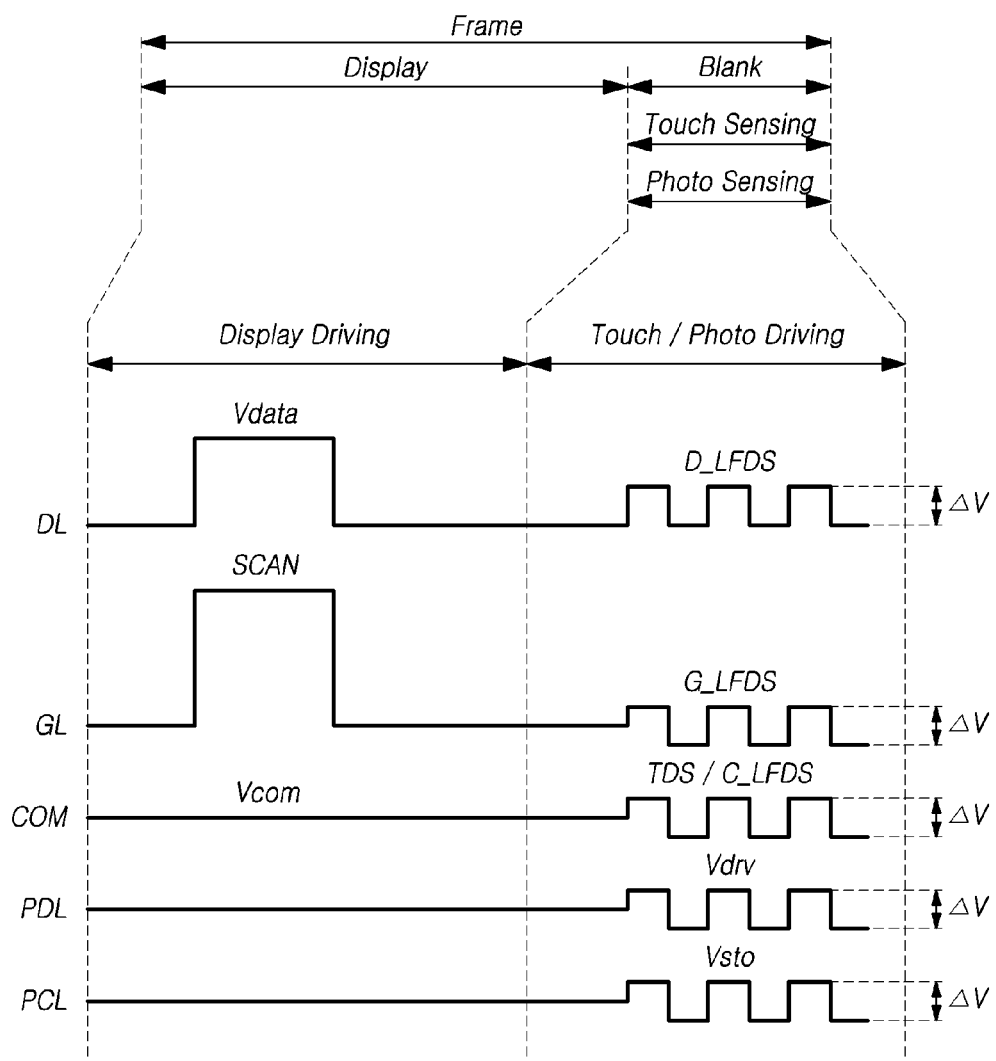
FIG. 7 is a diagram illustrating driving timings of a display device according to embodiments of the disclosure.

FIG. 7 is a diagram illustrating driving timings of a display device according to embodiments of the disclosure.

Referring to FIG. 7, the display device according to embodiments of the disclosure may perform displaying and multi-sensing (e.g., touch sensing and photo sensing) in different time periods.

For example, the display device may perform display driving during an active time within one frame time and perform multi-sensing during a blank time. During the blank time, touch sensing and photo sensing are performed simultaneously.

Referring to FIG. 7, during a display driving period, the data signal Vdata, scan signal SCAN, and common voltage Vcom may be applied to the data line DL, gate line GL, and all the common electrodes COM, respectively.

During the display driving period, the photo driving line PDL and the photo control line PCL may be in the floating state or may be supplied the common voltage Vcom, ground voltage, or a voltage which does not affect display driving-related wires or electrodes.

In other words, during the display driving period, the multi-sensing circuit MSC outputs the common voltage Vcom with a predetermined voltage level (or a selected voltage level) to the plurality of common electrodes COM through the plurality of readout lines ROL. The photo driving circuit PDC may float the photo driving line PDL and photo control line PCL or output the photo driving signal Vdrv and photo control signal Vsto with a predetermined voltage level (or a selected voltage level) to the photo driving line PDL and photo control line PCL. Here, during the display driving period, the photo driving signal Vdrv and photo control signal Vsto with the predetermined voltage level (or the selected voltage level) may be the same as the common electrode COM, e.g., a direct current (DC) voltage.

Referring to FIG. 7, during the blank period after the display driving period, touch driving for touch sensing and photo driving for photo sensing are simultaneously performed.

During the blank period, the multi-sensing circuit MSC outputs the touch driving signal TDS whose voltage level swings for touch sensing to the plurality of common electrodes COM through the plurality of readout lines ROL.

During the blank period, the photo driving circuit PDC outputs the photo control signal Vsto and photo driving signal Vdrv whose voltage level swings for photo sensing to the photo driving line PDL and the photo control line PCL.

During the blank period, the photo driving signal Vdrv and photo control signal Vsto may correspond, in at least one of the frequency, phase, and amplitude (ΔV), to the touch driving signal TDS.

By the similarity of signal features, the photo driving signal Vdrv and photo control signal Vsto play a role as a kind of LFD signal. In other words, the photo driving line PDL and photo control line PCL may not create an unnecessary parasite capacitance with the common electrode COM.

Since photo sensing uses the leaking current created at the photo transistor PHT by the light radiation, with the photo transistor PHT turned off, the maximum voltage level of the photo control signal Vsto whose voltage level swings should not be elevated to the level at which the photo transistor PHT is turned on during the blank period.

Thus, during the blank period, the photo control signal Vsto may swing within a turn-off voltage range in which the photo transistor PHT remains off.

Here, the touch driving signal TDS, photo driving signal Vdrv, and photo control signal Vsto whose voltage level is varied may be referred to as an alternating current (AC) signal, modulation signal, or pulse signal.

Meanwhile, during the blank period, for the LFD on the data line DL, an LFD signal D_LFDS which corresponds, in at least one of frequency, phase, and amplitude (ΔV), to the touch driving signal TDS, may be applied to the data line DL.

Further, during the blank period, for the LFD on the gate line GL, an LFD signal G_LFDS which corresponds, in at least one of frequency, phase, and amplitude (ΔV), to the touch driving signal TDS, may be applied to the gate line GL.

Further, during the blank period, for the LFD on the common electrode COM, an LFD signal C_LFDS which corresponds, in at least one of frequency, phase, and amplitude (ΔV), to the touch driving signal TDS applied to the common electrode COM which is a target for sensing, may be applied to the common electrode (Other COM) which is not the target for sensing.

Figure 8:
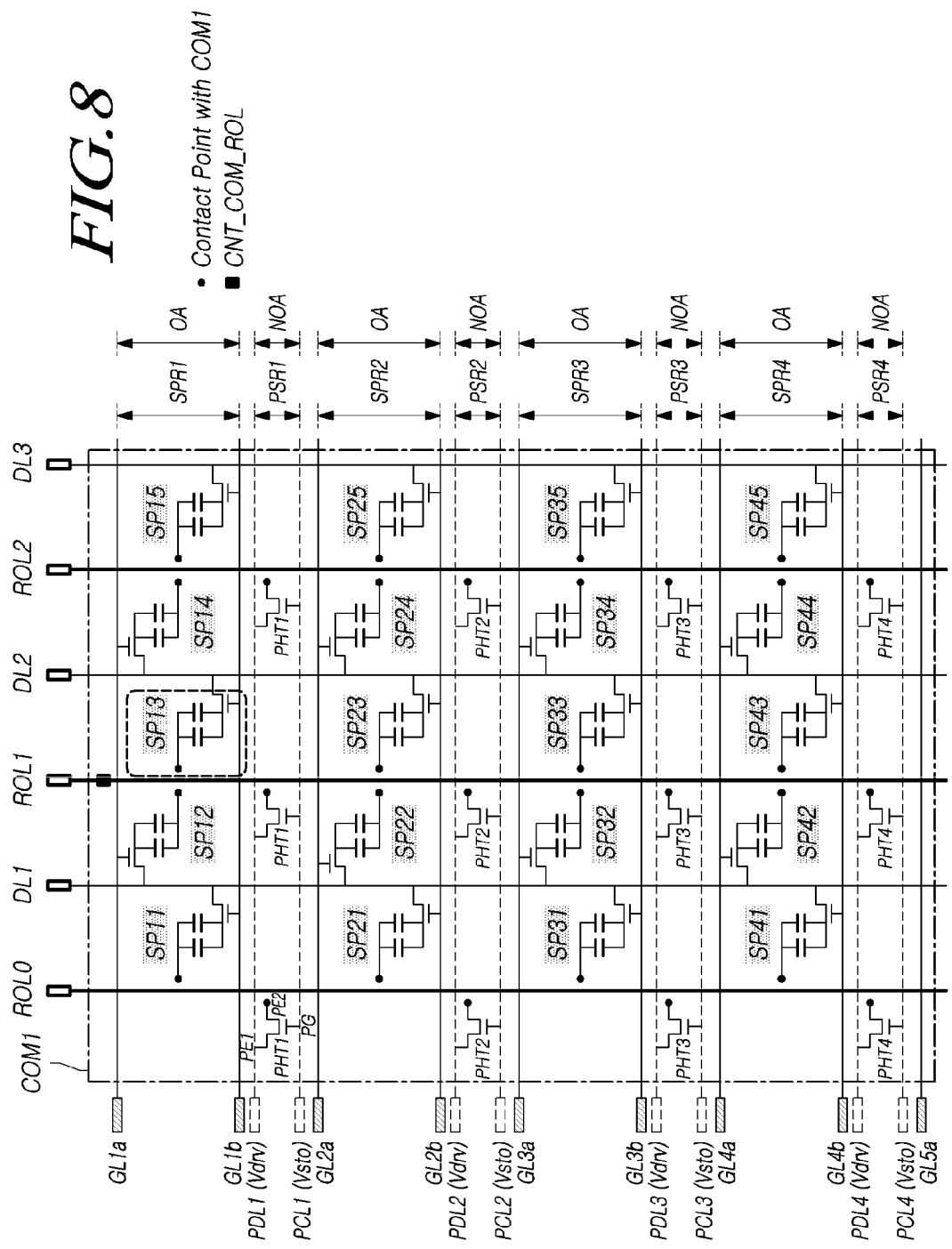
FIG. 8 is a layout view illustrating multi-sensing wires of a display panel according to embodiments of the disclosure.
Figure 9:
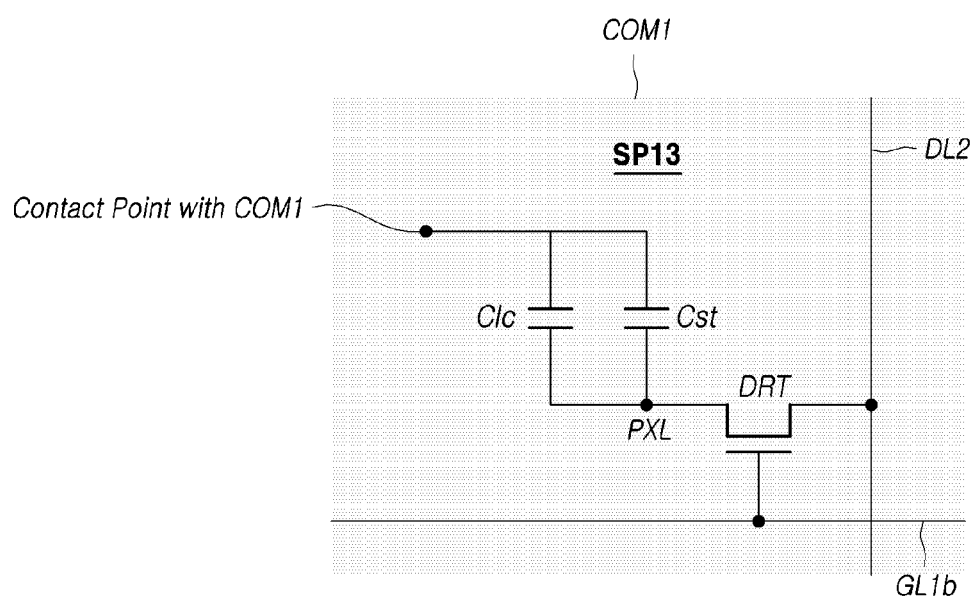
FIG. 9 is a view illustrating a subpixel circuit of a display panel according to embodiments of the disclosure.

FIG. 8 is a layout view illustrating multi-sensing wires PDL and PCL of a display panel DISP according to embodiments of the disclosure. FIG. 9 is a view illustrating a subpixel circuit of a display panel DISP according to embodiments of the disclosure.

FIG. 8 is a plan view more specifically illustrating an area where, of a first and second common electrode COM1 and COM2, a first common electrode COM1 is disposed, wherein it is hypothesized that a first subpixel row SPR1, a second subpixel row SPR2, a third subpixel row SPR3, and a fourth subpixel row SPR4 are arranged in order in the area where the first common electrode COM1 is disposed.

Referring to FIG. 8, each of the four subpixel rows SPR1, SPR2, SPR3, and SPR4 may include, e.g., five subpixels. The first subpixel row SPR1 includes subpixels SP11, SP12, SP13, SP14, and SP15, the second subpixel row SPR2 includes subpixels SP21, SP22, SP23, SP24, and SP25, the third subpixel row SPR3 includes subpixels SP31, SP32, SP33, SP34, and SP35, and the fourth subpixel row SPR4 includes subpixels SP41, SP42, SP43, SP44, and SP45.

Referring to FIG. 9, the structure of all the subpixels is described with reference to the third subpixel SP13 in the first subpixel row SPR1. The third subpixel SP13 may include a pixel electrode PXL and a driving transistor DRT.

The driving transistor DRT may be controlled to be turned on/off by the scan signal SCAN supplied from the second gate line GL1b and be connected between the second data line DL2 and the pixel electrode PXL. When the driving transistor DRT is turned on by the scan signal SCAN during the display driving period, the driving transistor DRT may transfer the driving signal Vdata supplied from the second data line DL2 to the pixel electrode PXL.

A storage capacitance Cst is formed between the pixel electrode PXL supplied the driving signal Vdata and the first common electrode COM1 supplied the common voltage Vcom. By the liquid crystal layer, a liquid crystal capacitance Clc may be formed between the pixel electrode PXL and the first common electrode COM1.

In the wiring structure of FIG. 8, in the area where one first common electrode COM1, data lines DL1, DL2, and DL3 are arranged in the column direction, and gate lines GL1a, GL1b, GL2a, GL2b, GL3a, GL3b, GL4a, GL4b, and GL5a are arranged in the row direction.

FIG. 8 illustrates an example in which the display panel DISP has a double rate driving (DRD) wiring structure.

When the display panel DISP has the DRD wiring structure, two subpixel columns share one data line DL. Two gate lines correspond to one subpixel row. In other words, two gate lines transferring scan signals to one subpixel row may be disposed on the top and bottom of one subpixel row.

Described below is the DRD wiring structure of the display panel DISP with reference to the first subpixel row SPR1 including, e.g., the first to fifth subpixels SP11, SP12, SP13, SP14, and SP15.

Referring to FIG. 8, the display panel DISP with the DRD wiring structure may have a first data line DL1 for sequentially transferring the driving signal Vdata to the first subpixel SP11 and the second subpixel SP12, a second data line DL2 for sequentially transferring the driving signal Vdata to the third subpixel SP13 and the fourth subpixel SP14, and a third data line DL3 for sequentially transferring the driving signal Vdata to the fifth subpixel SP5 and a sixth subpixel (not shown). In other words, according to the DRD wiring structure, two subpixel columns share one data line.

Referring to FIG. 8, the display panel DISP with the DRD structure may have the first gate line GL1a for transferring the scan signal SCAN to the second subpixel SP12 and the fourth subpixel SP14 and the second gate line GL1b for transferring the scan signal SCAN to the first subpixel SP11, the third subpixel SP13, and the fifth subpixel SP15.

Referring to FIG. 8, the display panel DISP may have readout lines ROL0, ROL1, and ROL2 which serve as signal detection paths (or signal sensing paths) for multi-sensing and are arranged in the column direction. The readout lines ROL may be arranged in parallel with the data lines DL1, DL2, and DL3.

Referring to FIG. 8, among the readout lines ROL0, ROL1, and ROL2 overlapping one first common electrode COM1, only one is electrically connected with the first common electrode COM1 via a contact hole CON_COM_ROL.

In the example of FIG. 8, among the readout lines ROL0, ROL1, and ROL2 passing through the first common electrode COM1, the second, first readout line ROL1 is electrically connected with the first common electrode COM1 via the contact hole CON_COM_ROL, and the other readout lines ROL0 and ROL2 overlap, and pass through, the first common electrode COM1, but are not electrically connected with the first common electrode COM1.

Referring to FIG. 8, the display panel DISP may have a plurality of photo transistors PHT1, PHT2, . . . .

Each of the plurality of photo transistors PHT1, PHT2, . . . may include, e.g., a gate electrode PG to which the photo control signal Vsto is applied, a first electrode PE1 to which the photo driving signal Vdrv is applied, and a second electrode PE2 which contacts (or connects to) the first common electrode COM1.

The first common electrode COM1 is jointly connected with the respective second electrodes PE2 of all the photo transistors PHT1, PHT2, . . . disposed in the area of the first common electrode COM1.

Among the readout lines ROL0, ROL1, and ROL2 passing through the area of the first common electrode COM1, the first readout line ROL1 is disposed between the second subpixel column (the subpixel column including, e.g., the subpixels SP12, SP22, SP32, and SP42) and the third subpixel column (the subpixel column including, e.g., the subpixels SP13, SP23, SP33, and SP43).

The second readout line ROL2 is disposed between the fourth subpixel column (the subpixel column including, e.g., the subpixels SP14, SP24, SP34, and SP44) and the fifth subpixel column (the subpixel column including, e.g., the subpixels SP15, SP25, SP35, and SP45).

One (e.g., ROL1 in the example of FIGS. 8 to 13) of the first readout line ROL1 and the second readout line ROL2 may be electrically connected with the first common electrode COM1 jointly connected with the respective second electrodes PE2 of all the photo transistors PHT1, PH2, . . . disposed in the area of the first common electrode COM1.

The other (e.g., ROL2 in the example of FIGS. 8 to 13) of the first readout line ROL1 and the second readout line ROL2 are not electrically connected with the respective second electrodes PE2 of all the photo transistors PHT1, PH2, . . . disposed in the area of the first common electrode COM1 but is disposed in the same column as the first common electrode COM1 in the display panel DISP and electrically connected with the second common electrode COM2 insulated from the first common electrode COM1.

In other words, the first readout line ROL1 and the second readout line ROL2 each overlaps both the first common electrode COM1 and the second common electrode COM2. However, of the first readout line ROL1 and the second readout line ROL2, only the first readout line ROL1 is connected with the first common electrode COM1, and the second readout line ROL2 is not connected with the first common electrode COM1.

Likewise, the first readout line ROL1 and the second readout line ROL2 each overlaps both the first common electrode COM1 and the second common electrode COM2. However, of the first readout line ROL1 and the second readout line ROL2, only the second readout line ROL2 is connected with the second common electrode COM2, and the first readout line ROL1 is not connected with the second common electrode COM2.

The two or more data lines DL1, DL2, and DL3 overlapping the first common electrode COM1 and the two or more data lines DL1, DL2, and DL3 overlapping the second common electrode COM1 are the same data lines.

The first readout line ROL1 and the second readout line ROL2 each may be disposed in the same direction (the same column direction) as the two or more data lines DL1, DL2, and DL3 they overlap.

Referring to FIG. 8, the display panel DISP may have a plurality of photo sensor rows RSR1, PSR2, . . . .

Referring to FIG. 8, each of the plurality of photo sensor rows RSR1, PSR2, . . . may include photo transistors PHT, and the photo driving line PDL and photo control line PCL for transferring the photo driving signal Vdrv and photo control signal Vsto to the photo transistors PHT.

Referring to FIG. 8, the area where the plurality of subpixel rows SPR1, SPR2, SPR3, and SPR4 corresponds to an opening area OA. However, the area where the plurality of photo sensor rows RSR1, PSR2, . . . are disposed corresponds to a non-opening area NOA.

The more photo sensor rows RSR1, PSR2, . . . are provided in the display panel DISP, the better sensing performance may be obtained. However, a lowering in transmittance may occur due to a reduction in the opening area OA, thus deteriorating the image quality.

Thus, it is beneficial for a photo sensor layout that may enhance photo sensing performance without a significant increase in the opening area OA. The layout structure is described in this point of view.

As shown in FIG. 8, the number and position of the plurality of photo sensor rows RSR1, PSR2, . . . may be varied. In other words, the number and position of the photo transistors PHT1, PHT2, . . . may be varied. The number and position of the photo driving lines PDL1, PDL2, . . . and photo control lines PCL1, PCL2, . . . may be varied.

Referring to FIG. 8, one photo sensor row is disposed in each inter-subpixel row space. In other words, the first photo sensor row PSR1 is disposed between the first subpixel row SPR1 and the second subpixel row SPR2, the second photo sensor row PSR2 is disposed between the second subpixel row SPR2 and the third subpixel row SPR3, the third photo sensor row PSR3 is disposed between the third subpixel row SPR3 and the fourth subpixel row SPR4, and the fourth photo sensor row PSR4 is disposed between the fourth subpixel row SPR4 and the fifth subpixel row.

More specifically, referring to FIG. 8, the first photo transistors PHT1 and the first photo driving line PDL1 and first photo control line PCL1 transferring the photo driving signal Vdrv and photo control signal Vsto to the respective first electrodes PE1 and gate electrodes PG of the first photo transistors PHT1 may be disposed between the first subpixel row SPR1 and the second subpixel row SPR2.

The second photo transistors PHT2 and the second photo driving line PDL2 and second photo control line PCL2 transferring the photo driving signal Vdrv and photo control signal Vsto to the respective first electrodes PE1 and gate electrodes PG of the second photo transistors PHT2 may be disposed between the second subpixel row SPR2 and the third subpixel row SPR3.

The third photo transistors PHT3 and the third photo driving line PDL3 and third photo control line PCL3 transferring the photo driving signal Vdrv and photo control signal Vsto to the respective first electrodes PE1 and gate electrodes PG of the third photo transistors PHT3 may be disposed between the third subpixel row SPR3 and the fourth subpixel row SPR4.

The fourth photo transistors PHT4 and the fourth photo driving line PDL4 and fourth photo control line PCL4 transferring the photo driving signal Vdrv and photo control signal Vsto to the respective first electrodes PE1 and gate electrodes PG of the fourth photo transistors PHT4 may be disposed between the fourth subpixel row SPR4 and the fifth subpixel row.

In the layout structure of FIG. 8, one photo transistor PHT is assigned per two subpixels. However, unlike this layout structure, one photo transistor PHT may be assigned per subpixel.

As such, when one photo transistor PHT is assigned per subpixel, the integration density of photo transistors PHT may be two times higher than that of the layout structure of FIG. 8 and deliver a much higher photo sensing performance than the layout structure of FIG. 8.

Unlike the layout structure of FIG. 8, the display device, according to embodiments of the disclosure, may have a structure in which two or more photo sensor rows share one photo driving line PDL to increase the aperture ratio and transmittance. Alternatively, the display device, according to embodiments of the disclosure, may have a structure in which two or more photo sensor rows share one photo control line PCL. Or, the display device, according to embodiments of the disclosure, may have a structure in which two or more photo sensor rows share one photo driving line PDL and one photo control line PCL.

Figure 10:
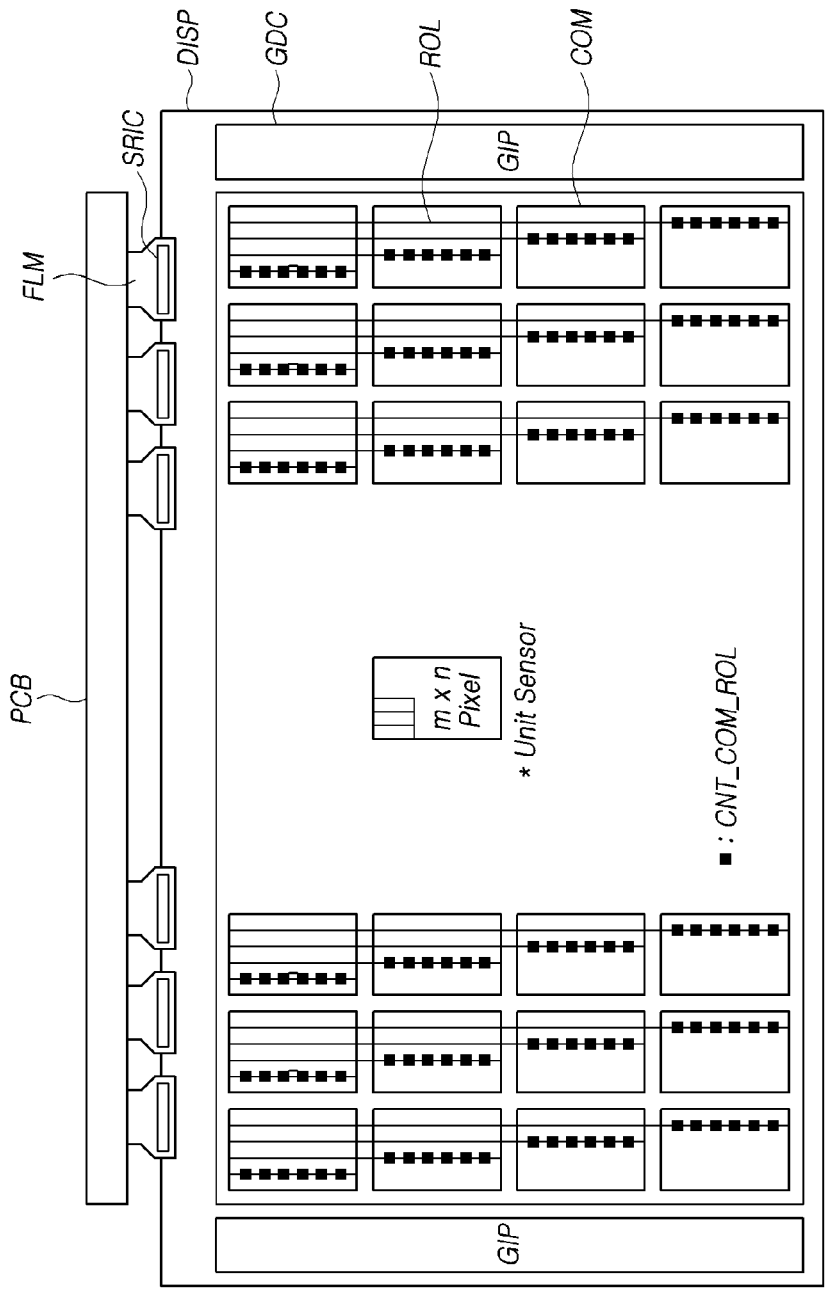
FIG. 10 is a view illustrating an example of implementation of a display device according to embodiments of the disclosure.

FIG. 10 is a view illustrating an example of implementation of a display device according to embodiments of the disclosure.

Referring to FIG. 10, a display device according to embodiments of the disclosure includes a display panel DISP having a plurality of data lines DL, a plurality of gate lines GL, and a plurality of common electrodes COM, a gate driving circuit GDC for driving the plurality of gate lines GL, and a data driving circuit DDC for driving the plurality of data lines DL.

The gate driving circuit GDC may be implemented in a gate-in-panel (GIP) type to be mounted in a non-active area (for example, adjacent to the display area or around the display area) of the display panel DISP.

The data driving circuit DDC and the multi-sensing circuit MSC may be implemented with a plurality of integrated circuit (IC) chips. In other words, each of the plurality of IC chips may include a data driving circuit DDC and a multi-sensing circuit MSC. The data driving circuit DDC included in each of the plurality of IC chips may individually drive different data lines DL. The multi-sensing circuit MSC included in each of the plurality of IC chips may individually sense different common electrodes COM.

The plurality of IC chips may be respectively mounted on a plurality of circuit films FLM. One side of each circuit film FLM may be connected to the non-active area of the display panel DISP, and the opposite side may be connected to a printed circuit board PCB.

The display panel DISP may also function as a touch panel. To that end, the plurality of common electrodes COM are supplied the display common voltage Vcom and, along with the pixel electrode PXL supplied the data voltage Vdata, creates a storage capacitance, and are supplied the touch driving signal TDS, so that the signal is detected and used for touch sensing and photo sensing.

As set forth above, the display panel DISP may include the plurality of data lines DL for transferring the data signals Vdata, the plurality of gate lines GL disposed in a different direction from the plurality of data lines DL to transfer the scan signals SCAN, the plurality of pixel electrodes PXL respectively disposed in the plurality of subpixels SP, the plurality of common electrodes COM supplied the display common voltage Vcom upon display driving, the plurality of readout lines ROL connected with the plurality of common electrodes COM, and the plurality of photo transistors PHT each including the gate electrode PG, the first electrode PE1, and the second positive electrode PE2.

The respective second electrodes PE2 of the plurality of photo transistors PHT may be electrically connected with the common electrode COM.

Each of the plurality of subpixels SP may be the concept of an area where the pixel electrode PXL is disposed and, in some cases, the concept of an area where, e.g., the pixel electrode PXL and the driving transistor DRT are disposed. Each of the plurality of subpixels SP may be an opening area or an area including an opening area and a non-opening area.

The non-opening area included in, or corresponding to, each of the plurality of subpixels SP may have the driving transistor DRT disposed therein and allow the gate line GL connected with the gate electrode of the driving transistor DRT to pass therethrough.

The non-opening area included in, or corresponding to, each of the plurality of subpixels SP may allow the data line DL connected with the source electrode (or drain electrode) of the driving transistor DRT to pass therethrough.

The photo transistor PHT may be disposed in the non-opening area included in, or corresponding to, each of all or some of the plurality of subpixels SP.

In some cases, the photo control line PCL connected with the gate electrode PG of the photo transistor PHT may pass through the non-opening area included in, or corresponding to, each of all or some of the plurality of subpixels SP. Further, in some cases, the photo driving line PDL connected with the first electrode PE1 of the photo transistor PHT may pass through the non-opening area included in, or corresponding to, each of all or some of the plurality of subpixels SP.

The readout line ROL connected with the common electrode COM or second electrode PE2 of the photo transistor PHT may pass through the non-opening area included in, or corresponding to, each of the plurality of subpixels SP.

A portion of the common electrode COM and/or pixel electrode PXL positioned in the opening area may extend to the non-opening area included in, or corresponding to, each of the plurality of subpixels SP.

Referring to FIG. 10, each of the plurality of common electrodes COM is one unit sensor in view of touch sensing and photo sensing.

One common electrode COM may overlap m*n pixels. When one pixel includes three subpixels (e.g., a red subpixel, green subpixel, and blue subpixel), and each of the plurality of common electrodes COM may overlap 3*m*n pixels.

A plurality of photo transistors PHT may be disposed in the area where one common electrode COM is positioned.

The respective second electrodes PE2 of the plurality of photo transistors PHT disposed in the area where one common electrode COM is positioned are connected with one common electrode COM and electrically connected with one readout line ROL. One common electrode COM and one readout line ROL electrically contact each other at a plurality of points CNT_COM_ROL.

Described below are various structures of photo transistors PHT and the panel structure and driving method of each of the various structures of photo transistors PHT. A panel area as necessary for the description is described below with reference to FIG. 11 as an example.

Figure 11:
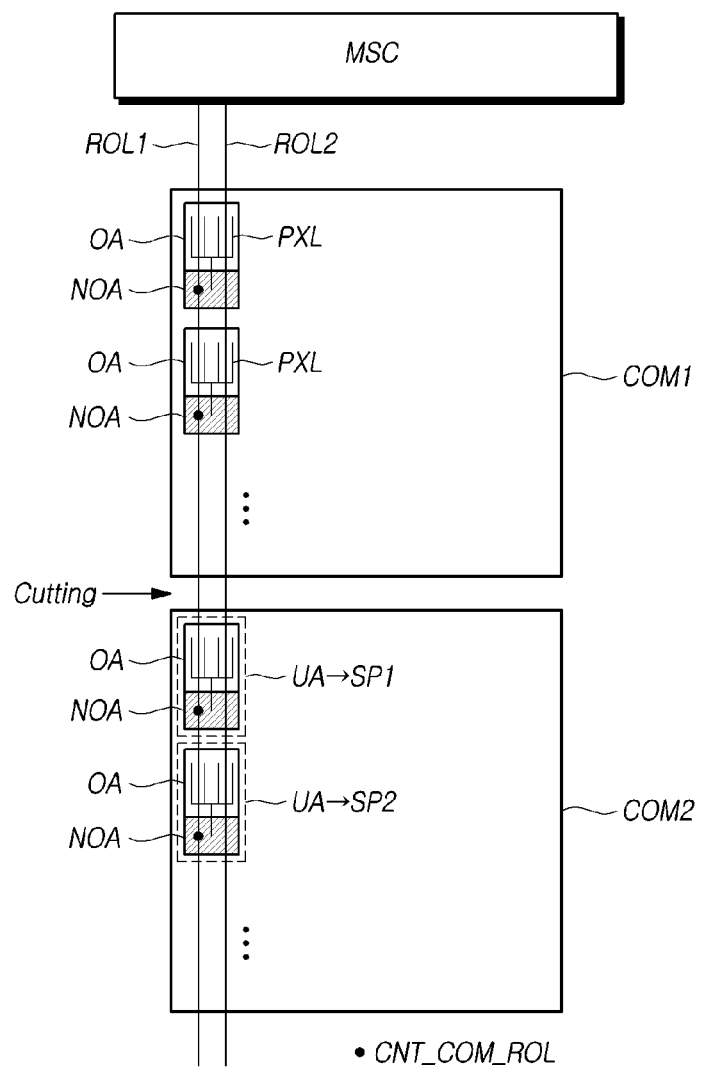
FIG. 11 is a plan view schematically illustrating an area where two common electrodes are disposed in a display panel according to embodiments of the disclosure.

FIG. 11 is a plan view schematically illustrating an area where two common electrodes COM1 and COM2 are disposed in a display panel DISP according to embodiments of the disclosure.

In FIG. 11, the first direction is a direction in which the data line DL extends and is disposed, and the second direction is a direction in which the gate line GL extends and is disposed. The first direction and second direction are different directions and may be, but not necessarily, perpendicular to each other. For example, the first direction may be the row direction, and the second direction may be the column direction. In contrast, the first direction may be the column direction, and the second direction may be the row direction. In the disclosure, the row and column may be the column and row depending on the point of view, and these are so defined solely for illustration purposes.

It is hypothesized below that the first direction, which is the direction in which the data line DL and readout line ROL are disposed is the row direction, and the second direction, which is the direction in which the gate line GL, photo driving line PDL, and photo control line PCL are disposed, is the column direction.

Meanwhile, the column-wise lines, such as the data line DL and readout line ROL, and the column-wise lines, such as the gate line GL, photo driving line PDL, and photo control line PCL, may be straight lines or lines with a bend. That is, the direction of the various signal lines means the direction of both ends of each signal line and does not mean that the portion between both the ends has no bend.

Referring to FIG. 11, the two common electrodes COM1 and COM2 are common electrodes COM positioned adjacent to each other among the plurality of common electrodes COM. The two common electrodes COM1 and COM2 are electrically connected with the multi-sensing circuit MSC through two readout lines ROL1 and ROL2. Each of the two readout lines ROL1 and ROL2 extends and is disposed in the second direction.

Referring to FIG. 11, the first common electrode COM1 is disposed closer to the multi-sensing circuit MSC than the second common electrode COM2 in the second direction.

The first common electrode COM1 and the second common electrode COM2 each may overlap the area occupied by two or more subpixels SP.

The first readout line ROL1 may be disposed to overlap both the first common electrode COM1 and the second common electrode COM2. The second readout line ROL2 may be disposed to overlap both the first common electrode COM1 and the second common electrode COM2.

The second electrode PE2 of the first photo transistor PHT positioned between the two pixel electrodes PXL included in the two subpixels SP overlapping the first common electrode COM1 may be electrically connected with the multi-sensing circuit MSC through the first readout line ROL1.

The second electrode PE2 of the second photo transistor PHT positioned between the two pixel electrodes PXL included in the two subpixels SP1 and SP2 overlapping the second common electrode COM2 may be electrically connected with the multi-sensing circuit MSC through the second readout line ROL2.

Two or more pixel electrodes PXL and two or more driving transistors DRT may be included in the area occupied by each of the two common electrodes COM1 and COM2.

Two or more photo sensors PS may further be included in the area occupied by each of the two common electrodes COM1 and COM2. Each of the two or more photo sensors PS may include a photo transistor PHT.

Two or more opening areas OA which may respectively correspond to two or more pixel electrodes PXL and transmit light, and two or more non-opening areas NOA where two or more driving transistors DRT are respectively disposed and which cannot transmit light may be present in the area occupied by each of the two common electrodes COM1 and COM2.

The whole or most part of the pixel electrode PXL may be disposed in each of the two or more opening areas OA.

The driving transistor DRT may be disposed in each of the two or more non-opening areas NOA to transfer the data voltage Vdata to the pixel electrode PXL. Further, one or more photo transistors PHT may further be disposed in at least one of the two or more non-opening areas NOA. Various signal wires, such as the gate line GL, may be disposed in the two or more non-opening areas NOA.

The first common electrode COM1 may be connected to the first readout line ROL1 at two or more connection points CNT_COM_ROL. The first common electrode COM1 may be connected with the multi-sensing circuit MSC through the first readout line ROL1.

The second electrodes PE2 of two or more photo transistors PHT may be electrically connected with the first common electrode COM1 at two or more connection points CNT_COM_ROL.

The first common electrode COM1 overlaps the second readout line ROL2 but is not electrically connected with the second readout line ROL2.

The second common electrode COM2 may be connected to the second readout line ROL2 at two or more connection points CNT_COM_ROL. The second common electrode COM2 may be connected with the multi-sensing circuit MSC through the second readout line ROL2.

The second electrodes PE2 of two or more photo transistors PHT may be electrically connected with the second common electrode COM2 at two or more connection points CNT_COM_ROL.

The second common electrode COM2 overlaps the first readout line ROL1 but is not electrically connected with the first readout line ROL1.

Or, as shown in FIG. 11, the second common electrode COM2 overlaps the first readout line ROL1 and connects to the first readout line ROL1 at two or more connection points CNT_COM_ROL but may be connected with the multi-sensing circuit MSC through the first readout line ROL1. This is why the first readout line ROL1 is disconnected between the first common electrode COM1 and the second common electrode COM2 as shown in FIG. 11. Here, the first common electrode COM1 is positioned closer to the multi-sensing circuit MSC than the second common electrode COM2.

The two or more data lines DL1 and DL2 overlapping the first common electrode COM1 and the two or more data lines DL1 and DL2 overlapping the second common electrode COM2 may be the same data lines DL.

The two or more gate lines GL overlapping the first common electrode COM1 and the two or more gate lines GL overlapping the second common electrode COM2 may be different gate lines GL.

The unit area UA in the area occupied by the first common electrode COM1 shown in FIG. 11 may correspond to each of the first subpixel SP1 and the second subpixel SP2.

Referring to FIG. 11, the area including one opening area OA in which the whole or part of one pixel electrode PXL is disposed to transmit light and a non-opening area NOA in which the driving transistor DRT and photo transistor PHT are disposed in the display panel DISP is referred to as a unit area UA. The unit area UA may be repeated in its original shape or partially modified shape (e.g., changes in the number or position of contact holes) in the display panel DISP. Thus, the overall structure of the display panel DISP may be grasped based on the structure of the unit area UA in the area occupied by the first common electrode COM1.

The following description is made with reference to FIG. 11 as well as FIGS. 12 to 36.

Figure 12:
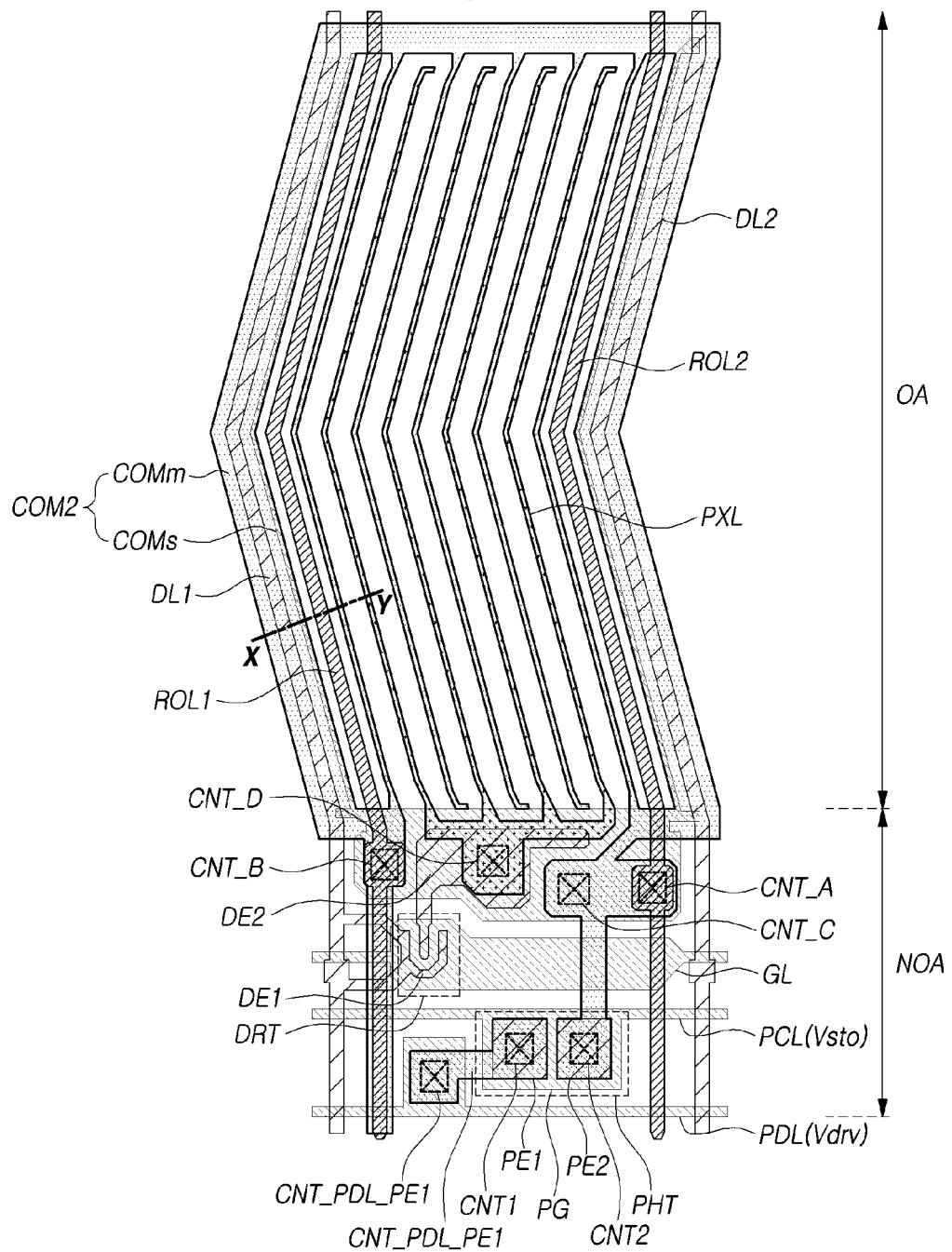
FIG. 12 is a plan view illustrating a unit area when a photo transistor has a basic structure in a display panel according to embodiments of the disclosure.
Figure 13:
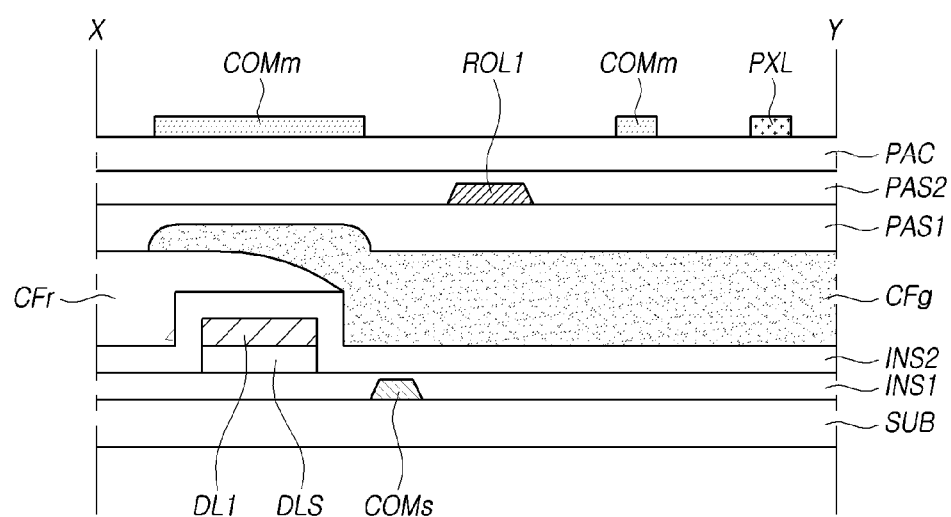
FIG. 13 is a cross-sectional view taken along line X-Y in a unit area of FIG. 12.

FIG. 12 is a plan view illustrating a unit area UA when a photo transistor PHT has a basic structure in a display panel DISP according to embodiments of the disclosure. FIG. 13 is a cross-sectional view taken along line X-Y in a unit area UA of FIG. 12.

Referring to FIG. 12, the basic structure of the photo transistor PHT is a structure in which the first electrode PE1, the second electrode PE2, and the gate electrode PG of the photo transistor PHT are electrically separated from each other and are independently driven from each other. For example, according to the basic structure of the photo transistor PHT, the first electrode PE1 of the photo transistor PHT is electrically connected with the photo driving line PDL, the second electrode PE2 of the photo transistor PHT is electrically connected with the common electrode COM, and the gate electrode PG of the photo transistor PHT is electrically connected with the photo control line PCL.

The whole or most part of the pixel electrode PXL may be disposed in the opening area OA of the unit area UA. A portion of the second common electrode COM2 may be disposed in the opening area OA of the unit area UA.

For example, the second common electrode COM2 may include a main electrode COMm and an auxiliary electrode COMs.

The main electrode COMm of the second common electrode COM2 may include the same material as the pixel electrode PXL. The main electrode COMm of the second common electrode COM2 may be disposed on the same level as the pixel electrode PXL.

The auxiliary electrode COMs of the second common electrode COM2 may include a different material from the main electrode COMm. The auxiliary electrode COMs of the second common electrode COM2 may be disposed on a different level as the main electrode COMm. For example, the auxiliary electrode COMs of the second common electrode COM2 may be disposed on the same layer as one or more of the gate line GL, photo driving line PDL, and photo control line PCL.

For example, referring to FIG. 12, the pixel electrode PXL may have a comb shape, and the main electrode COMm of the second common electrode COM2 may have a comb shape that fits into the pixel electrode PXL.

The driving transistor DRT, the photo transistor PHT, and various signal wires (e.g., GL, PCL, PDL, ROL1, ROL2, DL1, or DL2) may be disposed in the non-opening area NOA of the unit area UA.

One or more data lines DL1 and DL2 are disposed, in the column direction, on two opposite sides of one pixel electrode PXL, in the unit area UA. In the unit area UA, one or two readout lines ROL1 and ROL2 are disposed, in the column direction, in parallel, or substantially parallel, with one or two data lines DL1 and DL2.

The gate line GL is disposed, in the row direction, in the non-opening area NOA of the unit area UA. In the non-opening area NOA of the unit area UA, the photo driving line PDL electrically connected with the first electrode PE1 of the photo transistor PHT and the photo control line PCL electrically connected with the gate electrode PG of the photo transistor PHT may be disposed.

Referring to FIG. 12, the point CNT_A where the main electrode COMm and/or auxiliary electrode COMs of the second common electrode COM2 is electrically connected with the second readout line ROL2 may be present in the area between the two pixel electrodes PXL included in the two subpixels SP overlapping and positioned adjacent to the second common electrode COM2 in the non-opening area NOA of the unit area UA.

The main electrode COMm and/or auxiliary electrode COMs of the second common electrode COM2 may be electrically connected with the multi-sensing circuit MSC through the second readout line ROL2.

Referring to FIG. 12, the point CNT_C where the second electrode PE2 of the second photo transistor PHT disposed between the two pixel electrodes PXL, the main electrode COMm of the second common electrode COM2 and the auxiliary electrode COMs of the second common electrode COM2 may be present in the area between the two pixel electrodes PXL included in the two subpixels SP overlapping and positioned adjacent to the second common electrode COM2 in the non-opening area NOA of the unit area UA.

By the contact structure of the above-described two points CNT_A and CNT_C, the second electrode PE2 of the second photo transistor PHT, the main electrode COMm of the second common electrode COM2, the auxiliary electrode COMs of the second common electrode COM2, and the second readout line ROL2 are electrically connected with each other.

Referring to FIG. 12, the point CNT_B where the main electrode COMm and/or auxiliary electrode COMs of the second common electrode COM2 is connected with the first readout line ROL1 may be present in the area between the two pixel electrodes PXL included in the two subpixels SP overlapping and positioned adjacent to the second common electrode COM2 in the non-opening area NOA of the unit area UA.

The main electrode COMm or auxiliary electrode COMs of the second common electrode COM2 may not be connected with the multi-sensing circuit MSC through the first readout line ROL1 (refer to FIG. 11).

The structure of the driving transistor DRT is described. The driving transistor DRT may include, e.g., a first driving electrode DE1, a second driving electrode DE2, and a gate electrode. In the driving transistor DRT, the first driving electrode DE1 may be a source electrode, and the second driving electrode DE2 may be a drain electrode. Or, the first driving electrode DE1 may be the drain electrode, and the second driving electrode DE2 may be the source electrode.

The gate electrode of the driving transistor DRT may be separately formed. Unlike this, as shown in FIG. 12, a portion of the gate line GL in the area where the first driving electrode DE1 and second driving electrode DE2 of the driving transistor DRT are positioned adjacent to each other may play a role as the gate electrode of the driving transistor DRT.

For example, the first driving electrode DE1 of the driving transistor DRT may include an electrode portion shaped as the letter "U" as shown in FIG. 12. The second driving electrode DE2 of the driving transistor DRT may include a protrusion, and the protrusion may be spaced apart from, and placed inside, the U-shaped electrode portion of the first driving electrode DE1 of the driving transistor DRT. Thus, a channel may be formed between the U-shaped electrode portion of the first driving electrode DE1 and the protrusion of the second driving electrode DE2.

The second driving electrode DE2 of the driving transistor DRT may overlap at least one of the main electrode COMm of the second common electrode COM2, the auxiliary electrode COMs of the second common electrode COM2, and the readout lines ROL1 and ROL2. However, the second driving electrode DE2 of the driving transistor DRT is electrically insulated from the main electrode COMm of the second common electrode COM2, the auxiliary electrode COMs of the second common electrode COM2, and the readout lines ROL1 and ROL2, with an insulation layer interposed therebetween. In particular, the second driving electrode DE2 of the driving transistor DRT and the auxiliary electrode COMs of the second common electrode COM2 overlap each other but are electrically insulated from each other.

The second driving electrode DE2 of the driving transistor DRT connects to an extension of the pixel electrode PXL from the opening area OA to the non-opening area NOA through the contact hole CNT_D.

The structure of the photo transistor PHT is described. The photo transistor PHT may include a first electrode PE1, a second electrode PE2, and a gate electrode PG.

The gate electrode PG of the photo transistor PHT may be an extension from the photo control line PCL.

The first electrode PE1 of the photo transistor PHT is electrically connected with the photo driving line PDL through a connection pattern CP_PDL_PE1. More specifically, one side of the connection pattern CP_PDL_PE1 may connect to the extension of the photo driving line PDL through the contact hole CNT_PDL_PE1, and the other side of the connection pattern CP_PDL_PE1 may connect to the first electrode PE1 through the contact hole CNT1.

The second electrode PE2 of the photo transistor PHT may be electrically connected with the extension of the main electrode COMm of the second common electrode COM2 from the opening area OA to the non-opening area NOA. More specifically, the extension of the main electrode COMm of the second common electrode COM2 from the opening area OA to the non-opening area NOA may be connected with the second electrode PE2 through the contact hole CNT2.

The first electrode PE1 and second electrode PE2 of the photo transistor PHT may be positioned on the gate electrode PG and be spaced apart from each other. A channel of the photo transistor PHT may be formed between the first electrode PE1 and second electrode PE2 of the photo transistor PHT.

For example, the unit area UA shown in FIG. 12 may be an area corresponding to one subpixel SP that produces green light (or other color of light). In this case, a subpixel SP which produces red light may be positioned adjacent to the left of the figure. A subpixel SP which produces blue light may be positioned adjacent to the right of the figure.

Thus, referring to FIGS. 12 and 13, a color filter CFg of the corresponding color (e.g., green) may be disposed in the opening area OA. The color filter CFg of the subpixel SP of FIG. 12 may be positioned adjacent to, or overlap, the color filters of the adjacent subpixels SP, at the borders between the subpixel SP of FIG. 12 and the adjacent subpixels SP on both sides thereof.

A look at the cross-sectional structure taken along line X-Y of FIG. 12, with reference to FIG. 13 reveals that the auxiliary electrode COMs of the second common electrode COM2 may be disposed on the substrate SUB. A first insulation film INS1 may be disposed on the substrate SUB while covering or at least partially covering the auxiliary electrode COMs of the second common electrode COM2. A first data line DL1 may be disposed on the first insulation film INS1. An auxiliary data line DLS may further be positioned between the first insulation film INS1 and the first data line DL1. The auxiliary data line DLS may be positioned on the first data line DL1.

A second insulation film INS2 may be disposed on the first insulation film INS1 while covering or at least partially covering the first data line DL1. Color filters CFr and CFg may be disposed on the second insulation film INS2.

The area where the color filters CFr and CFg overlap each other may be the border area between the subpixels SP. The overlapping structure of the color filters CFr and CFg may block the light from each subpixel SP.

A first protection layer PAS1 may be disposed on the color filters CFr and CFg, and the first readout line ROL1 may be disposed on the first protection layer PAS1. A second protection layer PAS2 may be disposed on the first protection layer PAS1 while covering or at least partially covering the first readout line ROL1.

A third protection layer PAC may be disposed on the second protection layer PAS2.

The second common electrode COM2, the main electrode COMm, and the pixel electrode PXL may be disposed on the third protection layer PAC. The main electrode COMm of the second common electrode COM2 and the pixel electrode PXL may have comb shapes that fit each other.

Figure 14:
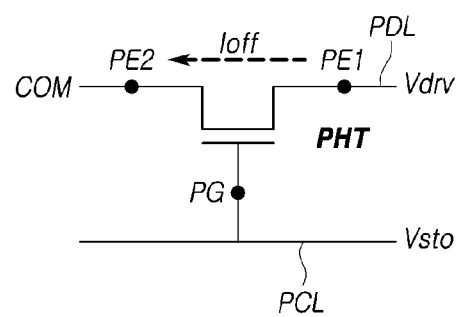
FIG. 14 is a view illustrating a direction of a leaking current through a photo transistor when the photo transistor has a basic structure in a display panel according to embodiments of the disclosure.

FIG. 14 is a view illustrating a direction of a leaking current Ioff through a photo transistor PHT when the photo transistor PHT has a basic structure in a display panel DISP according to embodiments of the disclosure.

FIG. 1 illustrates an equivalent circuit of the photo transistor PHT with the basic structure.

Referring to FIG. 14, in a case where the photo transistor PHT has the basic structure, when light is radiated to the channel portion of the photo transistor PHT, with the gate electrode PG of the photo transistor PHT supplied the photo control signal Vsto within a turn-off level voltage range in which the photo transistor PHT may not be turned on, a leaking current Ioff may be created at the channel portion of the photo transistor PHT.

As described above, the basic structure of the photo transistor PHT is a structure in which the first electrode PE1, the second electrode PE2, and the gate electrode PG of the photo transistor PHT are electrically separated from each other and are independently driven from each other. For example, according to the basic structure of the photo transistor PHT, the first electrode PE1 of the photo transistor PHT is electrically connected with the photo driving line PDL, the second electrode PE2 of the photo transistor PHT is electrically connected with the common electrode COM, and the gate electrode PG of the photo transistor PHT is electrically connected with the photo control line PCL.

Referring to FIG. 14, when the photo transistor PHT has the basic structure, the photo driving signal Vdrv applied to the first electrode PE1 may be higher than the voltage (the voltage of the touch driving signal TDS or common load free driving signal C_LFDS) applied to the common electrode COM electrically connected with the second electrode PE2.

Thus, when the photo transistor PHT has the basic structure, the leaking current Ioff generated from the photo transistor PHT flows from the first electrode PE1 to the second electrode PE2.

Figure 15:
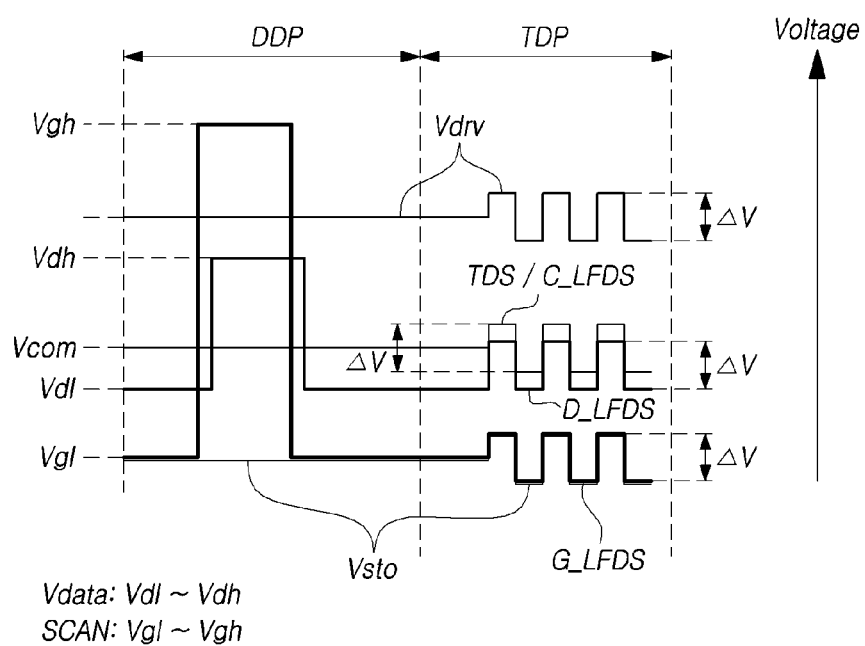
FIG. 15 is a diagram illustrating driving timings of a display device when a photo transistor has a basic structure in a display panel according to embodiments of the disclosure.

FIG. 15 is a diagram illustrating driving timings of a display device when a photo transistor PHT has a basic structure in a display panel DISP according to embodiments of the disclosure.

Referring to FIG. 15, the driving period of the display device may include a display driving period DDP and a touch driving period TDP. That is, the display device may time-divisionally perform display driving and touch driving (or touch sensing).

Referring to FIG. 15, during the display driving period DDP, data voltages Vdata for displaying (or updating) an image may be supplied to the data lines DL. The data voltages Vdata may have a voltage value between the maximum data voltage value Vdh and the minimum data voltage value Vdl depending on, e.g., the gray scale of the image.

During the display driving period DDP, scan signals SCAN for scanning the gate lines GL may be supplied to the gate lines GL. Each scan signal SCAN may have a turn-on level voltage Vgh at the timing when the corresponding gate line GL is selected and scanned and, at the other timings (e.g., when the gate line GL is not selected nor is it scanned), may have a turn-off level voltage Vgl.

During the display driving period DDP, the display common voltage Vcom is applied to the plurality of common electrodes COM. The display common voltage Vcom, along with the data voltage Vdata applied to each pixel electrode PXL, may form a storage capacitance.

During the display driving period DDP, the plurality of photo transistors PHT may not be operated.

During the display driving period DDP, the display common voltage Vcom may be applied to the respective second electrodes PE2 of the plurality of photo transistors PHT.

During the display driving period DDP, the photo driving signal Vdrv, a DC voltage, may be applied to the respective first electrodes PE1 of the plurality of photo transistors PHT.

During the display driving period DDP, the photo control signal Vsto, a DC voltage, may be applied to the respective gate electrodes PG of the plurality of photo transistors PHT.

A look at the voltage magnitude of the various signals mentioned above during the display driving period DDP reveals that the turn-on level voltage Vgh of the scan signal SCAN is the highest, and the DC voltage of photo driving signal Vdrv, the maximum data voltage value Vdh of the data voltage Vdata, the common voltage Vcom, and the minimum data voltage value Vdl of the data voltage Vdata are high in the order thereof. The turn-off level voltage Vgl of the scan signal SCAN and the DC voltage form of photo control signal Vsto may have the lowest voltage value.

Referring to FIG. 15, during the touch driving period TDP other than the display driving period DDP, at least one of the plurality of common electrodes COM is supplied the touch driving signal TDS whose voltage level varies with a predetermined amplitude (ΔV) or a selected amplitude (ΔV).

When at least one of the plurality of common electrodes COM is supplied the touch driving signal TDS during the touch driving period TDP, the load free driving signal (LFDS) corresponding to the touch driving signal TDS may be applied to the signal lines or other electrodes disposed in the display panel DISP. All kinds of load free driving signals (e.g., C_LFDS, D_LFDS, or G-LFDS) may be identical in, e.g., frequency, amplitude, or phase, to the touch driving signal TDS.

During the touch driving period TDP, the other common electrodes COM than the common electrode COM supplied the touch driving signal TDS may be supplied the common load free driving signal C_LFDS corresponding to the touch driving signal TDS.

During the touch driving period TDP, the data load free driving signal D_LFDS corresponding to the touch driving signal TDS may be applied to all or some of the plurality of data lines DL.

During the touch driving period TDP, the gate load free driving signal G_LFDS corresponding to the touch driving signal TDS may be applied to all or some of the plurality of gate lines GL. Here, the voltage level of the gate load free driving signal G_LFDS may be varied with a predetermined amplitude (ΔV) (or a selected amplitude (ΔV)) within a turn-off level voltage range in which the driving transistor DRT connected with the gate electrode and gate line GL may not be turned on.

During the touch driving period TDP, the respective second electrodes PE2 of the plurality of photo transistors PHT are supplied the same touch driving signal TDS or common load free driving signal C_LFDS as the electrically connected common electrode COM.

During the touch driving period TDP, the respective first electrodes PE1 of the plurality of photo transistors PHT may be supplied the photo driving signal Vdrv corresponding to the touch driving signal TDS. That is, during the touch driving period TDP, the photo driving signal Vdrv applied to the respective first electrodes PE1 of the plurality of photo transistors PHT may be identical or substantially identical in, e.g., frequency, amplitude, or phase, to the touch driving signal TDS, and the photo driving signal Vdrv may be regarded as a signal for driving the photo transistor PHT and a kind of load free driving signal LFDS.

During the touch driving period TDP, the respective gate electrodes PG of the plurality of photo transistors PHT may be supplied the photo control signal Vsto corresponding to the touch driving signal TDS. That is, during the touch driving period TDP, the photo control signal Vsto applied to the respective gate electrodes PG of the plurality of photo transistors PHT may be identical or substantially identical in, e.g., frequency, amplitude, or phase, to the touch driving signal TDS, and the photo control signal Vsto may be regarded as a signal for turning off the photo transistor PHT for photo sensing and a kind of load free driving signal LFDS.

As described above, since the photo driving line PDL and photo control line PCL should be disposed in the non-opening area NOA of the unit area UA for photo sensing, the proportion of the opening area OA which transmits light in the unit area UA ends up decreasing. Thus, the aperture ratio and transmittance of the display panel DISP may be lowered. Described below are the structure of the photo transistor PHT for increasing the aperture ratio and transmittance of the display panel DISP, its resultant panel structure, and driving method. The following description focuses primarily on differences from what has been described above (in connection with, particularly, FIGS. 11 to 15), with no duplicate description given. Thus, although not described below, what has been described above (in connection with, particularly, FIGS. 11 to 15) should be applied likewise.

Figure 16:
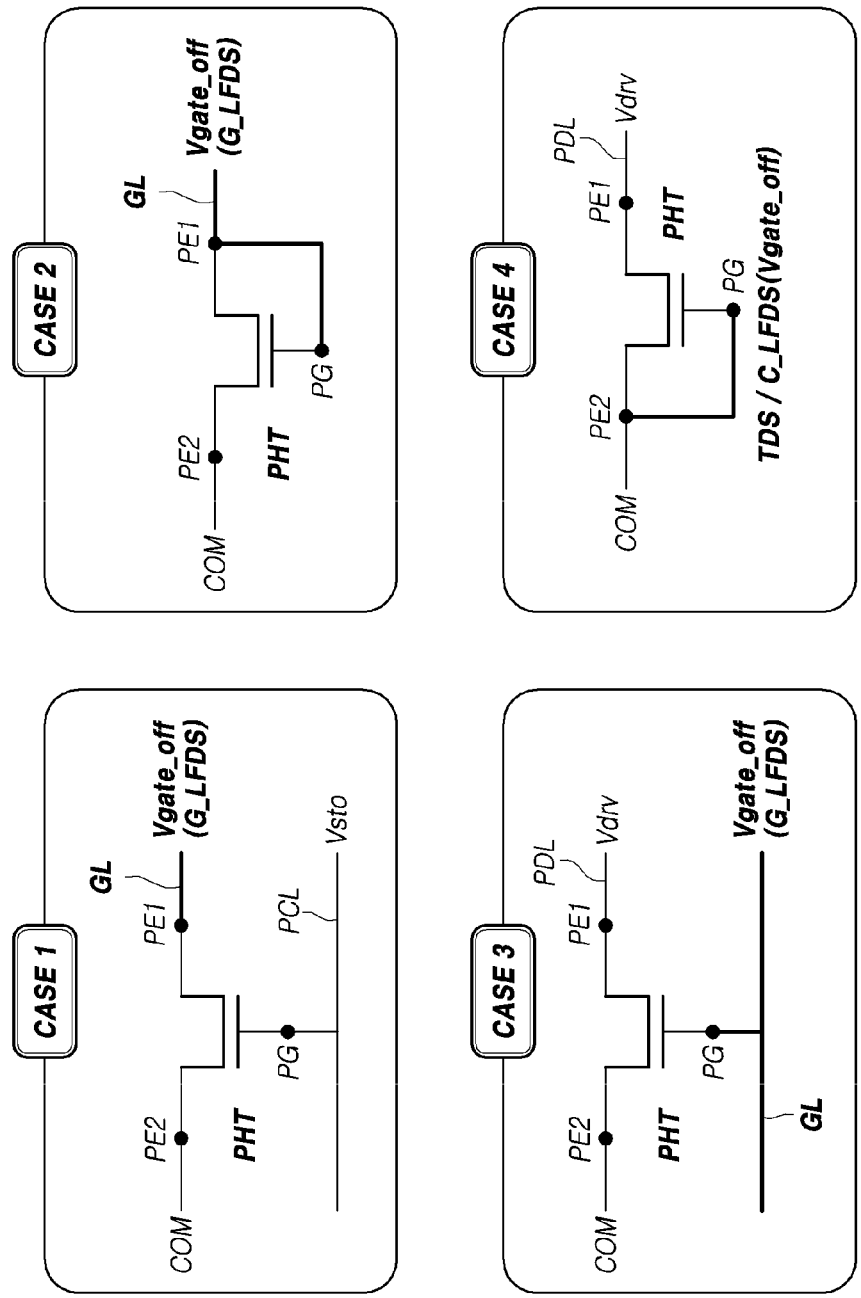
FIG. 16 is a view illustrating the structures of a photo transistor, as modified to enhance the aperture ratio and transmittance of a display panel according to embodiments of the disclosure.

FIG. 16 is a view illustrating the structures of a photo transistor PHT, as modified to enhance the aperture ratio and transmittance of a display panel DISP according to embodiments of the disclosure.

Referring to FIG. 16, four modified structures CASE1, CASE2, CASE2, and CASE 4 for the photo transistor PHT are described as examples.

Referring to FIG. 16, in all of the four modified structures CASE1, CASE 2, CASE 3, and CASE for the photo transistor PHT, the second electrode PE2 among the gate electrode PG, first electrode PE1, and second electrode PE2 of the photo transistor PHT may be electrically connected with the common electrode COM.

Referring to FIG. 16, in the first to third modified structures CASE 1, CASE 2, and CASE 3 for the photo transistor PHT, at least one of the first electrode PE1 and gate electrode PG of the photo transistor PHT may be electrically connected with the gate line GL.

Referring to FIG. 16, in the first modified structure CASE 1 for the photo transistor PHT, the first electrode PE1 of the photo transistor PHT may be electrically connected with the gate line GL for display driving.

Thus, the gate load free driving signal G_LFDS from the gate line GL may be applied to the first electrode PE1 of the photo transistor PHT during the touch driving period TDP.

The gate load free driving signal G_LFDS applied to the first electrode PE1 of the photo transistor PHT during the touch driving period TDP plays a role as the photo driving signal Vdrv.

The gate load free driving signal G_LFDS is the gate voltage Vgate_off whose voltage level is varied within a turn-off level voltage range in which the driving transistor DRT whose gate electrode is connected with the gate line GL may be turned off.

Referring to FIG. 16, in the second modified structure CASE 2 for the photo transistor PHT, the first electrode PE1 and gate electrode PG of the photo transistor PHT may be electrically connected with the gate line GL for display driving.

Thus, the gate load free driving signal G_LFDS from the gate line GL may be applied jointly to the first electrode PE1 and gate electrode PG of the photo transistor PHT during the touch driving period TDP.

The gate load free driving signal G_LFDS is the gate voltage Vgate_off whose voltage level is varied within a turn-off level voltage range in which the driving transistor DRT whose gate electrode is connected with the gate line GL may be turned off.

The gate load free driving signal G_LFDS applied jointly to the first electrode PE1 and gate electrode PG of the photo transistor PHT during the touch driving period TDP plays a role as the photo driving signal Vdrv and photo control signal Vsto.

As such, since the gate load free driving signal G_LFDS should play a role as the photo control signal Vsto, the gate load free driving signal G_LFDS is the gate voltage Vgate_off whose voltage level is varied within a turn-off level voltage range in which the photo transistor PHT may be turned off.

Referring to FIG. 16, in the third modified structure CASE 3 for the photo transistor PHT, the gate electrode PG of the photo transistor PHT may be electrically connected with the gate line GL for display driving.

Thus, the gate load free driving signal G_LFDS from the gate line GL may be applied to the gate electrode PG of the photo transistor PHT during the touch driving period TDP.

The gate load free driving signal G_LFDS is the gate voltage Vgate_off whose voltage level is varied within a turn-off level voltage range in which the driving transistor DRT whose gate electrode is connected with the gate line GL may be turned off.

The gate load free driving signal G_LFDS applied to the gate electrode PG of the photo transistor PHT during the touch driving period TDP plays a role as the photo control signal Vsto.

Thus, the gate load free driving signal G_LFDS should be the gate voltage Vgate_off whose voltage level is varied within a turn-off level voltage range in which the photo transistor PHT may be turned off.

Referring to FIG. 16, in the fourth modified structure CASE 4 for the photo transistor PHT, the gate electrode PG of the photo transistor PHT may be electrically connected with the second electrode PE2 or the common electrode COM.

Thus, the touch driving signal TDS or common load free driving signal C_LFDS from the second electrode PE2 or common electrode COM may be applied to the gate electrode PG of the photo transistor PHT during the touch driving period TDP.

During the touch driving period TDP, the touch driving signal TDS or common load free driving signal C_LFDS is a signal whose voltage level is varied with a predetermined amplitude ($\Delta V$) (or a selected amplitude ($\Delta V$)) and, because of being applied to the gate electrode PG of the photo transistor PHT, plays a role as the photo control signal Vsto.

Thus, the touch driving signal TDS or common load free driving signal C_LFDS should be the gate voltage Vgate_off whose voltage level is varied within a turn-off level voltage range in which the photo transistor PHT may be turned off.

The touch driving signal TDS or common load free driving signal C_LFDS may be regarded as the display common voltage Vcom whose voltage level is varied with a predetermined amplitude ($\Delta V$) (or a selected amplitude ($\Delta V$)).

Referring to FIG. 16, in the first and second modified structures CASE 1 and CASE 2, where the first electrode PE1 is connected with the gate line GL, among the four modified structures CASE 1, CASE 2, CASE 3, and CASE 4 of the photo transistor PHT, the direction of a leaking current created in the photo transistor PHT as the channel of the photo transistor PHT is irradiated with light may differ from the direction of the leaking current in the basic structure.

Figure 17:
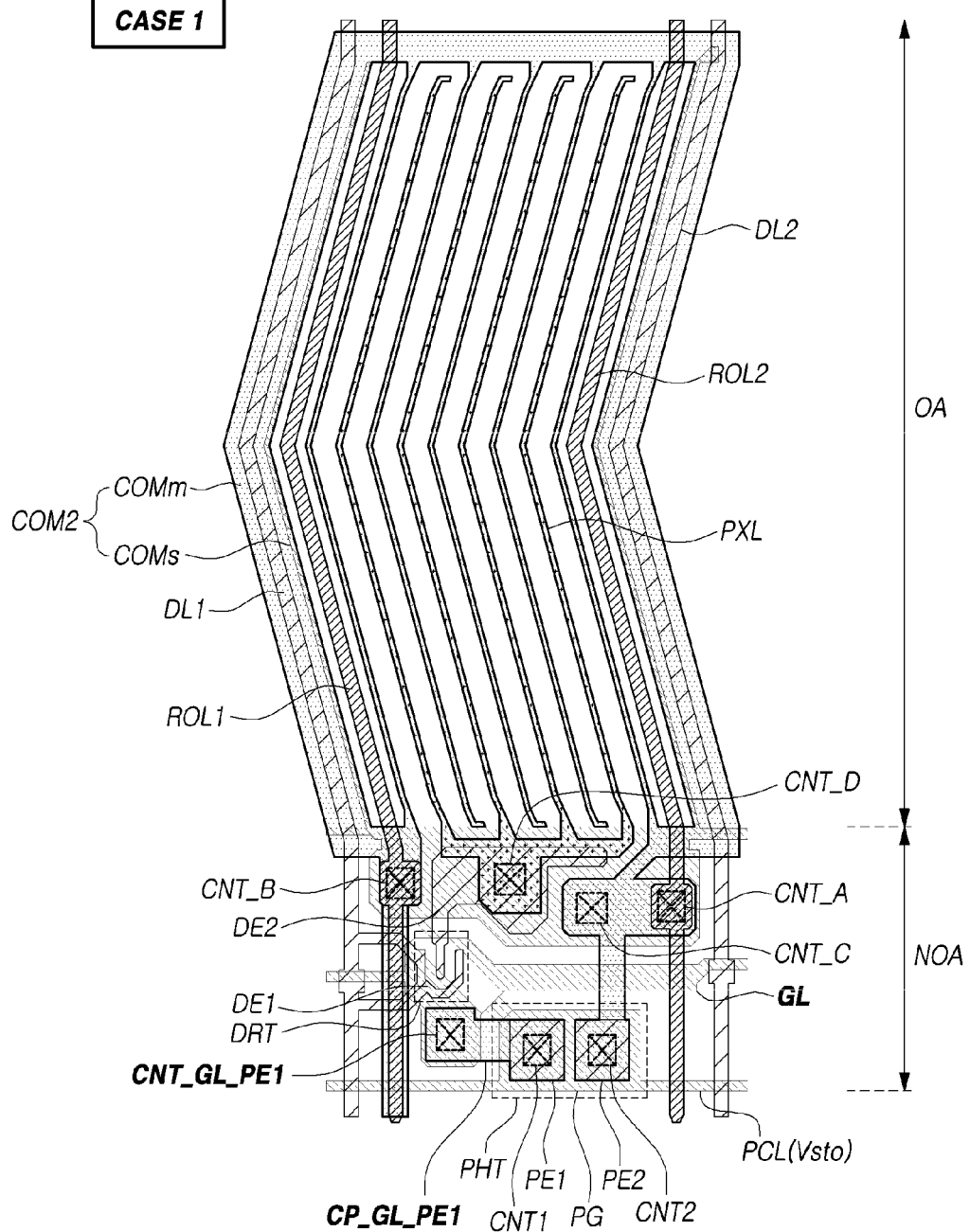
FIG. 17 is a plan view illustrating a unit area when a photo transistor has a first modified structure (CASE 1) in a display panel according to embodiments of the disclosure.

FIG. 17 is a plan view illustrating a unit area when a photo transistor PHT has a first modified structure (CASE 1) in a display panel DISP according to embodiments of the disclosure.

The plurality of subpixels SP include a first subpixel SP1 and a second subpixel SP2 positioned adjacent to each other in a second direction (e.g., column direction) in the area occupied by the second common electrode COM2. The first subpixel SP1 includes a first pixel electrode PXL, and the second subpixel SP2 includes a second pixel electrode PXL.

The pixel electrode PXL and driving transistor DRT shown in FIG. 17 are assumed to be ones for the first subpixel SP1 of FIG. 11. The photo transistor PHT shown in FIG. 17 is assumed to be positioned between the first pixel electrode PXL of the first subpixel SP1 and the second pixel electrode PXL of the second subpixel SP2.

Referring to FIG. 17, when the photo transistor PHT has the first modified structure CASE 1, the respective first electrodes PE1 of the plurality of photo transistors PHT are electrically connected with the gate line GL.

Thus, referring to FIG. 17, when the photo transistor PHT has the first modified structure CASE 1, the row signal lines disposed between the first pixel electrode PXL of the first subpixel SP1 and the second pixel electrode PXL of the second subpixel SP2 include the gate line GL and photo control line PCL, but not the photo driving line PDL.

Referring to FIG. 17, when the photo transistor PHT has the first modified structure CASE 1, the gate line GL may be electrically connected with the first electrode PE1 of the photo transistor PHT positioned between the first pixel electrode PXL of the first subpixel SP1 and the second pixel electrode PXL of the second subpixel SP2.

The photo control line PCL may be electrically separated from the gate line GL and may transfer the photo control signal Vsto to the gate electrode PG of the photo transistor PHT positioned between the first pixel electrode PXL of the first subpixel SP1 and the second pixel electrode PXL of the second subpixel SP2.

Referring to FIG. 17, when the photo transistor PHT has the first modified structure CASE 1, the first electrode PE1 of the photo transistor PHT may be electrically connected with the gate line GL through the connection pattern CP_GL_PE1. More specifically, one side of the connection pattern CP_GL_PE1 is connected with the first electrode PE1 of the photo transistor PHT through the contact hole CNT1, and the opposite side of the connection pattern CP_GL_PE1 is connected with the extension of the gate line GL through the contact hole CNT_GL_PE1.

Referring to FIG. 17, when the photo transistor PHT has the first modified structure CASE 1, no photo driving line PDL is present between the first pixel electrode PXL of the first subpixel SP1 and the second pixel electrode PXL of the second subpixel SP2.

Thus, the proportion of the non-opening area NOA in the unit area UA may be reduced, and the proportion of the opening area may be increased. Thus, the aperture ratio and transmittance of the display panel DISP may be increased.

Figure 18:
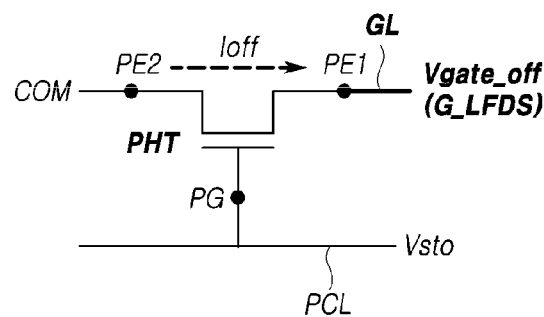
FIG. 18 is a view illustrating a direction of a leaking current through a photo transistor when the photo transistor has the first modified structure (CASE 1) in a display panel according to embodiments of the disclosure.

FIG. 18 is a view illustrating a direction of a leaking current Ioff through a photo transistor PHT when the photo transistor PHT has the first modified structure (CASE 1) in a display panel DISP according to embodiments of the disclosure.

Referring to FIG. 18, according to the first modified structure (CASE 1) of the photo transistor PHT, when the respective first electrodes PE1 of the plurality of photo transistors PHT are electrically connected with the gate line GL, the first electrode PE1 of at least one of the plurality of photo transistors PHT has a lower voltage value Vgate_off than the touch driving signal TDS during the touch driving period TDP.

Thus, referring to FIG. 18, by the first modified structure (CASE 1) of the photo transistor PHT, the direction of the leaking current flowing through at least one of the plurality of photo transistors PHT may be the direction from the second electrode PE2 to the first electrode PE1. In this case, sensing data may be data that is varied in the negative direction. That is, the sensing data may be data with a reducing value.

Figure 19:
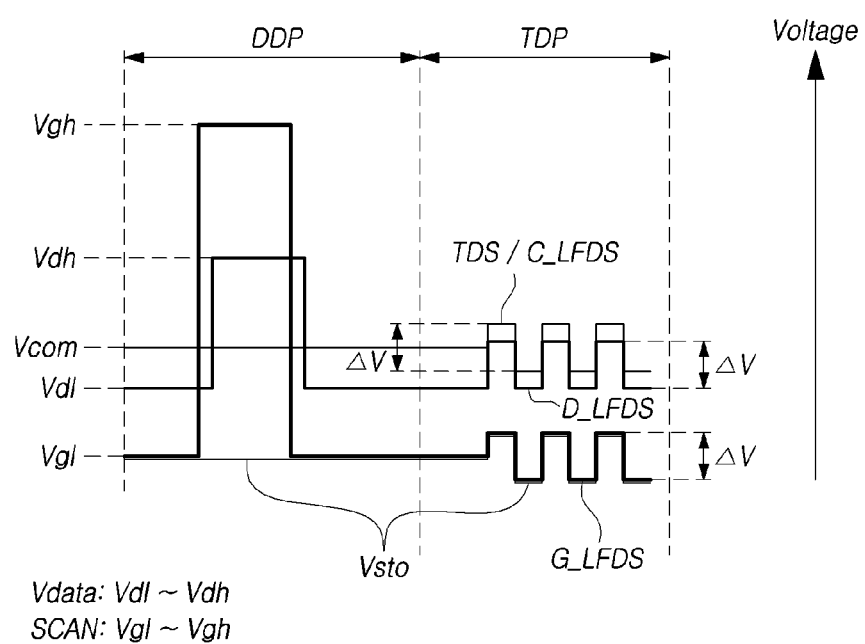
FIG. 19 is a view illustrating driving timings of a display device when a photo transistor has the first modified structure (CASE 1) in a display panel according to embodiments of the disclosure.

FIG. 19 is a view illustrating driving timings of a display device when a photo transistor PHT has the first modified structure (CASE 1) in a display panel DISP according to embodiments of the disclosure.

Referring to FIG. 19, when the photo transistor PHT has the first modified structure (CASE 1), the driving timing diagram is the same or similar to the driving timing diagram of FIG. 15 except that the driving timing diagram of FIG. 19 lacks the photo driving signal Vdrv.

Referring to FIG. 19, during the display driving period DDP, a scan signal SCAN with a turn-off level voltage period (Vgl period) and a turn-on level voltage period (Vgh period) is applied to the gate line GL connected with the respective first electrodes PE1 of the plurality of photo transistors PHT.

During the display driving period DDP, the scan signal SCAN may be applied to the respective first electrodes PE1 of the plurality of photo transistors PHT.

During the display driving period DDP, the photo control signal Vsto applied to the respective gate electrodes PG of the plurality of photo transistors PHT may have a DC voltage.

Referring to FIG. 19, during the touch driving period TDP, the gate load free driving signal G_LFDS whose voltage level is varied is applied to the gate line GL connected with the respective first electrodes PE1 of the plurality of photo transistors PHT.

Here, the voltage level of the gate load free driving signal G_LFDS may be varied within the turn-off level voltage range of the driving transistor DRT in the subpixel SP and may have an amplitude ($\Delta V$) corresponding to the amplitude ($\Delta V$) of the touch driving signal TDS.

During the touch driving period TDP, the voltage level of the photo control signal Vsto applied to the respective gate electrodes PG of the plurality of photo transistors PHT may be varied within the turn-off level voltage range and may have an amplitude ($\Delta V$) corresponding to the amplitude ($\Delta V$) of the touch driving signal TDS.

Figure 20:
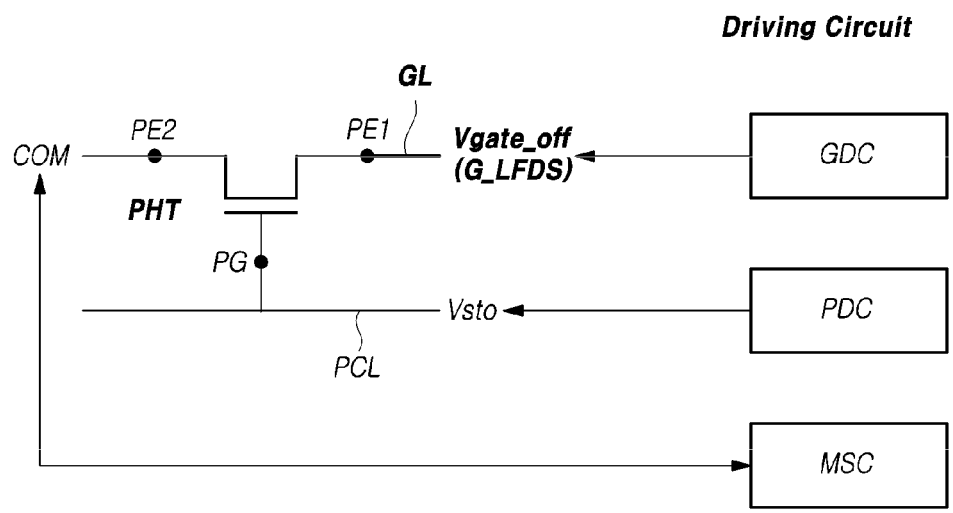
FIG. 20 is a view illustrating a driving circuit of a display device when a photo transistor has the first modified structure (CASE 1) in a display panel according to embodiments of the disclosure.

FIG. 20 is a view illustrating a driving circuit of a display device when a photo transistor PHT has the first modified structure (CASE 1) in a display panel DISP according to embodiments of the disclosure.

Referring to FIG. 20, a driving circuit according to embodiments of the disclosure is a circuit for driving a display panel DISP including a plurality of gate lines GL, a plurality of common electrodes COM, and a plurality of photo transistors PHT including a first electrode PE1, a second electrode PE2, and a gate electrode PG.

Referring to FIG. 20, the driving circuit according to embodiments of the disclosure may include a gate driving circuit GDC, a multi-sensing circuit MSC, and a photo driving circuit PDC.

When the photo transistor PHT has the first modified structure (CASE 1), the gate driving circuit GDC may supply the scan signal SCAN whose voltage level is varied within a turn-off level voltage range to the gate line GL electrically connected with the first electrode PE1 of the photo transistor PHT.

When the photo transistor PHT has the first modified structure (CASE 1), the multi-sensing circuit MSC may supply the touch driving signal TDS, which has the amplitude ($\Delta V$) corresponding to the amplitude ($\Delta V$) of the scan signal SCAN, to the common electrode COM electrically connected with the second electrode PE2 of the photo transistor PHT and sense the common electrode COM.

When the photo transistor PHT has the first modified structure (CASE 1), the photo driving circuit PDC may supply the photo control signal Vsto, which has the amplitude ($\Delta V$) corresponding to the amplitude ($\Delta V$) of the scan signal SCAN, to the gate electrode PG of the photo transistor PHT.

The multi-sensing circuit MSC may be implemented integrally with, or separately from, the data driving circuit DDC as described above. The multi-sensing circuit MSC and the photo driving circuit PDC may be implemented integrally with, or separately from, each other.

The multi-sensing circuit MSC may output sensing data based on the signal detected through at least one of the plurality of readout lines ROL.

Based on the sensing data output from the multi-sensing circuit MSC, the multi-controller MCTR may sense the presence or absence of a touch or the coordinates of the touch on the display device or sense the presence or absence of a light radiation or the coordinates of the light radiation to the display device.

Figure 21:
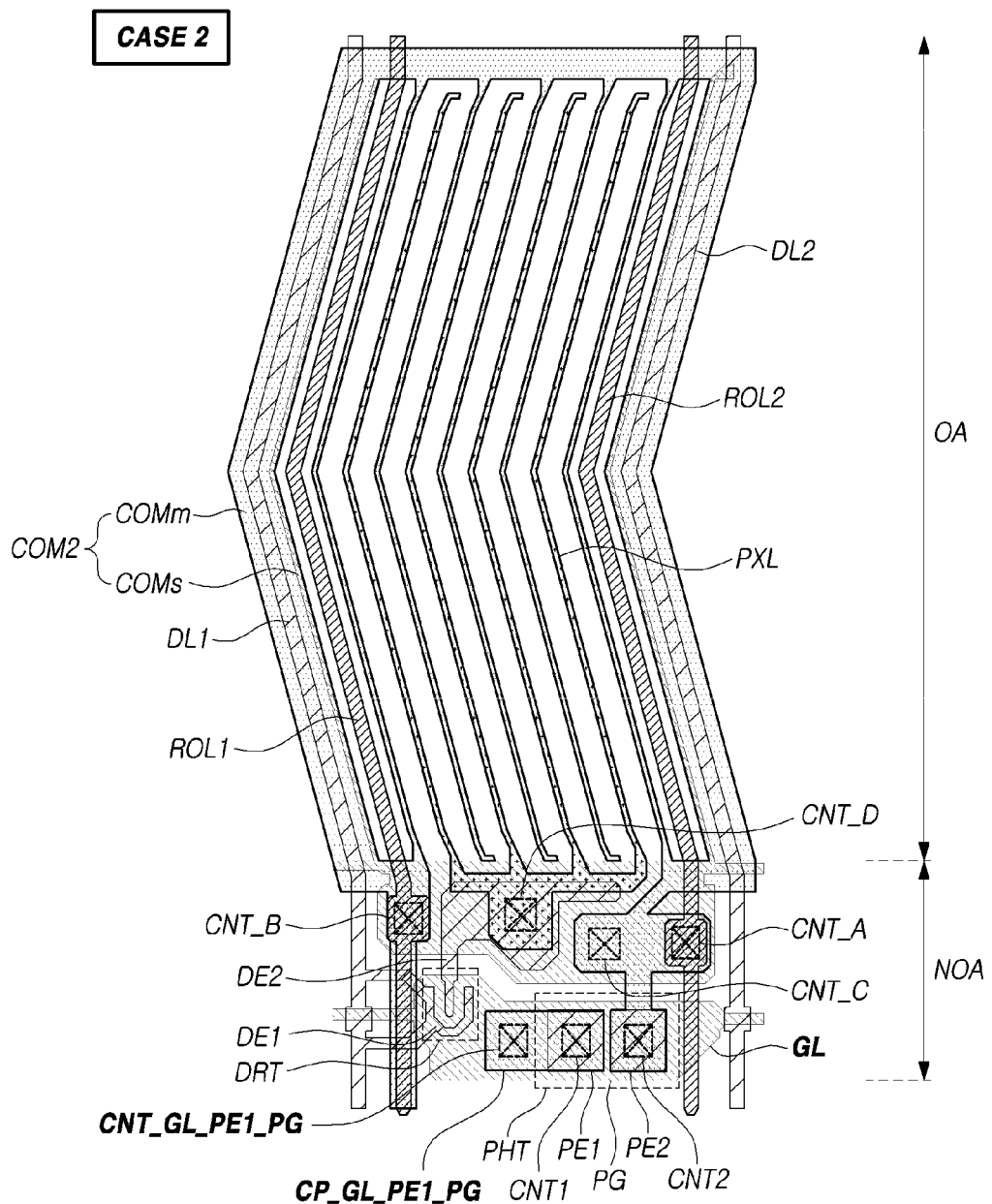
FIG. 21 is a plan view illustrating a unit area when a photo transistor has a second modified structure (CASE 2) in a display panel according to embodiments of the disclosure.

FIG. 21 is a plan view illustrating a unit area UA when a photo transistor PHT has a second modified structure (CASE 2) in a display panel DISP according to embodiments of the disclosure.

The plurality of subpixels SP include a first subpixel SP1 and a second subpixel SP2 positioned adjacent to each other in a second direction (e.g., column direction) in the area occupied by the second common electrode COM2. The first subpixel SP1 includes a first pixel electrode PXL, and the second subpixel SP2 includes a second pixel electrode PXL.

The pixel electrode PXL and driving transistor DRT shown in FIG. 21 are assumed to be ones for the first subpixel SP1 of FIG. 11. The photo transistor PHT shown in FIG. 21 is assumed to be positioned between the first pixel electrode PXL of the first subpixel SP1 and the second pixel electrode PXL of the second subpixel SP2.

Referring to FIG. 21, when the photo transistor PHT has the second modified structure CASE 2, the respective first electrodes PE1 and gate electrodes PG of the plurality of photo transistors PHT are electrically connected with the gate line GL.

Thus, referring to FIG. 21, when the photo transistor PHT has the second modified structure CASE 2, the row signal lines disposed between the first pixel electrode PXL of the first subpixel SP1 and the second pixel electrode PXL of the second subpixel SP2 include the gate line GL but not the photo control line PCL and photo driving line PDL.

Referring to FIG. 21, when the photo transistor PHT has the second modified structure CASE 2, the gate line GL may be electrically connected with the first electrode PE1 and gate electrode PG of the photo transistor PHT positioned between the first pixel electrode PXL of the first subpixel SP1 and the second pixel electrode PXL of the second subpixel SP2.

Referring to FIG. 21, when the photo transistor PHT has the second modified structure CASE 2, the first electrode PE1 of the photo transistor PHT may be electrically connected with the gate line GL through the connection pattern CP_GL_PE1_PG, and the gate line GL plays a role as the gate electrode PG of the photo transistor PHT.

More specifically, one side of the connection pattern CP_GL_PE1_PG is connected with the first electrode PE1 of the photo transistor PHT through the contact hole CNT1, and the opposite side of the connection pattern CP_GL_PE1_PG is connected with the gate line GL through the contact hole CNT_GL_PE1_PG.

Referring to FIG. 21, when the photo transistor PHT has the second modified structure CASE 2, neither the photo control line PCL nor the photo driving line PDL is present between the first pixel electrode PXL of the first subpixel SP1 and the second pixel electrode PXL of the second subpixel SP2.

Thus, the proportion of the non-opening area NOA in the unit area UA may be significantly reduced, and the proportion of the opening area may be significantly increased. Thus, the aperture ratio and transmittance of the display panel DISP may be significantly increased.

Figure 22:
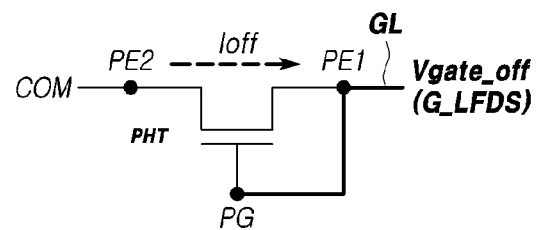
FIG. 22 is a view illustrating a direction of a leaking current through a photo transistor when the photo transistor has the second modified structure (CASE 2) in a display panel according to embodiments of the disclosure.

FIG. 22 is a view illustrating a direction of a leaking current Ioff through a photo transistor PHT when the photo transistor PHT has the second modified structure (CASE 2) in a display panel DISP according to embodiments of the disclosure.

Referring to FIG. 22, according to the second modified structure (CASE 2) of the photo transistor PHT, when the respective first electrodes PE1 and gate electrodes PG of the plurality of photo transistors PHT are electrically connected with the gate line GL, the first electrode PE1 of at least one of the plurality of photo transistors PHT may have a lower voltage value Vgate_off than the touch driving signal TDS during the touch driving period TDP.

Thus, referring to FIG. 22, by the second modified structure (CASE 2) of the photo transistor PHT, the direction of the leaking current flowing through at least one of the plurality of photo transistors PHT may be the direction from the second electrode PE2 to the first electrode PE1. In this case, sensing data may be data that is varied in the negative direction. That is, the sensing data may be data with a reducing value.

Figure 23:
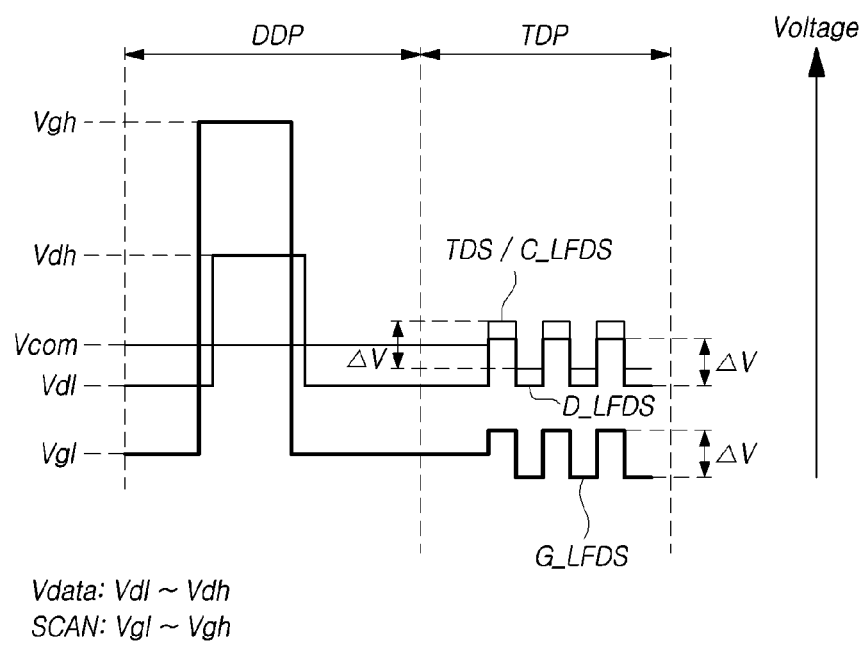
FIG. 23 is a view illustrating driving timings of a display device when a photo transistor has the second modified structure (CASE 2) in a display panel according to embodiments of the disclosure.

FIG. 23 is a view illustrating driving timings of a display device when a photo transistor PHT has the second modified structure (CASE 2) in a display panel DISP according to embodiments of the disclosure.

Referring to FIG. 23, when the photo transistor PHT has the second modified structure (CASE 2), the driving timing diagram is the same or similar to the driving timing diagram of FIG. 15 except that the driving timing diagram of FIG. 23 lacks the photo driving signal Vdrv and photo control signal Vsto.

Referring to FIG. 23, during the display driving period DDP, a scan signal SCAN with a turn-off level voltage period (Vgl period) and a turn-on level voltage period (Vgh period) is applied to the gate line GL jointly connected with the respective first electrodes PE1 and gate electrodes PG of the plurality of photo transistors PHT.

During the display driving period DDP, the scan signal SCAN may be applied jointly to the respective first electrodes PE1 and gate electrodes PG of the plurality of photo transistors PHT.

Referring to FIG. 23, during the touch driving period TDP, the gate load free driving signal G_LFDS whose voltage level is varied may be applied to the gate line GL jointly connected with the respective first electrodes PE1 and gate electrodes PG of the plurality of photo transistors PHT.

The voltage level of the gate load free driving signal G_LFDS may be varied within the turn-off level voltage range of the driving transistor DRT and photo transistor PHT in the subpixel SP and may have an amplitude (ΔV) corresponding to the amplitude (ΔV) of the touch driving signal TDS.

Figure 24:
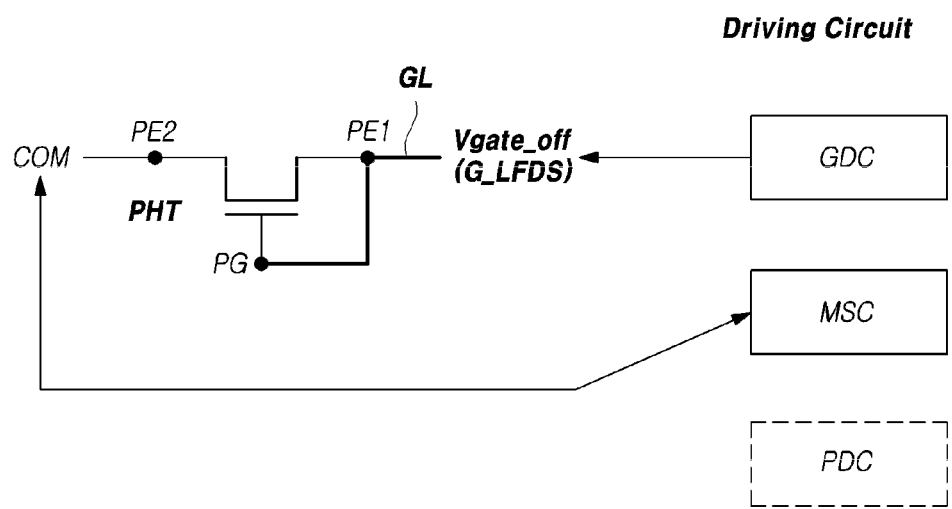
FIG. 24 is a view illustrating a driving circuit of a display device when a photo transistor has the second modified structure (CASE 2) in a display panel according to embodiments of the disclosure.

FIG. 24 is a view illustrating a driving circuit of a display device when a photo transistor PHT has the second modified structure (CASE 2) in a display panel DISP according to embodiments of the disclosure.

Referring to FIG. 24, a display device according to embodiments of the disclosure may include a driving circuit for driving a display panel DISP including a plurality of gate lines GL, a plurality of common electrodes COM, and a plurality of photo transistors PHT including a first electrode PE1, a second electrode PE2, and a gate electrode PG.

According to embodiments of the disclosure, the driving circuit may include a gate driving circuit GDC and a multi-sensing circuit MSC.

When the photo transistor PHT has the second modified structure (CASE 2), the gate driving circuit GDC may supply the scan signal SCAN whose voltage level is varied within a turn-off level voltage range to the gate line GL electrically connected with the first electrode PE1 and gate electrode PG of the photo transistor PHT.

When the photo transistor PHT has the second modified structure (CASE 2), the multi-sensing circuit MSC may supply the touch driving signal TDS, which has the amplitude (ΔV) corresponding to the amplitude (ΔV) of the scan signal SCAN, to the common electrode COM electrically connected with the second electrode PE2 of the photo transistor PHT and sense the common electrode COM.

The multi-sensing circuit MSC may be implemented integrally with, or separately from, the data driving circuit DDC as described above. The multi-sensing circuit MSC and the photo driving circuit PDC may be implemented integrally with, or separately from, each other.

The multi-sensing circuit MSC may output sensing data based on the signal detected through at least one of the plurality of readout lines ROL.

Based on the sensing data output from the multi-sensing circuit MSC, the multi-controller MCTR may sense the presence or absence of a touch or the coordinates of the touch on the display device or sense the presence or absence of a light radiation or the coordinates of the light radiation to the display device.

Figure 25:
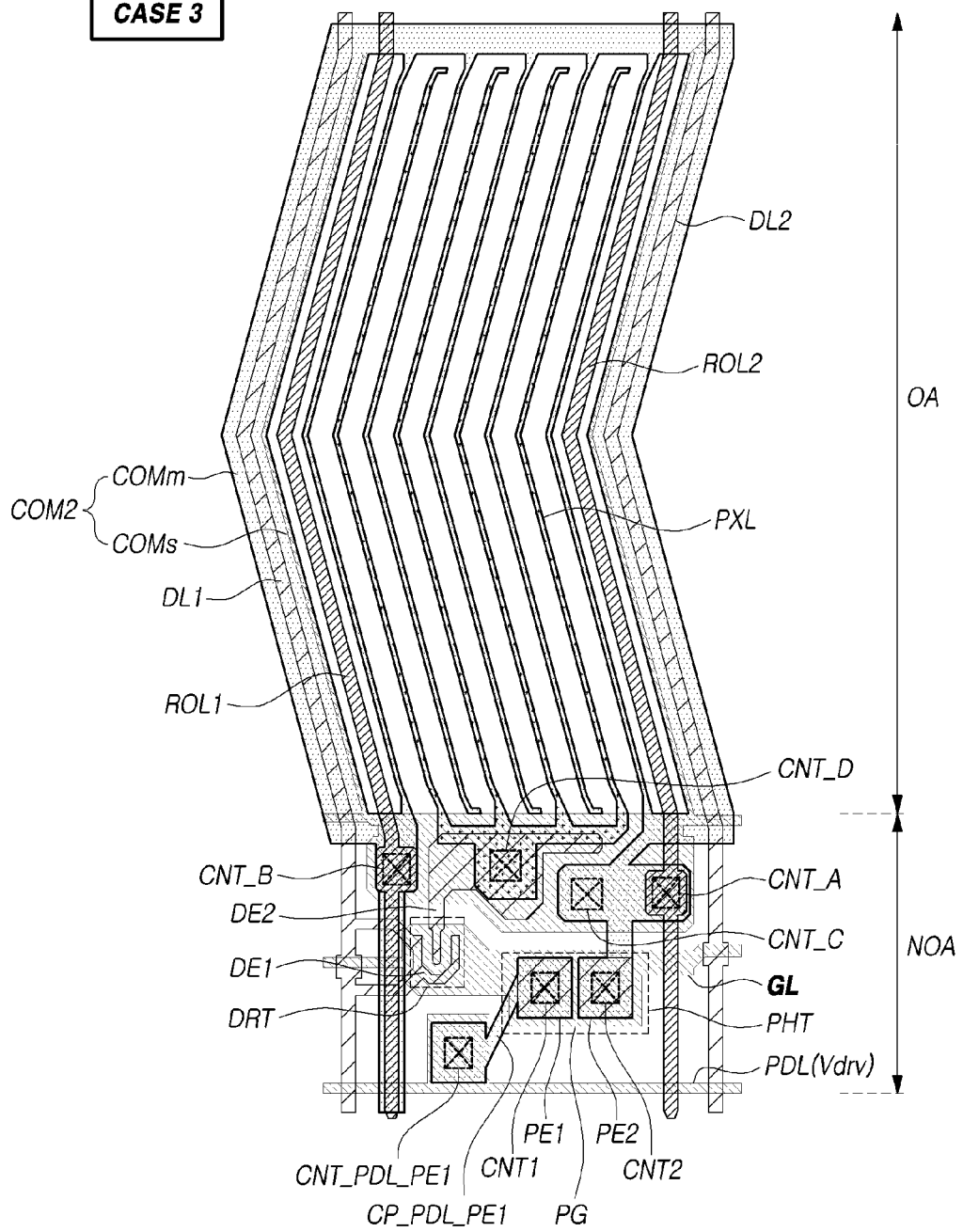
FIG. 25 is a plan view illustrating a unit area when a photo transistor has a third modified structure (CASE 3) in a display panel according to embodiments of the disclosure.

FIG. 25 is a plan view illustrating a unit area UA when a photo transistor PHT has a third modified structure (CASE 3) in a display panel DISP according to embodiments of the disclosure.

The plurality of subpixels SP include a first subpixel SP1 and a second subpixel SP2 positioned adjacent to each other in a second direction (e.g., column direction) in the area occupied by the second common electrode COM2. The first subpixel SP1 includes a first pixel electrode PXL, and the second subpixel SP2 includes a second pixel electrode PXL.

The pixel electrode PXL and driving transistor DRT shown in FIG. 25 are assumed to be ones for the first subpixel SP1 of FIG. 11. The photo transistor PHT shown in FIG. 25 is assumed to be positioned between the first pixel electrode PXL of the first subpixel SP1 and the second pixel electrode PXL of the second subpixel SP2.

Referring to FIG. 25, when the photo transistor PHT has the third modified structure CASE 3, the respective gate electrodes PG of the plurality of photo transistors PHT are electrically connected with the gate line GL.

Thus, referring to FIG. 25, when the photo transistor PHT has the third modified structure CASE 3, the row signal lines disposed between the first pixel electrode PXL of the first subpixel SP1 and the second pixel electrode PXL of the second subpixel SP2 include the gate line GL and photo driving line PDL, but not the photo control line PCL.

Referring to FIG. 25, when the photo transistor PHT has the third modified structure CASE 3, the gate line GL disposed between the first pixel electrode PXL of the first subpixel SP1 and the second pixel electrode PXL of the second subpixel SP2 may be electrically connected with the gate electrode PG of the photo transistor PHT positioned between the first pixel electrode PXL and the second pixel electrode PXL.

Referring to FIG. 25, when the photo transistor PHT has the third modified structure CASE 3, the photo driving line PDL disposed between the first pixel electrode PXL of the first subpixel SP1 and the second pixel electrode PXL of the second subpixel SP2 may be electrically separated from the gate line GL and may transfer the photo driving signal Vdrv to the first electrode PE1 of the photo transistor PHT positioned between the first pixel electrode PXL and the second pixel electrode PXL.

The first electrode PE1 and second electrode PE2 of the photo transistor PHT overlap the extension of the gate line GL. The portion of the gate line GL, which overlaps the first electrode PE1 and second electrode PE2 of the photo transistor PHT, plays a role as the gate electrode PG of the photo transistor PHT.

The first electrode PE1 of the photo transistor PHT is electrically connected with the extension of the photo driving line PDL through the connection pattern CP_PDL_PE1.

One side of the connection pattern CP_PDL_PE1 is connected with the first electrode PE1 of the photo transistor PHT through the first contact hole CNT1. The opposite side of the connection pattern CP_PDL_PE1 is connected with the extension of the photo driving line PDL through the contact hole CNT_PDL_PE1.

Referring to FIG. 25, when the photo transistor PHT has the third modified structure CASE 3, no photo control line PCL is present between the first pixel electrode PXL of the first subpixel SP1 and the second pixel electrode PXL of the second subpixel SP2.

Thus, the proportion of the non-opening area NOA in the unit area UA may be reduced, and the proportion of the opening area may be increased. Thus, the aperture ratio and transmittance of the display panel DISP may be increased.

Figure 26:
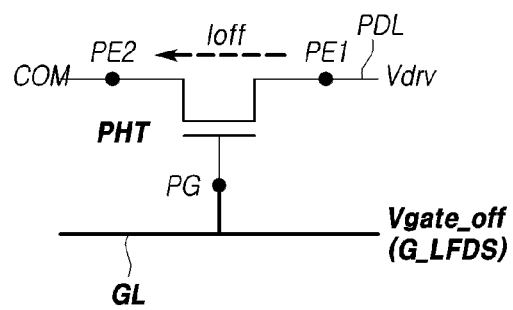
FIG. 26 is a view illustrating a direction of a leaking current through a photo transistor when the photo transistor has the third modified structure (CASE 3) in a display panel according to embodiments of the disclosure.

FIG. 26 is a view illustrating a direction of a leaking current Ioff through a photo transistor PHT when the photo transistor PHT has the third modified structure (CASE 3) in a display panel DISP according to embodiments of the disclosure.

Referring to FIG. 26, according to the third modified structure (CASE 3) of the photo transistor PHT, when the respective gate electrodes PG of the plurality of photo transistors PHT are electrically connected with the gate line GL, the first electrode PE1 of at least one of the plurality of photo transistors PHT have a higher voltage value Vdrv than the touch driving signal TDS during the touch driving period TDP.

Thus, referring to FIG. 26, by the third modified structure (CASE 3) of the photo transistor PHT, the direction of the leaking current flowing through at least one of the plurality of photo transistors PHT may be the direction from the first electrode PE1 to the second electrode PE2. In this case, sensing data may be data that is varied in the positive direction. That is, the sensing data may be data with an increasing value.

Figure 27:
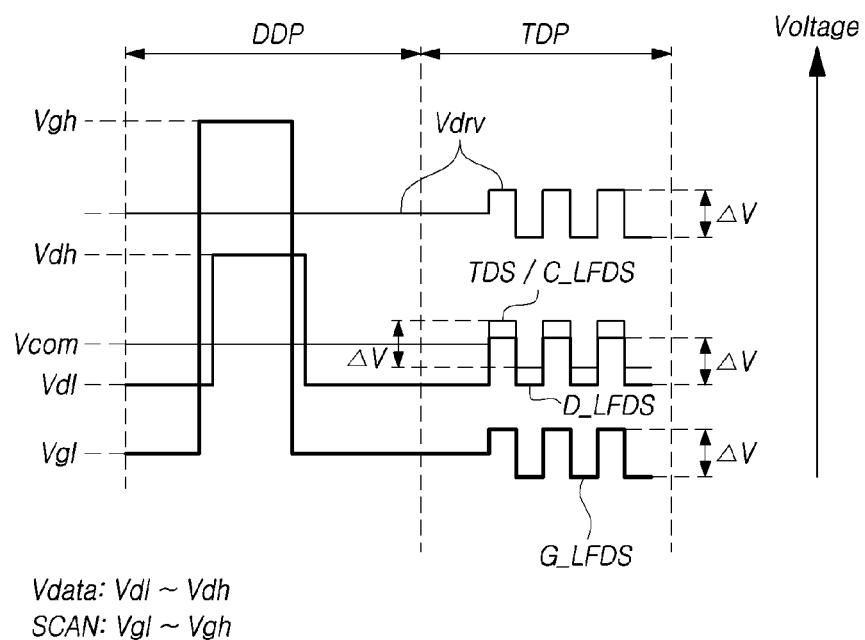
FIG. 27 is a view illustrating driving timings of a display device when a photo transistor has the third modified structure (CASE 3) in a display panel according to embodiments of the disclosure.

FIG. 27 is a view illustrating driving timings of a display device when a photo transistor PHT has the third modified structure (CASE 3) in a display panel DISP according to embodiments of the disclosure.

Referring to FIG. 27, when the photo transistor PHT has the third modified structure (CASE 3), the driving timing diagram is the same or similar to the driving timing diagram of FIG. 15 except that the driving timing diagram of FIG. 27 lacks the photo control signal Vsto.

Referring to FIG. 27, during the display driving period DDP, a scan signal SCAN with a turn-off level voltage period and a turn-on level voltage period may be applied to the gate line GL connected with the respective gate electrodes PG of the plurality of photo transistors PHT.

During the display driving period DDP, the scan signal SCAN may be applied to the respective gate electrodes PG of the plurality of photo transistors PHT.

During the display driving period DDP, the photo driving signal Vdrv applied to the respective first electrodes PE1 of the plurality of photo transistors PHT may have a DC voltage.

Referring to FIG. 27, during the touch driving period TDP, the gate load free driving signal G_LFDS whose voltage level is varied may be applied to the gate line GL connected with the respective gate electrodes PG of the plurality of photo transistors PHT.

The voltage level of the gate load free driving signal G_LFDS may be varied within the turn-off level voltage range of the driving transistor DRT and photo transistor PHT in the subpixel SP and may have an amplitude ($\Delta V$) corresponding to the amplitude ($\Delta V$) of the touch driving signal TDS.

During the touch driving period TDP, the photo driving signal Vdrv applied to the respective first electrodes PE1 of the plurality of photo transistors PHT may have an amplitude ($\Delta V$) corresponding to the amplitude ($\Delta V$) of the touch driving signal TDS.

Figure 28:
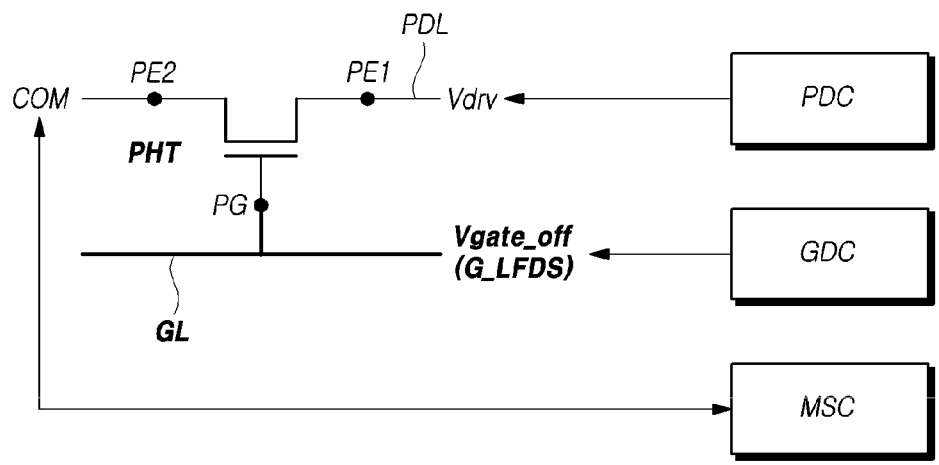
FIG. 28 is a view illustrating a driving circuit of a display device when a photo transistor has the third modified structure (CASE 3) in a display panel according to embodiments of the disclosure.

FIG. 28 is a view illustrating a driving circuit of a display device when a photo transistor PHT has the third modified structure (CASE 3) in a display panel DISP according to embodiments of the disclosure.

Referring to FIG. 28, a display device according to embodiments of the disclosure may include a driving circuit for driving a display panel DISP including a plurality of gate lines GL, a plurality of common electrodes COM, and a plurality of photo transistors PHT including a first electrode PE1, a second electrode PE2, and a gate electrode PG.

The driving circuit according to embodiments of the disclosure may include a gate driving circuit GDC, a multi-sensing circuit MSC, and a photo driving circuit PDC.

When the photo transistor PHT has the third modified structure (CASE 3), the gate driving circuit GDC may supply the scan signal SCAN whose voltage level is varied within a turn-off level voltage range to the gate line GL electrically connected with the gate electrode PG of the photo transistor PHT.

When the photo transistor PHT has the third modified structure (CASE 3), the multi-sensing circuit MSC may supply the touch driving signal TDS, which has the amplitude ($\Delta V$) corresponding to the amplitude ($\Delta V$) of the scan signal SCAN, to the common electrode COM electrically connected with the second electrode PE2 of the photo transistor PHT and sense the common electrode COM.

When the photo transistor PHT has the third modified structure (CASE 3), the photo driving circuit PDC may supply the photo driving signal Vdrv, which has the amplitude ($\Delta V$) corresponding to the amplitude ($\Delta V$) of the scan signal SCAN, to the first electrode PE1 of the photo transistor PHT.

The multi-sensing circuit MSC may be implemented integrally with, or separately from, the data driving circuit DDC as described above. The multi-sensing circuit MSC and the photo driving circuit PDC may be implemented integrally with, or separately from, each other.

The multi-sensing circuit MSC may output sensing data based on the signal detected through at least one of the plurality of readout lines ROL.

Based on the sensing data output from the multi-sensing circuit MSC, the multi-controller MCTR may sense the presence or absence of a touch or the coordinates of the touch on the display device or sense the presence or absence of a light radiation or the coordinates of the light radiation to the display device.

Figure 29:
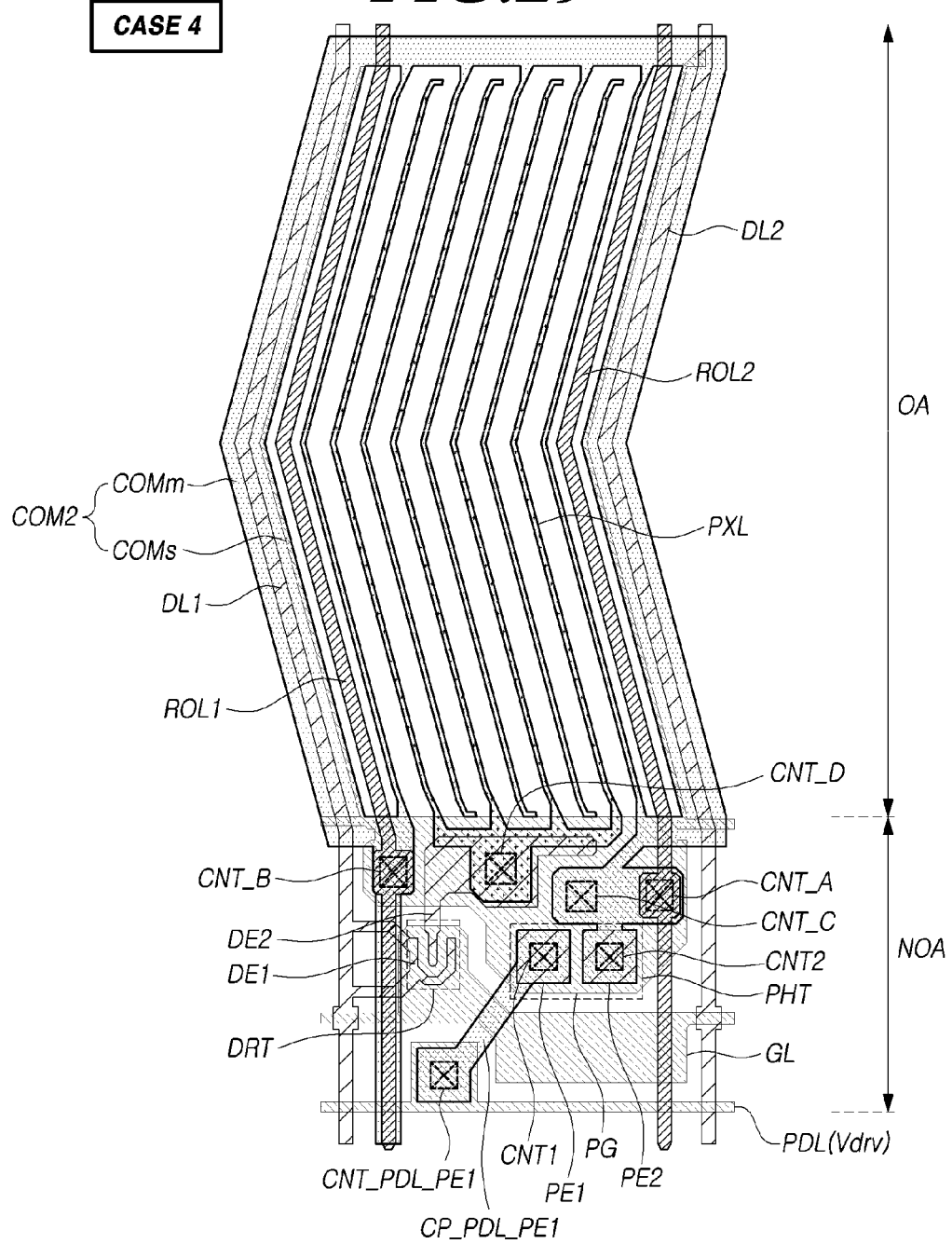
FIG. 29 is a plan view illustrating a unit area when a photo transistor has a fourth modified structure (CASE 4) in a display panel according to embodiments of the disclosure.

FIG. 29 is a plan view illustrating a unit area UA when a photo transistor PHT has a fourth modified structure (CASE 4) in a display panel DISP according to embodiments of the disclosure.

The plurality of subpixels SP include a first subpixel SP1 and a second subpixel SP2 positioned adjacent to each other in a second direction (e.g., column direction) in the area occupied by the second common electrode COM2. The first subpixel SP1 includes a first pixel electrode PXL, and the second subpixel SP2 includes a second pixel electrode PXL.

The pixel electrode PXL and driving transistor DRT shown in FIG. 29 are assumed to be ones for the first subpixel SP1 of FIG. 11. The photo transistor PHT shown in FIG. 29 is assumed to be positioned between the first pixel electrode PXL of the first subpixel SP1 and the second pixel electrode PXL of the second subpixel SP2.

Referring to FIG. 29, when the photo transistor PHT has the fourth modified structure CASE 4, the respective gate electrodes PG of the plurality of photo transistors PHT are electrically connected with the second electrode PE2 of the corresponding photo transistor PHT or the common electrode COM electrically connected with the second electrode PE2. That is, the respective gate electrodes PG and second electrodes PE2 of the plurality of photo transistors PHT are electrically connected with each other.

Thus, referring to FIG. 29, when the photo transistor PHT has the fourth modified structure CASE 4, the row signal lines disposed between the first pixel electrode PXL of the first subpixel SP1 and the second pixel electrode PXL of the second subpixel SP2 include the gate line GL and photo driving line PDL, but not the photo control line PCL.

Referring to FIG. 29, when the photo transistor PHT has the fourth modified structure CASE 4, the gate line GL may be positioned between the first pixel electrode PXL of the first subpixel SP1 and the second pixel electrode PXL of the second subpixel SP2.

Referring to FIG. 29, when the photo transistor PHT has the fourth modified structure CASE 4, the photo driving line PDL may be electrically separated from the gate line GL and may transfer the photo driving signal Vdrv to the first electrode PE1 of the photo transistor PHT positioned between the first pixel electrode PXL of the first subpixel SP1 and the second pixel electrode PXL of the second subpixel SP2.

Referring to FIG. 29, the first electrode PE1 and second electrode PE2 of the photo transistor PHT are positioned to overlap the auxiliary electrode COMs of the second common electrode COM2. The auxiliary electrode COMs of the second common electrode COM2 plays a role as the gate electrode PG of the photo transistor PHT.

The first electrode PE1 of the photo transistor PHT is electrically connected with the photo driving circuit PDC through the connection pattern CP_PDL_PE1. More specifically, one side of the connection pattern CP_PDL_PE1 is connected with the first electrode PE1 of the photo transistor PHT through the first contact hole CNT1. The opposite side of the connection pattern CP_PDL_PE1 is connected with the extension of the photo driving line PDL through the contact hole CNT_PDL_PE1.

The second electrode PE2 of the photo transistor PHT is connected with the main electrode COMm of the second common electrode COM2 through the second contact hole CNT2.

Figure 30:
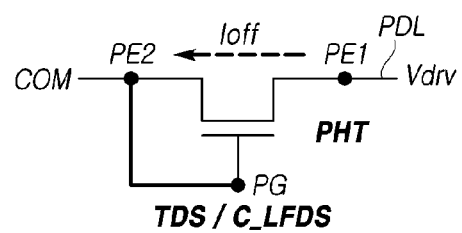
FIG. 30 is a view illustrating a direction of a leaking current through a photo transistor when the photo transistor has the fourth modified structure (CASE 4) in a display panel according to embodiments of the disclosure.

FIG. 30 is a view illustrating a direction of a leaking current Ioff through a photo transistor PHT when the photo transistor PHT has the fourth modified structure (CASE 4) in a display panel DISP according to embodiments of the disclosure.

Referring to FIG. 30, according to the fourth modified structure (CASE 4) of the photo transistor PHT, during the touch driving period TDP, the first electrode PE1 of at least one of the plurality of photo transistors PHT has a higher voltage value Vdrv than the touch driving signal TDS.

Figure 31:
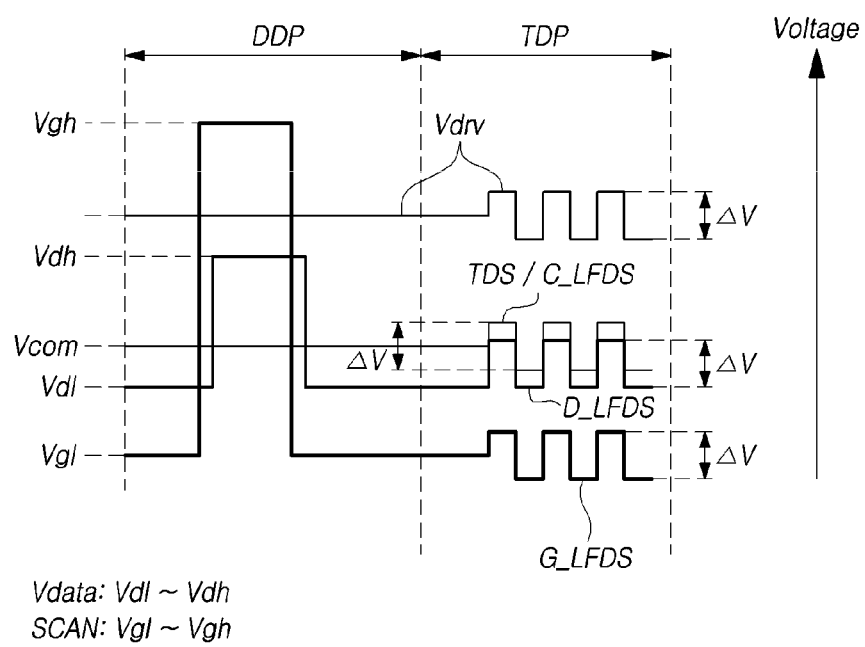
FIG. 31 is a view illustrating driving timings of a display device when a photo transistor has the fourth modified structure (CASE 4) in a display panel according to embodiments of the disclosure.

Thus, referring to FIG. 31, by the fourth modified structure (CASE 4) of the photo transistor PHT, the direction of the leaking current flowing through at least one of the plurality of photo transistors PHT may be the direction from the first electrode PE1 to the second electrode PE2. In this case, sensing data may be data that is varied in the positive direction. That is, the sensing data may be data with an increasing value.

FIG. 31 is a view illustrating driving timings of a display device when a photo transistor PHT has the fourth modified structure (CASE 4) in a display panel DISP according to embodiments of the disclosure.

Referring to FIG. 31, when the photo transistor PHT has the fourth modified structure (CASE 4), the driving timing diagram is the same or similar to the driving timing diagram of FIG. 15 except that the driving timing diagram of FIG. 31 lacks the photo control signal Vsto.

Referring to FIG. 31, when the photo transistor PHT has the fourth modified structure (CASE 4), during the display driving period DDP, the display common voltage Vcom may be applied to the plurality of common electrodes COM, and the display common voltage Vcom may be applied jointly to the respective second electrodes PE2 and gate electrodes PG of the plurality of photo transistors PHT.

Referring to FIG. 31, when the photo transistor PHT has the fourth modified structure (CASE 4), during the touch driving period TDP, the touch driving signal TDS whose voltage level is varied may be applied to at least one of the plurality of common electrodes COM, and the touch driving signal TDS may be applied jointly to the second electrode PE2 and gate electrode PG of at least one of the plurality of photo transistors PHT.

Referring to FIG. 31, when the photo transistor PHT has the fourth modified structure (CASE 4), during the touch driving period TDP, the touch driving signal TDS, in some embodiments, is also applied to the gate electrode PG of at least one of the plurality of photo transistors PHT to play a role as the photo control signal Vsto.

Thus, referring to FIG. 31, when the photo transistor PHT has the fourth modified structure (CASE 4), the voltage level of the touch driving signal TDS, in some embodiments, is varied within the turn-off level voltage range of the photo transistor PHT during the touch driving period TDP. Thus, photo sensing may be rendered possible.

Figure 32:
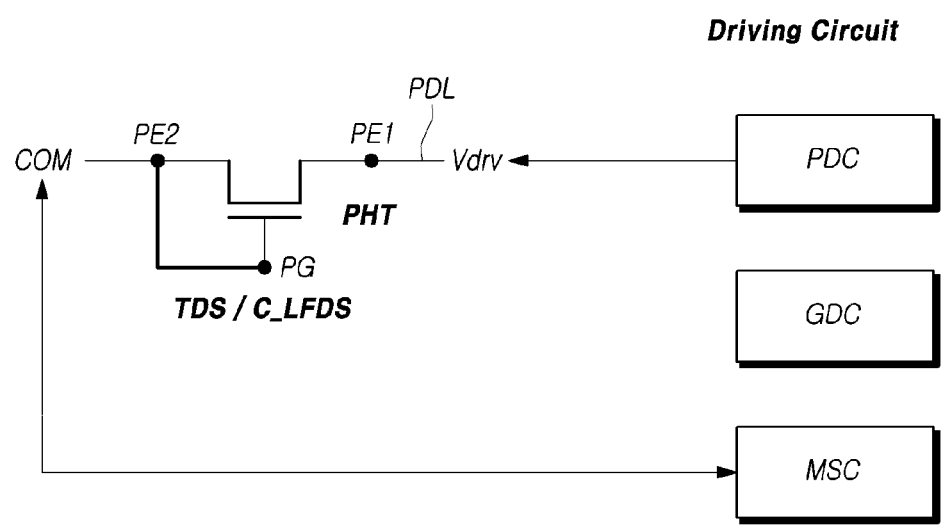
FIG. 32 is a view illustrating a driving circuit of a display device when a photo transistor has the fourth modified structure (CASE 4) in a display panel according to embodiments of the disclosure.

FIG. 32 is a view illustrating a driving circuit of a display device when a photo transistor PHT has the fourth modified structure (CASE 4) in a display panel DISP according to embodiments of the disclosure.

Referring to FIG. 32, a display device according to embodiments of the disclosure may include a driving circuit for driving a display panel DISP including a plurality of gate lines GL, a plurality of common electrodes COM, and a plurality of photo transistors PHT including a first electrode PE1, a second electrode PE2, and a gate electrode PG.

The driving circuit according to embodiments of the disclosure may include a gate driving circuit GDC, a multi-sensing circuit MSC, and a photo driving circuit PDC.

When the photo transistor PHT has the fourth modified structure (CASE 4), the gate driving circuit GDC may supply the scan signal SCAN whose voltage level is varied within a turn-off level voltage range to the gate line GL.

When the photo transistor PHT has the fourth modified structure (CASE 4), the multi-sensing circuit MSC may supply the touch driving signal TDS, which has the amplitude ($\Delta V$) corresponding to the amplitude ($\Delta V$) of the scan signal SCAN, to the common electrode COM electrically connected with the second electrode PE2 and gate electrode PG of the photo transistor PHT and sense the common electrode COM.

When the photo transistor PHT has the fourth modified structure (CASE 4), the photo driving circuit PDC may supply the photo driving signal Vdrv, which has the amplitude ($\Delta V$) corresponding to the amplitude ($\Delta V$) of the scan signal SCAN, to the first electrode PE1 of the photo transistor PHT.

The multi-sensing circuit MSC may be implemented integrally with, or separately from, the data driving circuit DDC as described above. The multi-sensing circuit MSC and the photo driving circuit PDC may be implemented integrally with, or separately from, each other.

The multi-sensing circuit MSC may output sensing data based on the signal detected through at least one of the plurality of readout lines ROL.

Based on the sensing data output from the multi-sensing circuit MSC, the multi-controller MCTR may sense the presence or absence of a touch or the coordinates of the touch on the display device or sense the presence or absence of a light radiation or the coordinates of the light radiation to the display device.

FIGS. 33 to 36 are views illustrating an arrangement of color filters CF in three subpixel (SP) area in a display panel DISP according to embodiments of the disclosure.

Referring to FIGS. 33 to 36, a plurality of subpixels SP may include a first color subpixel SPr, a second color subpixel SPg, and a third color subpixel SPb arranged in the row direction.

Referring to FIGS. 33 to 36, the first color subpixel SPr may include a first opening area OAr and a first non-opening area NOAr. The second color subpixel SPg may include a second opening area OAg and a second non-opening area NOAg. The third color subpixel SPb may include a third opening area OAb and a third non-opening area NOAb.

Referring to FIGS. 33 to 36, a first-color color filter CFr, a second-color color filter CFg, and a third-color color filter CFb may be disposed in the first opening area OAr, the second opening area OAg, and the third opening area OAb, respectively.

Referring to FIGS. 33 to 36, the first-color color filter CFr may extend up to the first non-opening area NOAr. The third-color color filter CFb may extend up to the third non-opening area NOAb.

Referring to FIGS. 33 to 36, the first-color color filter CFr extending up to the first non-opening area NOAr may be disposed to expand up to the second non-opening area NOAg and the third non-opening area NOAb. The third-color color filter CFb extending up to the third non-opening area NOAb may be disposed to expand up to the second non-opening area NOAg and the first non-opening area NOAr.

Thus, the first-color color filter CFr and the third-color color filter CFb may be disposed to overlap in the first non-opening area NOAr, the second non-opening area NOAg, and the third non-opening area NOAb. Thus, light may be prevented from being transmitted through the first non-opening area NOAr, second non-opening area NOAg, and third non-opening area NOAb.

For example, the above-mentioned first color, second color, and third color may be red, green, and blue, respectively. However, the first, second, and third colors may be varied in order or color itself.

Figure 33:
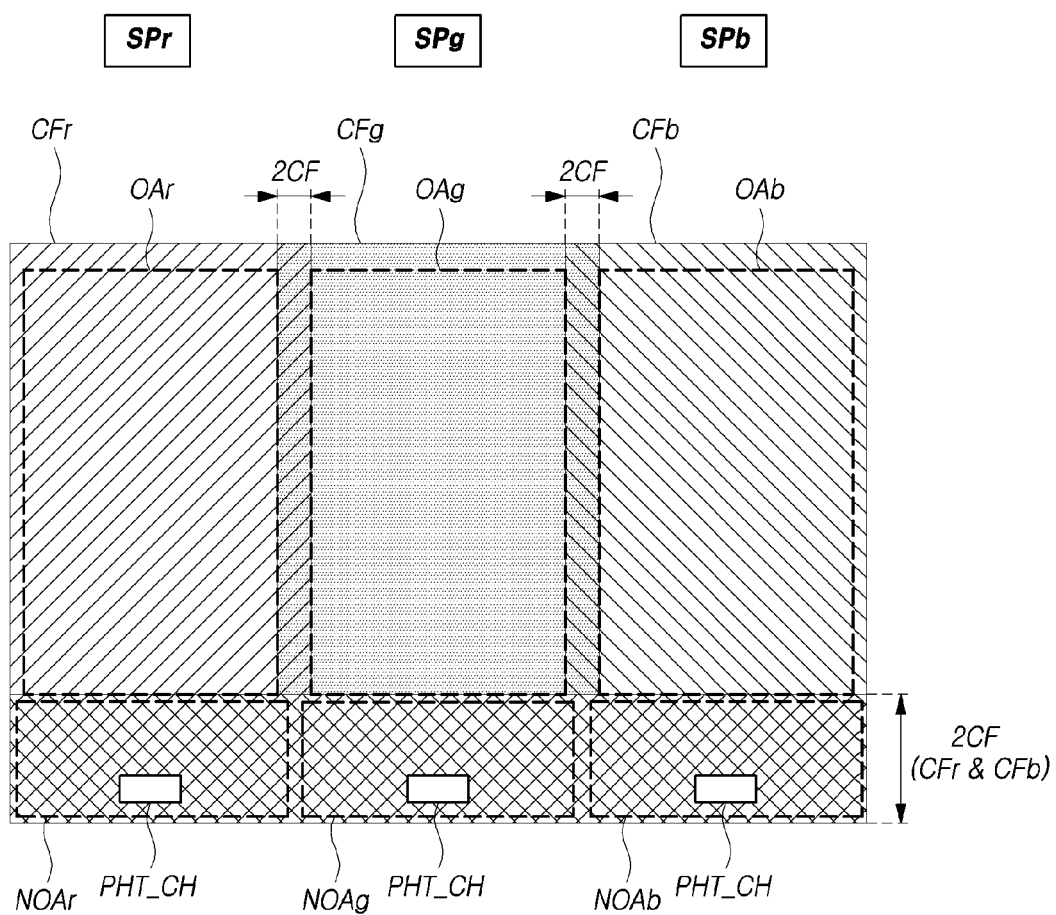
FIGS. 33, 34, 35, and 36 are views illustrating an arrangement of color filters in three subpixel area in a display panel according to embodiments of the disclosure.

Referring to FIG. 33, in the area where the channel PTH_CH of the photo transistor PHT is positioned in the first non-opening area NOAr, second non-opening area NOAg, and third non-opening area NOAb, the first-color color filter CFr and third-color color filter CFb may be opened to expose the channel PTH_CH of the photo transistor PHT.

Figure 34:
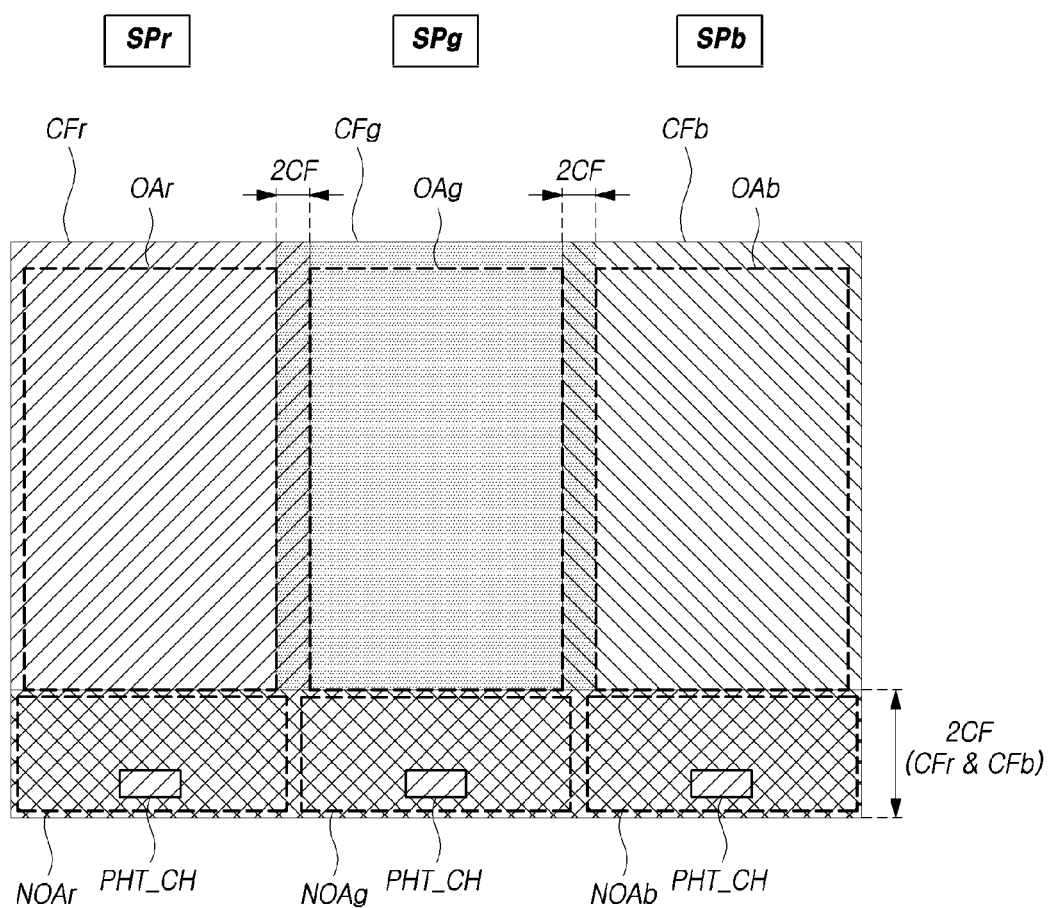
Figure 35:
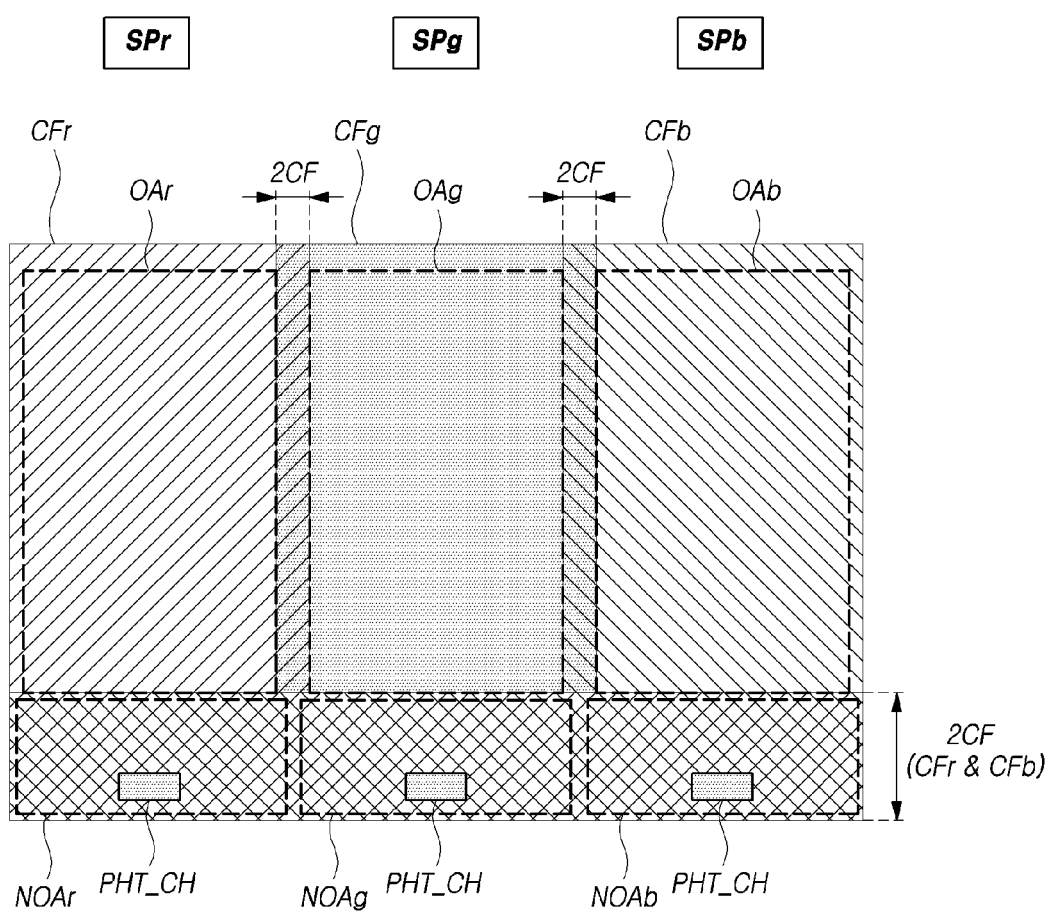
Figure 36:
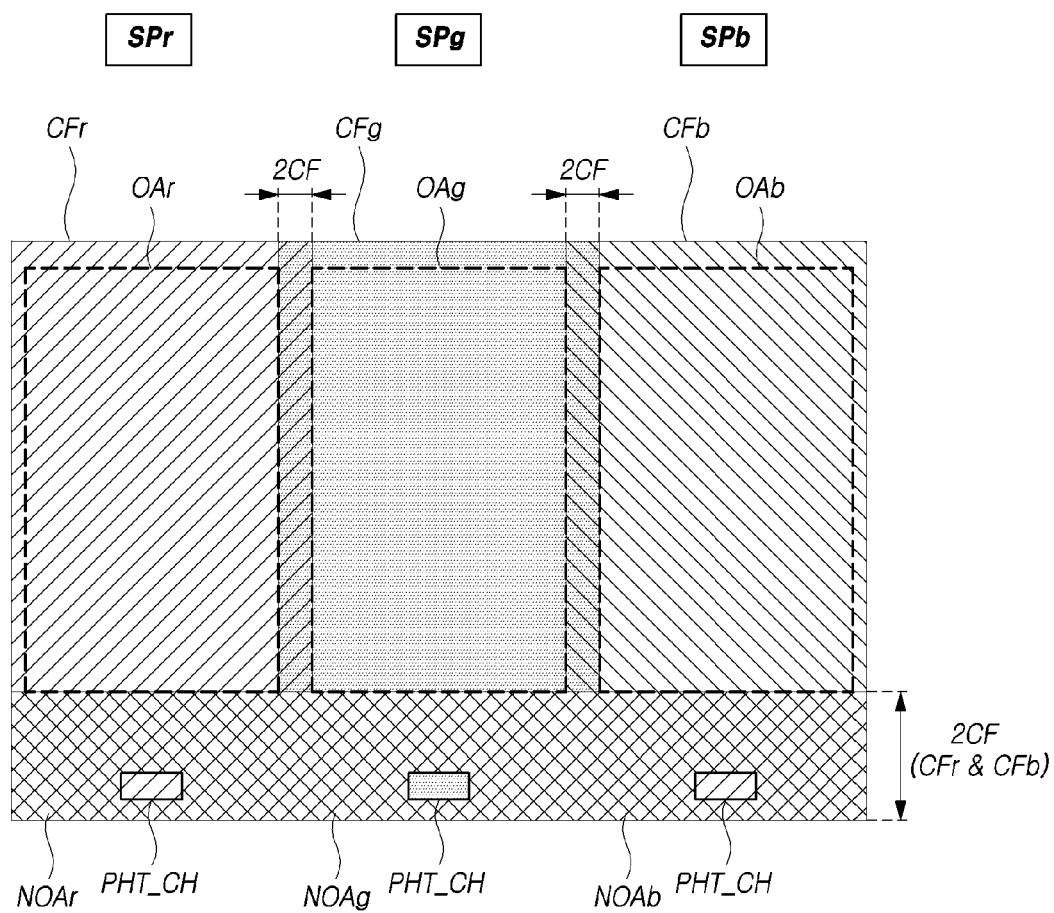

Unlike this, referring to FIGS. 34 to 36, in the area where the channel PTH_CH of the photo transistor PHT is positioned in the first non-opening area NOAr, second non-opening area NOAg, and third non-opening area NOAb, only one of the first-color color filter CFr, second-color color filter CFg, and third-color color filter CFb may exist.

Referring to FIG. 34, in the area where the channel PTH_CH of the photo transistor PHT is positioned in the first non-opening area NOAr, second non-opening area NOAg, and third non-opening area NOAb, only the first-color color filter CFr may be disposed. This is, one embodiment, for enabling photo sensing on laser beams of the first color (e.g., red).

Referring to FIG. 35, in the area where the channel PTH_CH of the photo transistor PHT is positioned in the first non-opening area NOAr, second non-opening area NOAg, and third non-opening area NOAb, only the second-color color filter CFg may be disposed. This is, one embodiment, for enabling photo sensing on laser beams of the second color (e.g., green).

Referring to FIG. 36, in the area where the channel PTH_CH of the photo transistor PHT is positioned in the first non-opening area NOAr, second non-opening area NOAg, and third non-opening area NOAb, the first-color color filter CFr and the second-color color filter CFg may be alternately disposed. This is, one embodiment, for enabling photo sensing on laser beams of the first color (e.g., red) and photo sensing on laser beams of the second color (e.g., green).

FIGS. 37 to 40 are views illustrating various kinds of light-based input environments provided by a display panel according to embodiments of the disclosure.

A display device according to embodiments of the disclosure may allow the user various kinds of touch input environment using her finger or a pen.

Here, the various kinds of touch inputs may include, e.g., a one-click, which is recognized by the user quickly clicking on a point, a double-click, which is recognized by the user clicking on a point quickly two consecutive times, a holding touch (i.e., holding input), which is recognized by the user pressing and holding on a point, and a drag, which is a continuous touch between two points by the user.

The display device may provide various application processes suited for various kinds of touch inputs as various kinds of touch input environments are provided. For example, the various application processes may include the process of selecting an object (e.g., an icon, button, text, image, content, URL address, or keyboard button) at the point on the screen or the process of handwriting or drawing or the process of executing the application program (application) linked to the touched point.

The display device according to embodiments of the disclosure may provide various kinds of light-based input environments corresponding to the various kinds of touch input environments in the same manner. The display device according to embodiments of the disclosure may provide various application processes according to various kinds of light-based inputs as it provides various application processes according to various kinds of touch inputs.

The user may press a button of the beam generator BG, radiating light to a desired point on the display panel DISP.

The user may adjust the number of times of light radiation by adjusting the number of times of pressing the button of the beam generator BG, adjust the duration of continuous light radiation by adjusting the time (e.g., holding time) as to how long or short she presses the button of the beam generator BG, and move the position of light radiation by moving the beam generator BG while pressing the button of the beam generator BG. As such, the user may enable various kinds of light-based inputs by diversifying the manipulation of the beam generator BG.

Thus, as the number of times in which the photo transistor PHT where the light is radiated reacts or the photo reaction time is varied, the amount of the leaking current (e.g., off current) flowing through the photo transistor PHT may be varied, the number of times or time when the leaking current (e.g., off current) continuously flows through the photo transistor PHT is varied, or as the photo transistor PHT is reacting to the light is moved, the pattern of the sensing value Vout in the multi-sensing circuit MSC may be varied. The multi-controller MCTR may identify the kind of light-based input by sensing the variations in the pattern of the sensing value Vout in the multi-sensing circuit MSC.

According to embodiments of the disclosure, the multi-sensing circuit MSC of the display device detects the signals Vs output from the photo transistors PHT reacting to the light radiation, as sensing signals ROS from the common electrodes COM, thereby generating sensing data. The multi-controller MCTR may detect the coordinates of the light radiation (e.g., photo coordinates) in the display panel DISP based on the sensing data output from the multi-sensing circuit MSC.

Further, the multi-controller MCTR may recognize the time of detection of the light-based input while detecting the light radiation coordinates (e.g., photo coordinates) based on the sensing data output from the multi-sensing circuit MSC and, based thereupon, calculate the time during which the same light radiation coordinates (e.g., photo coordinates) are continuously detected, as a continuous sensing time CST.

Here, the time of detection of the light-based input may include a detection start time Ts and a detection end time Te. The detection start time Ts and the detection end time Te are the start time and end time of the continuous sensing time CST during which the light radiation coordinates (e.g., photo coordinates) are continuously sensed. The continuous sensing time CST corresponds to the time during which the user continuously radiates the light to the same point using the beam generator BG.

Described below are various kinds of light-based inputs corresponding to various kinds of touch inputs (e.g., a one-click, double-click, holding touch, or drag) and a method for recognizing the same.

Figure 37:
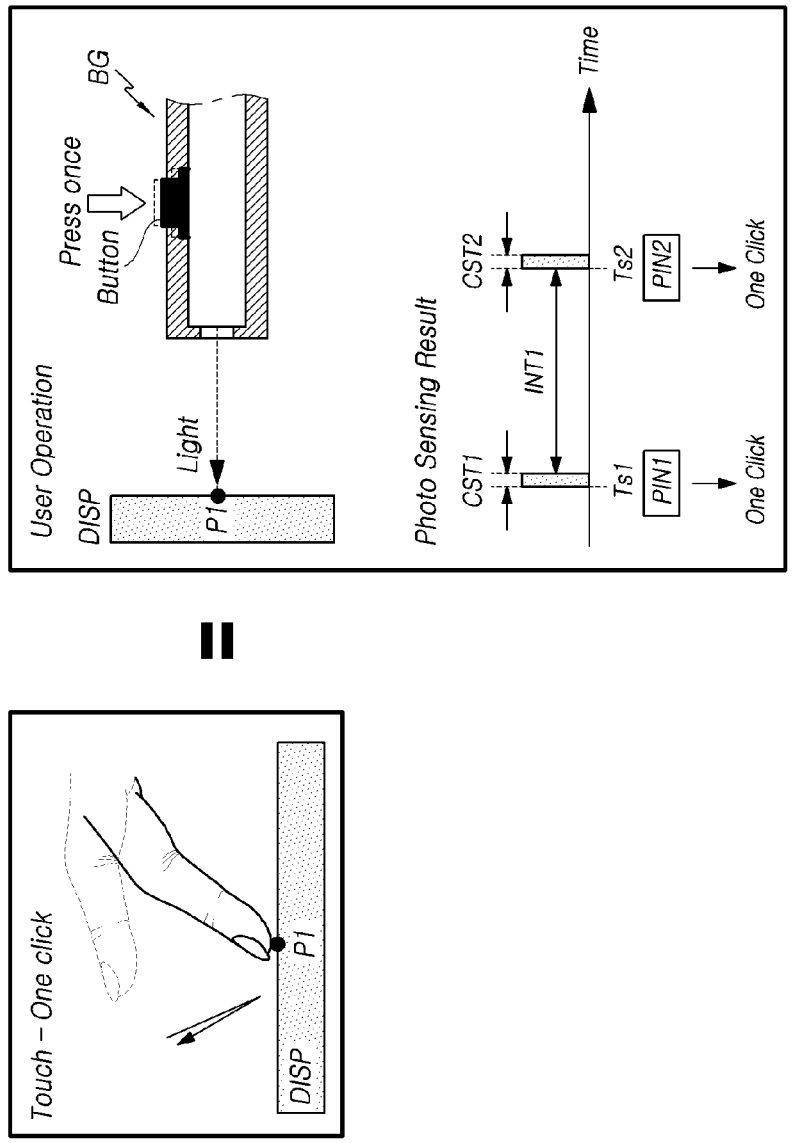
FIGS. 37, 38, 39, and 40 are views illustrating various kinds of light-based input environments provided by a display panel according to embodiments of the disclosure.

Referring to FIG. 37, the user may perform a one click-type first light-based input PIN1 by taking the action of radiating light to point P1 on the display panel DISP for a short time by quickly pressing once a button of the beam generator BG at time Ts1.

Then, the user may perform a one click-type second light-based input PIN2 by taking the action of radiating light to point P1 on the display panel DISP for a short time by quickly pressing once again the button of the beam generator BG at time Ts2.

The multi-controller MCTR may sense point P1, as the light radiation coordinates, at time Ts1, based on the sensing data and recognizes the first light-based input PIN1 and, at time Ts2, which is a predetermined time (or a selected time) INT1 after time Ts1 (start time), senses point P1 (or other point) as the light radiation coordinates and recognizes the second light-based input PIN2.

To identify the kind of the light-based input, in addition to the result of the primary recognition result, the multi-controller MCTR compares the interval INT1 between time Ts1 and time Ts2 with a predetermined interval threshold INT_TH (or a selected interval threshold INT_TH) and compares each of the continuous sensing time CST1 of the first light-based input PIN1 and the continuous sensing time CST2 of the second light-based input PIN2 with a threshold continuous sensing time CST_TH. In the example of FIG. 37, the start time Ts1 and end time Te1 of the continuous sensing time CST1 of the first light-based input PIN1 are regarded as substantially the same. The start time Ts2 and end time Te2 of the continuous sensing time CST2 of the second light-based input PIN2 are regarded as substantially the same.

By the user's light radiating action exemplified in FIG. 37, the interval INT1 between time Ts1 and time Ts2 is longer than the interval threshold INT_TH. Each of the continuous sensing time CST1 of the first light-based input PIN1 and the continuous sensing time CST2 of the second light-based input PIN2 is shorter than the threshold continuous sensing time CST_TH.

Thus, the multi-controller MCTR separately recognizes the first light-based input PIN1 and the second light-based input PIN2 as distinct one click-type light-based inputs.

Figure 38:
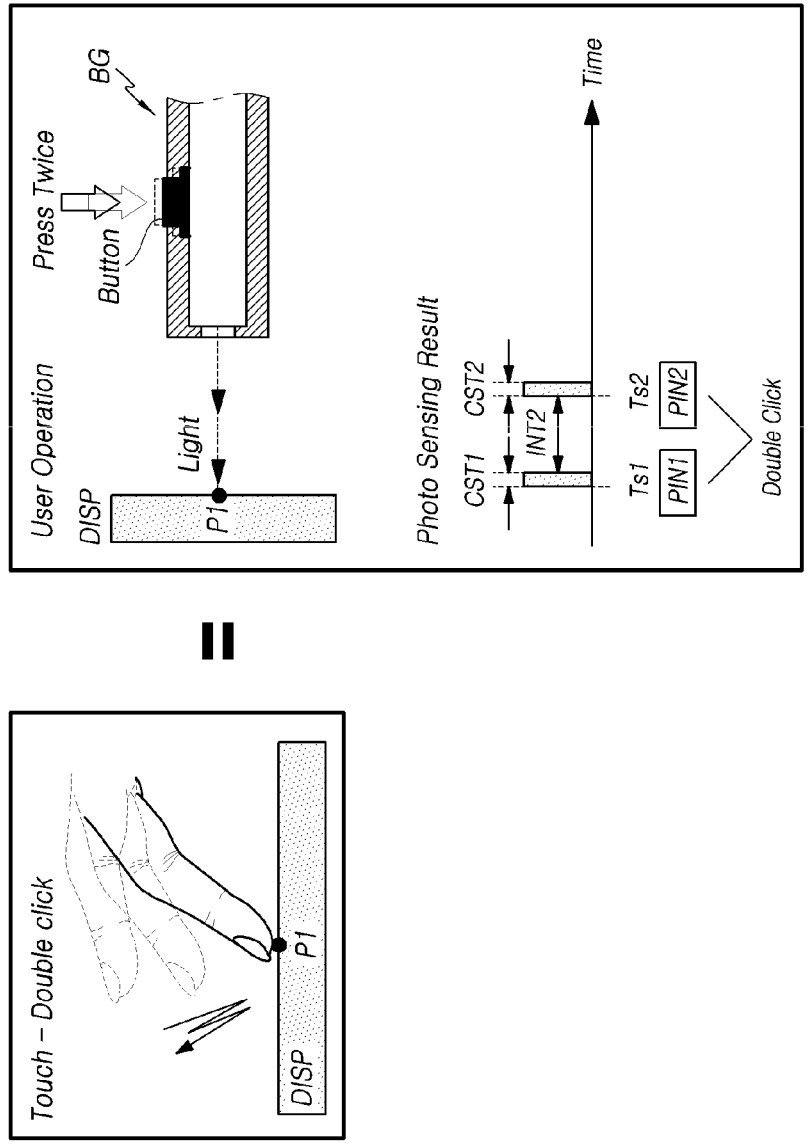

Referring to FIG. 38, the user may perform a double click-type light-based input by taking the action of radiating light to point P1 on the display panel DISP two consecutive times for a short time by quickly pressing twice the button of the beam generator BG.

The multi-controller MCTR may sense point P1, as the light radiation coordinates, at time Ts1, based on the sensing data and recognizes the first light-based input PIN1 and, at time Ts2, which is a predetermined time (or a selected time) INT2 after time Ts1, senses point P1, as the light radiation coordinates, and recognizes the second light-based input PIN2.

To identify the kind of the light-based input, in addition to the result of the primary recognition result, the multi-controller MCTR compares the interval INT2 between time Ts1 and time Ts2 with a predetermined interval threshold INT_TH (or at a selected interval threshold INT_TH) and compares each of the continuous sensing time CST1 of the first light-based input PIN1 and the continuous sensing time CST2 of the second light-based input PIN2 with a threshold continuous sensing time CST_TH. In the example of FIG. 38, the start time Ts1 and end time Te1 of the continuous sensing time CST1 of the first light-based input PIN1 are regarded as substantially the same. The start time Ts2 and end time Te2 of the continuous sensing time CST2 of the second light-based input PIN2 are regarded as substantially the same.

By the user's light radiating action exemplified in FIG. 38, the interval INT2 between time Ts1 and time Ts2 is not larger than the interval threshold INT_TH. Each of the continuous sensing time CST1 of the first light-based input PIN1 and the continuous sensing time CST2 of the second light-based input PIN2 is shorter than the threshold continuous sensing time CST_TH.

Thus, the multi-controller MCTR recognizes a combination of the first light-based input PIN1 and the second light-based input PIN2 as one double click-type light-based input.

Figure 39:
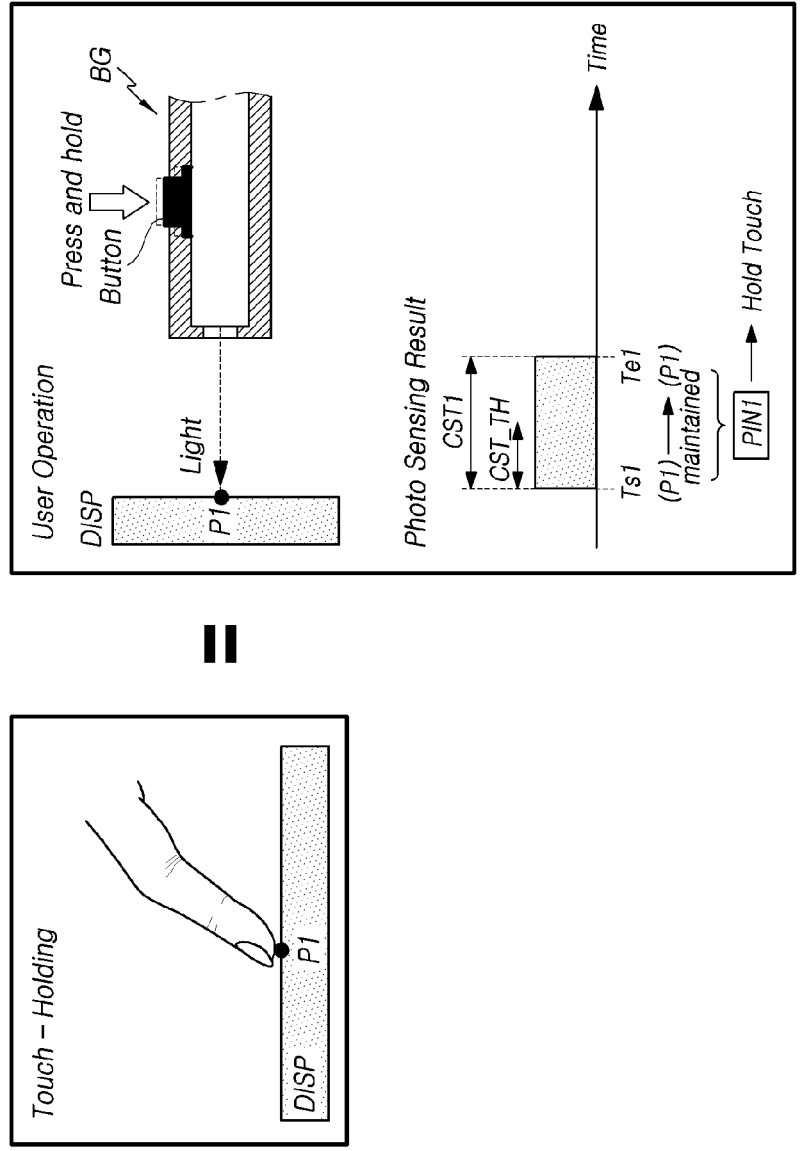

Referring to FIG. 39, the user may perform a holding touch-type light-based input by taking the action of radiating light to point P1 on the display panel DISP for a predetermined time (or a selected time) or more by pressing and holding the button of the beam generator BG.

The multi-controller MCTR recognizes the first light-based input PIN1 by continuously sensing point P1, as the light radiation coordinates, during the continuous sensing time CST1 from time Ts1 to Te1 based on the sensing data.

To identify the kind of the light-based input, in addition to the result of the primary recognition result, the multi-controller MCTR compares the continuous sensing time CST1 of the first light-based input PIN1 with a threshold continuous sensing time CST_TH.

By the user's light radiating action exemplified in FIG. 39, the continuous sensing time CST1 of the first light-based input PIN1 is longer than the threshold continuous sensing time CST_TH.

Thus, the multi-controller MCTR recognizes the first light-based input PIN1 as a holding touch-type light-based input.

Figure 40:
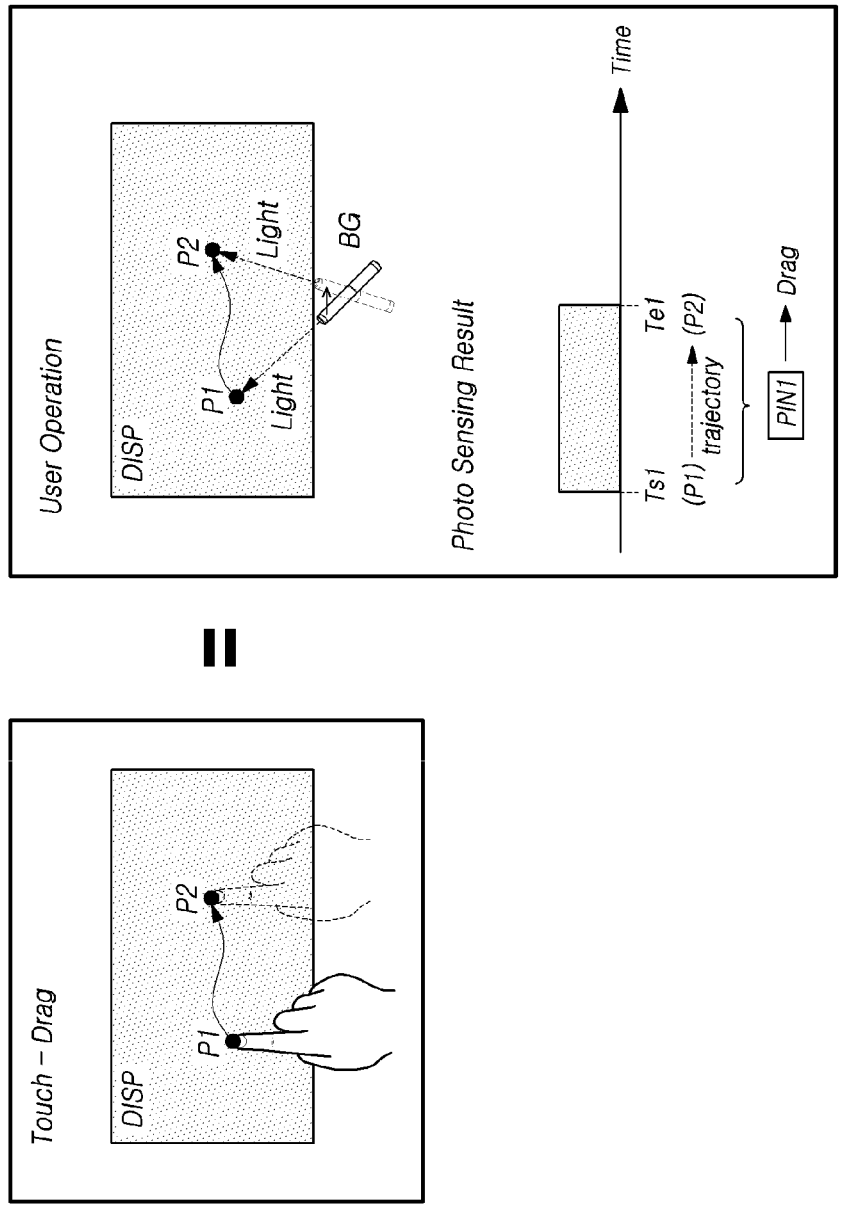

Referring to FIG. 40, the user may perform a drag-type light-based input by taking the action of radiating light along the trajectory from point P1 to point P2 on the display panel DISP by pressing and holding the button of the beam generator BG while dragging from point P1 to point P2.

The multi-controller MCTR recognizes the drag-type first light-based input PIN1 by continuously sensing the points on the trajectory from the point P1 to point P2, as the light radiation coordinates, during the continuous sensing time CST1 from time Ts1 to time Te1 based on the sensing data.

The display device according to embodiments of the disclosure may not only provide the above-described one click-type, double click-type, holding touch-type, and drag-type light-based inputs but, by modifying or combining them, may also provide other various light-based inputs, e.g., multitouch-type or multidrag-type light-based inputs.

According to embodiments of the disclosure described above, the touch sensor (common electrode COM) and the photo sensor PS are enabled to perform sensing via the same readout line ROL, allowing for rapid and efficient touch sensing and photo sensing.

According to embodiments of the disclosure, in the display panel DISP, the touch sensor configuration (e.g., COM or ROL) and photo sensor configuration (e.g., PHT, COM, ROL, PDL, PCL, or GL) are designed to be organically combined with configurations (e.g., COM, ROL, or GL) for display driving, allowing for efficient displaying, touch sensing, and photo sensing.

According to embodiments of the disclosure, a configuration for display driving, a touch sensor configuration, and a photo sensor configuration all are included, allowing for a high aspect ratio and high transmittance via an efficient design of the photo sensor configuration.

According to embodiments of the disclosure, photo sensors PS may be normally operated to perform photo sensing even without all (PDL and PCL) or some (PDL or PCL) of the signal lines PDL and PCL for the operation of the photo sensors. Thus, the aperture ratio and transmittance may be enhanced.

According to embodiments of the disclosure, various kinds of light-based inputs may be provided to the user.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are to illustrate the scope of the technical idea of the disclosure. Thus, the scope of the disclosure is not limited to the embodiments shown, but is to be accorded the widest scope consistent with the technical ideas of the disclosure.

The various embodiments described above can be combined to provide further embodiments. Further changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A display device, comprising:
a plurality of data lines disposed in a first direction and configured to be supplied with data signals;
a plurality of gate lines disposed in a second direction transverse to the first direction and configured to be supplied with scan signals;
a plurality of pixel electrodes respectively disposed in a plurality of subpixels;
a plurality of common electrodes supplying a display common voltage upon display driving;
a plurality of readout lines electrically connected with the plurality of common electrodes; and
a plurality of photo transistors including a gate electrode, a first electrode, and a second electrode, wherein the second electrode is electrically connected with the common electrode, and wherein at least one of the first electrode and the gate electrode is electrically connected with a gate line for the display driving,
wherein a driving period of the display device includes a display driving period and a touch driving period,
during the display driving period, the display common voltage is applied to the plurality of common electrodes, and the display common voltage is applied to the second electrode of each of the plurality of photo transistors, and
during the touch driving period, a touch driving signal whose voltage level is varied is applied to at least one of the plurality of common electrodes, and the touch driving signal is applied to the second electrode of at least one of the plurality of photo transistors.

2. The display device of claim 1, wherein
during the touch driving period, when the first electrode is electrically connected with the gate line or the first electrode and the gate electrode are electrically connected with the gate line,
the first electrode of at least one of the plurality of photo transistors has a voltage value lower than the touch driving signal, and
wherein a direction of a leaking current flowing through at least one of the plurality of photo transistors is a direction from the second electrode to the first electrode.

3. The display device of claim 1, wherein
during the touch driving period, when the gate electrode is electrically connected with the gate line,
the first electrode of at least one of the plurality of photo transistors has a voltage value higher than the touch driving signal, and
wherein a direction of a leaking current flowing through at least one of the plurality of photo transistors is a direction from the first electrode to the second electrode.

4. The display device of claim 1, wherein
the first electrode of each of the plurality of photo transistors is electrically connected with the gate line,
the plurality of subpixels include a first subpixel and a second subpixel positioned adjacent to each other in a column direction, the first subpixel includes a first pixel electrode, and the second subpixel includes a second pixel electrode,
wherein a row signal line disposed between the first pixel electrode and the second pixel electrode includes:
the gate line electrically connected with the first electrode of the photo transistor positioned between the first pixel electrode and the second pixel electrode; and a photo control line electrically separated from the gate line and transferring a photo control signal to the gate electrode of the photo transistor positioned between the first pixel electrode and the second pixel electrode.

5. The display device of claim 1, wherein
during the display driving period,
a scan signal is applied to the gate line connected to the first electrode of each of the plurality of photo transistors, the scan signal includes a turn-off level voltage period and a turn-on level voltage period,
wherein the scan signal is applied to the first electrode of each of the plurality of photo transistors, and
during the touch driving period,
a gate load free driving signal whose voltage level is varied is applied to the gate line connected to the first electrode of each of the plurality of photo transistors, and
wherein the voltage level of the gate load free driving signal is varied within a turn-off level voltage range of a driving transistor in the subpixel and has an amplitude corresponding to an amplitude of the touch driving signal.

6. The display device of claim 5, wherein
during the display driving period,
a photo control signal applied to the gate electrode of each of the plurality of photo transistors has a direct-current (DC) voltage, and
during the touch driving period,
the voltage level of the photo control signal applied to the gate electrode of each of the plurality of photo transistors is varied within a turn-off level voltage range and has an amplitude corresponding to an amplitude of the touch driving signal.

7. The display device of claim 1, wherein
the first electrode and the gate electrode of each of the plurality of photo transistors are electrically connected with the gate line,
the plurality of subpixels include a first subpixel and a second subpixel positioned adjacent to each other in a column direction, the first subpixel includes a first pixel electrode, and the second subpixel includes a second pixel electrode,
wherein a row signal line disposed between the first pixel electrode and the second pixel electrode includes:
the gate line electrically connected with the first electrode and the gate electrode of the photo transistor positioned between the first pixel electrode and the second pixel electrode.

8. The display device of claim 1, wherein
during the display driving period,
a scan signal is applied to the gate line connected jointly to the first electrode and the gate electrode of each of the plurality of photo transistors, the scan signal includes a turn-off level voltage period and a turn-on level voltage period,
wherein the scan signal is applied jointly to the first electrode and the gate electrode of each of the plurality of photo transistors, and
during the touch driving period,
a gate load free driving signal whose voltage level is varied is applied to the gate line connected jointly to the first electrode and the gate electrode of each of the plurality of photo transistors, and
wherein the voltage level of the gate load free driving signal is varied within a turn-off level voltage range of the photo transistor and a driving transistor in the subpixel and has an amplitude corresponding to an amplitude of the touch driving signal.

9. The display device of claim 1, wherein
the gate electrode of each of the plurality of photo transistors is electrically connected with the gate line,
the plurality of subpixels include a first subpixel and a second subpixel positioned adjacent to each other in a column direction, the first subpixel includes a first pixel electrode, and the second subpixel includes a second pixel electrode,
wherein a row signal line disposed between the first pixel electrode and the second pixel electrode includes:
the gate line electrically connected with the gate electrode of the photo transistor positioned between the first pixel electrode and the second pixel electrode; and
a photo driving line electrically separated from the gate line and transferring a photo driving signal to the first electrode of the photo transistor positioned between the first pixel electrode and the second pixel electrode.

10. The display device of claim 1, wherein
during the display driving period,
a scan signal is applied to the gate line connected to the gate electrode of each of the plurality of photo transistors, the scan signal includes a turn-off level voltage period and a turn-on level voltage period,
wherein the scan signal is applied to the gate electrode of each of the plurality of photo transistors, and
during the touch driving period,
a gate load free driving signal whose voltage level is varied is applied to the gate line connected to the gate electrode of each of the plurality of photo transistors, and wherein the voltage level of the gate load free driving signal is varied within a turn-off level voltage range of the photo transistor and a driving transistor in the subpixel and has an amplitude corresponding to an amplitude of the touch driving signal.

11. The display device of claim 10, wherein
during the display driving period,
a photo driving signal applied to the first electrode of each of the plurality of photo transistors has a direct-current (DC) voltage, and
during the touch driving period,
the photo driving signal applied to the first electrode of each of the plurality of photo transistors has an amplitude corresponding to an amplitude of the touch driving signal.

12. A display device, comprising:
a plurality of data lines disposed in a first direction and configured to be supplied with data signals;
a plurality of gate lines disposed in a second direction transverse to the first direction and configured to be supplied with scan signals;
a plurality of pixel electrodes respectively disposed in a plurality of subpixels;
a plurality of common electrodes supplying a display common voltage upon display driving;
a plurality of readout lines electrically connected with the plurality of common electrodes;
a plurality of photo transistors including a gate electrode, a first electrode, and a second electrode, wherein the second electrode is electrically connected with the common electrode, and wherein at least one of the first electrode and the gate electrode is electrically connected with a gate line for the display driving; and a multi-sensing circuit electrically connected with the plurality of common electrodes through the plurality of readout lines, wherein the plurality of common electrodes include a first common electrode and a second common electrode, each of the first common electrode and the second common electrode overlapping an area occupied by two or more subpixels, wherein the plurality of readout lines include a first readout line and a second readout line jointly overlapping the first common electrode and the second common electrode, wherein the second electrode of a first photo transistor positioned between two pixel electrodes included in two subpixels overlapping the first common electrode is electrically connected with the multi-sensing circuit through the first readout line, and wherein the second electrode of a second photo transistor positioned between two pixel electrodes included in two subpixels overlapping the second common electrode is electrically connected with the multi-sensing circuit through the second readout line.

13. The display device of claim 12,
wherein two or more data lines overlapping the first common electrode and two or more data lines overlapping the second common electrode are the same data lines, and
wherein two or more gate lines overlapping the first common electrode and two or more gate lines overlapping the second common electrode are different data lines.

14. The display device of claim 12,
wherein each of the plurality of common electrodes includes a main electrode and an auxiliary electrode,
wherein the main electrode includes the same material as the pixel electrode, and
wherein the auxiliary electrode includes a material different from the main electrode.

15. The display device of claim 14, wherein
an area between two pixel electrodes included in two subpixels disposed adjacent to, and overlapping, the second common electrode includes:
a point where the main electrode or the auxiliary electrode of the second common electrode is electrically connected with the second readout line; and
a point where the second electrode of the second photo transistor disposed between the two pixel electrodes, the main electrode of the second common electrode, and the auxiliary electrode of the second common electrode are electrically connected with each other, and
wherein the main electrode or the auxiliary electrode of the second common electrode is electrically connected with the multi-sensing circuit through the second readout line.

16. The display device of claim 15,
wherein the area between the two pixel electrodes included in the two subpixels disposed adjacent to, and overlapping, the second common electrode further includes:
a point where the main electrode or the auxiliary electrode of the second common electrode is connected with the first readout line, and
wherein the main electrode or the auxiliary electrode of the second common electrode is not electrically connected with the multi-sensing circuit through the first readout line.

17. The display device of claim 12,
wherein the multi-sensing circuit outputs sensing data based on a signal detected through at least one of the plurality of readout lines, and
wherein the display device further comprises a multi-controller sensing a presence or absence of a touch or coordinates of a touch on the display device or a presence or absence of a light radiation or coordinates of a light radiation to the display device, based on the sensing data.

18. The display device of claim 1,
wherein the plurality of subpixels include a first color subpixel, a second color subpixel, and a third color subpixel arranged in a row direction,
wherein the first color subpixel includes a first opening area and a first non-opening area, the second color subpixel includes a second opening area and a second non-opening area, and the third color subpixel includes a third opening area and a third non-opening area,
wherein a first-color color filter, a second-color color filter, and a third-color color filter are disposed in the first opening area, the second opening area, and the third opening area, respectively,
wherein the first-color color filter extends up to the first non-opening area, and the third-color color filter extends up to the third non-opening area,
wherein the first-color color filter extending up to the first non-opening area is disposed to expand up to the second non-opening area and the third non-opening area, and the third-color color filter extending up to the third non-opening area is disposed to expand up to the second non-opening area and the first non-opening area, and
wherein the first-color color filter and the third-color color filter are disposed to overlap in the first non-opening area, the second non-opening area, and the third non-opening area.

19. The display device of claim 18, wherein
in an area in which a channel of the photo transistor is positioned in the first non-opening area, the second non-opening area, and the third non-opening area,
the first-color color filter and the third-color color filter are open, or
one of the first-color color filter, the second-color color filter, and the third-color color filter is present, and the others are not.

* * * * *